US007886332B2

(12) United States Patent
Aratani et al.

(10) Patent No.: US 7,886,332 B2
(45) Date of Patent: Feb. 8, 2011

(54) TELEVISION BROADCAST RECEIVING APPARATUS

(75) Inventors: Shuntaro Aratani, Tokyo (JP); Atsushi Mizutome, Kanagawa (JP); Takashi Yamamoto, Kanagawa (JP); Teruki Kikkawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1864 days.

(21) Appl. No.: 10/385,615

(22) Filed: Mar. 12, 2003

(65) Prior Publication Data

US 2003/0208778 A1 Nov. 6, 2003

(30) Foreign Application Priority Data

Mar. 19, 2002 (JP) ............................. 2002-077187
Mar. 19, 2002 (JP) ............................. 2002-077188

(51) Int. Cl.
*H04N 7/16* (2006.01)
(52) U.S. Cl. ........................... 725/151; 725/25; 725/139
(58) Field of Classification Search ................... 725/25, 725/139, 151
See application file for complete search history.

(56) References Cited

U.S. PATENT DOCUMENTS

| 5,585,858 | A | | 12/1996 | Harper et al. ................ 348/485 |
| 5,600,573 | A | | 2/1997 | Hendricks et al. ............ 364/514 |
| 5,900,905 | A | | 5/1999 | Shoff et al. .................... 348/12 |
| 5,978,855 | A | | 11/1999 | Metz et al. ................... 709/249 |
| 5,986,650 | A | * | 11/1999 | Ellis et al. ...................... 725/40 |
| 6,057,872 | A | * | 5/2000 | Candelore ...................... 725/23 |
| 6,763,522 | B1 | * | 7/2004 | Kondo et al. ................... 725/39 |
| 6,766,525 | B1 | * | 7/2004 | Lee et al. ....................... 725/46 |
| 6,930,788 | B1 | * | 8/2005 | Iwamoto et al. ............ 358/1.15 |
| 6,948,183 | B1 | * | 9/2005 | Peterka ........................ 725/25 |
| 2002/0010921 | A1 | | 1/2002 | Kambayashi et al. ......... 725/32 |
| 2002/0019982 | A1 | | 2/2002 | Aratani et al. ................ 725/59 |
| 2002/0063797 | A1 | | 5/2002 | Aratani et al. ............... 348/553 |
| 2002/0089610 | A1 | | 7/2002 | Ohno et al. .................. 348/734 |
| 2002/0138829 | A1 | | 9/2002 | Matsumoto et al. ........... 725/14 |
| 2002/0157094 | A1 | | 10/2002 | Saito et al. .................... 725/38 |

FOREIGN PATENT DOCUMENTS

| CN | 1275028 A | 11/2000 |
| EP | 0 852 443 | 7/1998 |
| EP | 1 061 465 | 12/2000 |
| FR | 2 794 602 | 12/2000 |
| JP | 9-23417 | 1/1997 |
| JP | 9-251714 | 9/1997 |
| JP | 2001-43282 | 2/2001 |
| WO | WO 01/33852 | 5/2001 |

OTHER PUBLICATIONS

Sun Microsystems, Inc., "Java TV™ API Specification", (Jun. 14, 1999).
Aug. 3, 2007 Chinese Official Action in Chinese Patent Application No. 200510129624.4 (with translation).
Mar. 14, 2008 Chinese Official Action translation in Chinese Patent Appln. No. 200510129624.4.

* cited by examiner

*Primary Examiner*—Hunter B. Lonsberry
*Assistant Examiner*—Oschta Montoya
(74) *Attorney, Agent, or Firm*—Fitzpatrick, Cella, Harper & Scinto

(57) ABSTRACT

A receiving apparatus for, in a case that an application program is executed at a television receiving apparatus, permitting execution of the application program during a period in which a predetermined channel or a broadcast program is viewed.

2 Claims, 39 Drawing Sheets

FIG. 4

```
⟨APPLICATION ATTRIBUTION⟩
    ⟨APPLICATION NAME⟩application2⟨/APPLICATION NAME⟩
    ⟨WHOLE USE CONDITION DATA⟩⟨/WHOLE USE CONDITION DATA⟩
    ⟨PARTIAL USE CONDITION DATA⟩
        ⟨PERMITTED PORTION⟩
            ⟨CLASS⟩com. newtv. fileaccesscont⟨/CLASS⟩
            ⟨SUBJECT⟩file:/applications/appl/data⟨/SUBJECT⟩
            ⟨OPERATION⟩read. write⟨/OPERATION⟩
        ⟨/PERMITTED PORTION⟩
        ⟨PERMITTED PORTION⟩
            ⟨CLASS⟩com. newtv. printeraccess⟨/CLASS⟩
            ⟨OPERATION⟩print⟨/OPERATION⟩
        ⟨/PERMITTED PORTION⟩
        ⟨CONDITION  TYPE="VIEWING"⟩
            ⟨ITEM  id=0  TYPE=DIGITAL RADIO  VALID PERIOD="2000/04/06"⟩
                ⟨network_id⟩001⟨/network_id⟩
                ⟨service_id⟩0093⟨/service_id⟩
                ⟨service_name⟩BS HINOMARU RADIO 1⟨/service_name⟩
                ⟨audio_level⟩10⟨/audio_level⟩
            ⟨/ITEM⟩
            ⟨ITEM  id=1  TYPE=DIGITAL TV⟩
                ⟨network_id⟩001⟨/network_id⟩
                ⟨service_id⟩0023⟨/service_id⟩
                ⟨service_name⟩BS HINOMARU BROADCAST 2⟨/service_name⟩
                ⟨event_id⟩8443⟨/event_id⟩
            ⟨/ITEM⟩
            ⟨ITEM  id=1  TYPE=DIGITAL TV⟩
                ⟨network_id⟩001⟨/network_id⟩
                ⟨service_id⟩0023⟨/service_id⟩
                ⟨service_name⟩BS HINOMARU BROADCAST 2⟨/service_name⟩
                ⟨event_name⟩AFTERNOON WIDE-SHOW ⟨/event_name⟩
            ⟨/ITEM⟩
        ⟨/CONDITION⟩
        ⟨OPERATION FOR UNACCEPTED CONDITION  SELECT="false"  DELAY=2⟩
            ⟨OPERATION⟩WARNING DISPLAY⟨/OPERATION⟩
        ⟨/OPERATION FOR UNACCEPTED CONDITION⟩
    ⟨/PARTIAL USE CONDITION DATA⟩
    ⟨VIEWING TYPE⟩
        ⟨DISPLAY⟩WINDOW⟨/DISPLAY⟩
        ⟨DISPLAY SIZE⟩320×240⟨/DISPLAY SIZE⟩
        ⟨AUDIO⟩⟨/AUDIO⟩
    ⟨/VIEWING TYPE⟩
    ⟨UPDATE DATA⟩
        ⟨NEXT UPDATE DATE⟩2000/04/06⟨/NEXT UPDATE DATE⟩
        ⟨URL⟩dtv_bs://network_id. transport_stream_id. service_id/module_id/appl. atrb⟨/URL⟩
    ⟨/UPDATE DATA⟩
⟨/APPLICATION ATTRIBUTION⟩
```

FIG. 9

```
⎧ 〈APPLICATION id="1"〉
⎪     〈APPLICATION NAME〉Browser〈/APPLICATION NAME〉              ——— (A)
⎪     〈WHOLE USE CONDITION DATA〉〈/WHOLE USE CONDITION DATA〉
⎪     〈PARTIAL USE CONDITION DATA〉〈/PARTIAL USE CONDITION DATA〉
⎪ 〈/APPLICATION〉
⎪
⎪ 〈APPLICATION id="2"〉
⎪     〈APPLICATION NAME〉EPG〈/APPLICATION NAME〉                  ——— (B)
⎪     〈WHOLE USE CONDITION DATA〉〈/WHOLE USE CONDITION DATA〉
⎪     〈PARTIAL USE CONDITION DATA〉〈/PARTIAL USE CONDITION DATA〉
⎪ 〈/APPLICATION〉
⎪
⎪ 〈APPLICATION id="3"〉
⎪     〈APPLICATION NAME〉application1〈/APPLICATION NAME〉         ——— (C)
⎪     〈WHOLE USE CONDITION DATA〉
⎪         〈CONDITION  TYPE="VIEWING"〉
⎪             〈ITEM  id=0  TYPE=DIGITAL TV  VALID PERIOD="2000/04/06"〉
⎨                 〈network_id〉001〈/network_id〉
⎪                 〈service_id〉0023〈/service_id〉
⎪                 〈service_name〉BS HINOMARU BROADCAST 1〈/service_name〉
⎪             〈/ITEM〉
⎪             〈ITEM  id=1  TYPE=ANALOG TV〉
⎪                 〈service_id〉6 〈/service_id〉
⎪             〈/ITEM〉
⎪         〈/CONDITION〉
⎪         〈OPERATION FOR UNACCEPTED CONDITION  SELECT="true"  DELAY=1〉
⎪             〈OPERATION〉ACCOUNT〈/OPERATION〉
⎪             〈OPERATION〉END〈/OPERATION〉
⎪             〈OPERATION〉CH CHANGE〈/OPERATION〉
⎪         〈/OPERATION FOR UNACCEPTED CONDITION〉
⎪     〈/WHOLE USE CONDITION DATA〉
⎪     〈PARTIAL USE CONDITION DATA〉〈/PARTIAL USE CONDITION DATA〉
⎪     〈VIEWING TYPE〉
⎪         〈DISPLAY〉WINDOW〈/DISPLAY〉
⎪         〈SIZE〉320×240〈/SIZE〉
⎪         〈AUDIO〉〈/AUDIO〉
⎪     〈/VIEWING TYPE〉
⎪     〈UPDATE DATA〉
⎪         〈NEXT UPDATE DATE〉2000/05/06〈/NEXT UPDATE DATE〉
⎪         〈URL〉dtv_bs://network_id. transport_stream_id. service_id/module_id/appl. atrb〈/URL〉
⎪     〈/UPDATE DATA〉
⎩ 〈/APPLICATION〉
```

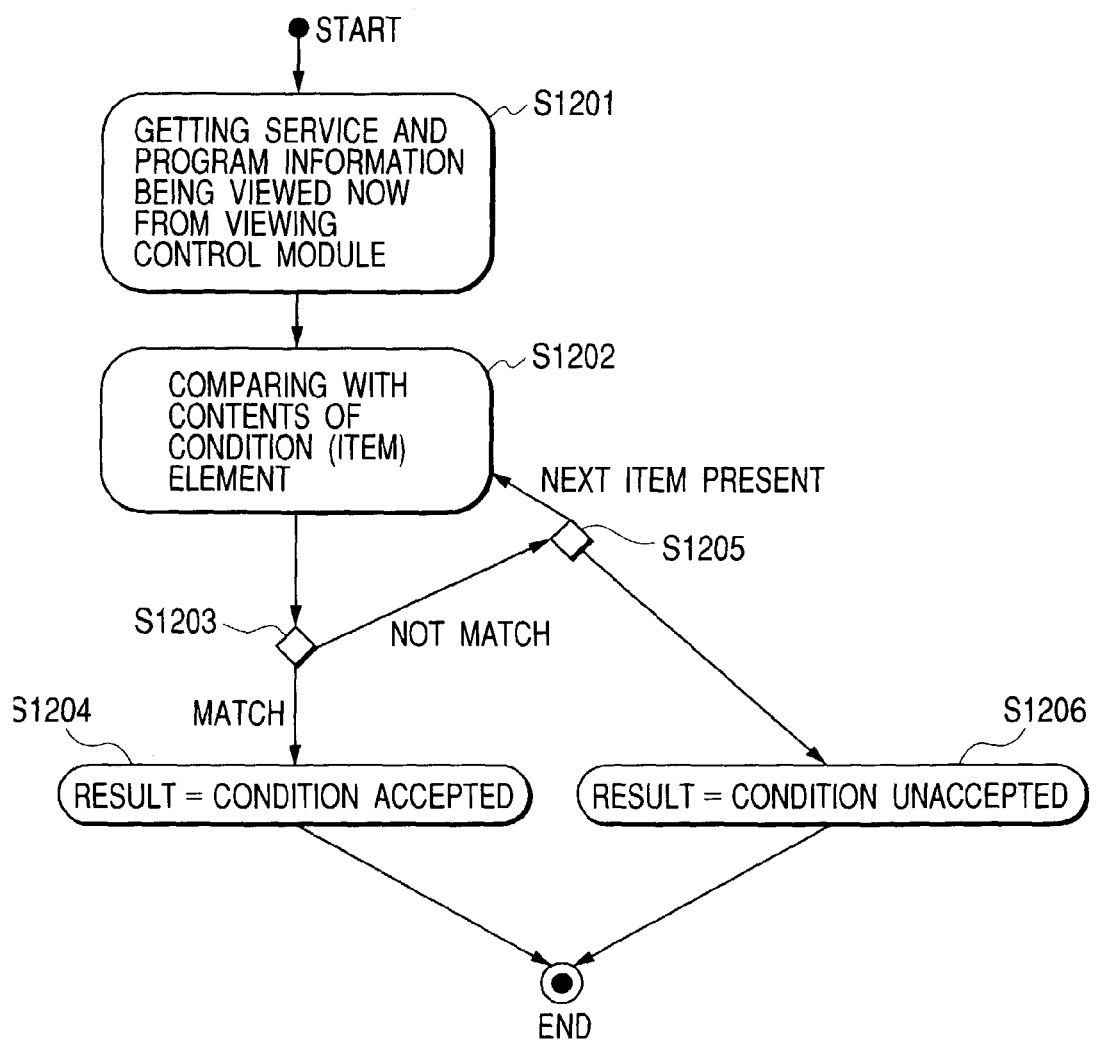

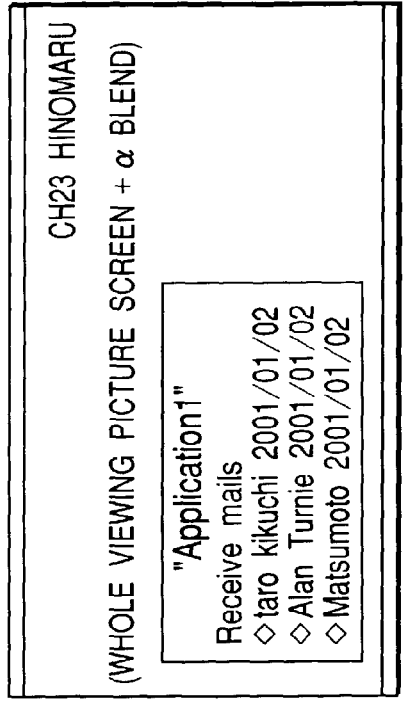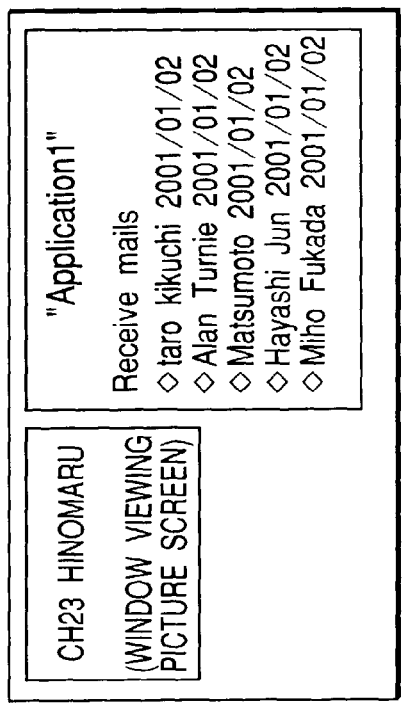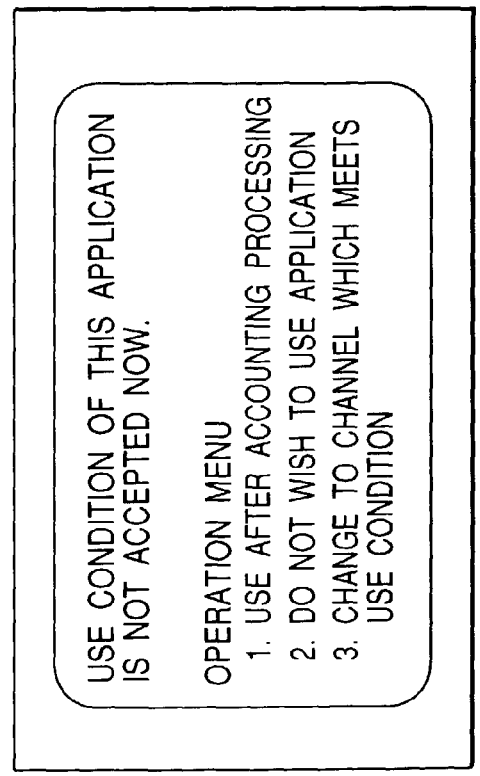

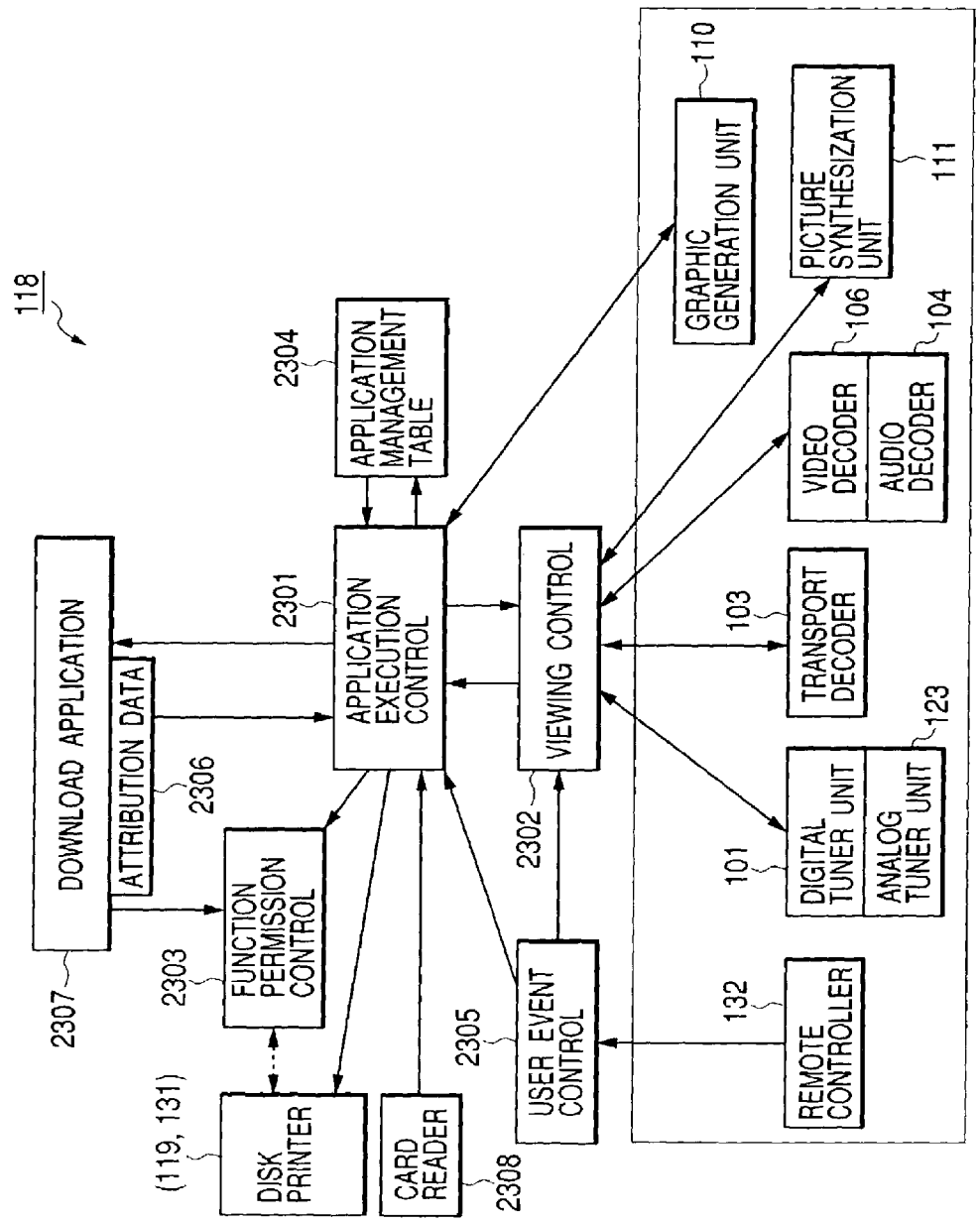

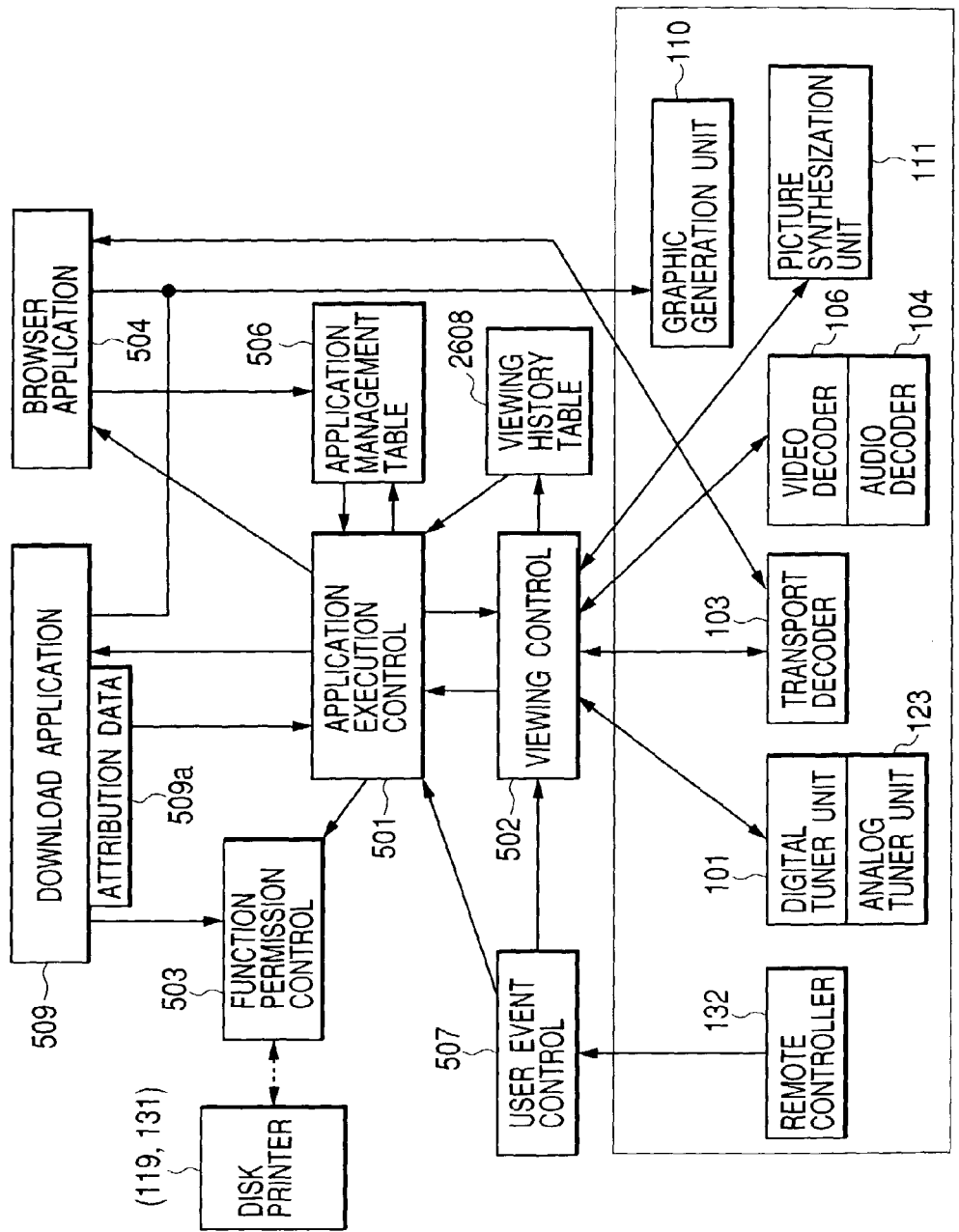

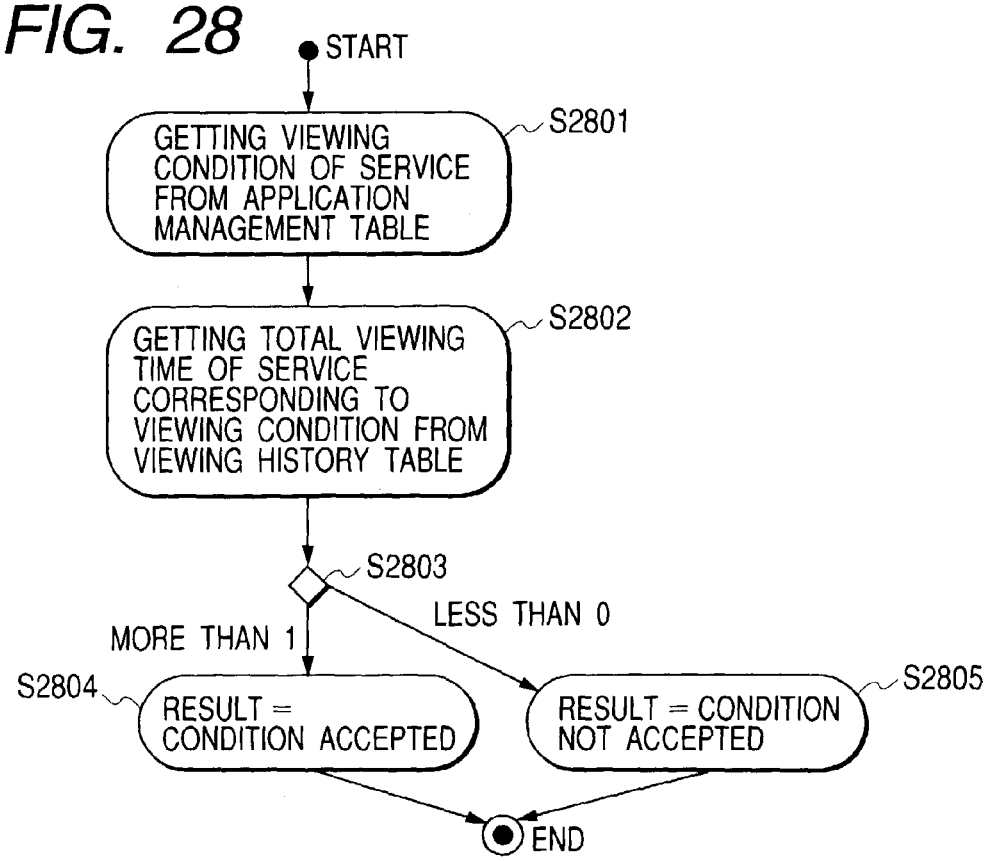

FIG. 31

```
⟨CONTENTS ATTRIBUTION id=1⟩ ─────────────────────────── (a)
    ⟨FILE ID⟩0001⟨/FILE ID⟩
    ⟨TIME OFFSET⟩60⟨/TIME OFFSET⟩
    ⟨CONTENTS NAME⟩SUPER EASY VACUUM CLEANER⟨/CONTENTS NAME⟩
    ⟨TIME⟩120⟨/TIME⟩
    ⟨VALID PERIOD⟩JUNE 1, 2000⟨/VALID PERIOD⟩
    ⟨PRIORITY REPRODUCTION CONDITION⟩
        ⟨REPRODUCTION DAY OF THE WEEK⟩MON TUES WED THUR FRI⟨/REPRODUCTION DAY OF THE WEEK⟩
        ⟨REPRODUCTION TIME ZONE⟩10-15⟨/REPRODUCTION TIME ZONE⟩
        ⟨CLASS OF USER⟩20-70⟨/CLASS OF USER⟩
        ⟨SEX OF USER⟩MALE FEMALE⟨/SEX OF USER⟩
    ⟨/PRIORITY REPRODUCTION CONDITION⟩
⟨/CONTENTS ATTRIBUTION⟩
⟨CONTENTS ATTRIBUTION id=2⟩
    ⟨FILE ID⟩0001⟨/FILE ID⟩
    ⟨TIME OFFSET⟩0⟨/TIME OFFSET⟩
    ⟨CONTENTS NAME⟩EASY MOWER⟨/CONTENTS NAME⟩
    ⟨TIME⟩60⟨/TIME⟩
    ⟨VALID PERIOD⟩JULY 31, 2000⟨/VALID PERIOD⟩
    ⟨PRIORITY REPRODUCTION CONDITION⟩
        ⟨REPRODUCTION DAY OF THE WEEK⟩WED THUR FRI SAT SUN⟨/REPRODUCTION DAY OF THE WEEK⟩
        ⟨REPRODUCTION TIME ZONE⟩10-18⟨/REPRODUCTION TIME ZONE⟩
        ⟨CLASS OF USER⟩20-70⟨/CLASS OF USER⟩
        ⟨SEX OF USER⟩MALE FEMALE⟨/SEX OF USER⟩
    ⟨/PRIORITY REPRODUCTION CONDITION⟩
⟨/CONTENTS ATTRIBUTION⟩
⟨CONTENTS ATTRIBUTION id=3⟩
    ⟨FILE ID⟩0001⟨/FILE ID⟩
    ⟨TIME OFFSET⟩180⟨/TIME OFFSET⟩
    ⟨CONTENTS NAME⟩FOREIGN FILM PROMOTION OF THIS WEEK:"STAR WARS" FIRST TIME ON TV⟨/CONTENTS NAME⟩
    ⟨TIME⟩240⟨/TIME⟩
    ⟨VALID PERIOD⟩JULY 18, 2000⟨/VALID PERIOD⟩
    ⟨PRIORITY REPRODUCTION CONDITION⟩
        ⟨REPRODUCTION DAY OF THE WEEK⟩MON TUES WED THUR FRI SAT SUN⟨/REPRODUCTION DAY OF THE WEEK⟩
        ⟨REPRODUCTION TIME ZONE⟩19-23⟨/REPRODUCTION TIME ZONE⟩
        ⟨CLASS OF USER⟩10-60⟨/CLASS OF USER⟩
        ⟨SEX OF USER⟩MALE FEMALE⟨/SEX OF USER⟩
    ⟨/PRIORITY REPRODUCTION CONDITION⟩
⟨/CONTENTS ATTRIBUTION⟩
⟨CONTENTS ATTRIBUTION id=4⟩
    ⟨FILE ID⟩0001⟨/FILE ID⟩
    ⟨TIME OFFSET⟩320⟨/TIME OFFSET⟩
    ⟨CONTENTS NAME⟩EASY UNDERWARE SERIES:TIGHTS⟨/CONTENTS NAME⟩
    ⟨TIME⟩60⟨/TIME⟩
    ⟨VALID PERIOD⟩SEPTEMBER 30, 2000⟨/VALID PERIOD⟩
    ⟨PRIORITY REPRODUCTION CONDITION⟩
        ⟨REPRODUCTION DAY OF THE WEEK⟩MON TUES WED THUR FRI SAT SUN⟨/REPRODUCTION DAY OF THE WEEK⟩
        ⟨REPRODUCTION TIME ZONE 19-23⟨/REPRODUCTION TIME ZONE⟩
        ⟨CLASS OF USER 10-60⟨/CLASS OF USER⟩
        ⟨SEX OF USER⟩FEMALE⟨/SEX OF USER⟩
    ⟨/PRIORITY REPRODUCTION CONDITION⟩
⟨/CONTENTS ATTRIBUTION⟩
        :
        :
        :
```

FIG. 42

⟨CONTENTS ATTRIBUTION id=1  TYPE=ADVERTISEMENT OF COMPANY⟩ —— (a)
    ⟨FILE ID⟩0001⟨/FILE ID⟩
    ⟨TIME OFFSET⟩120⟨/TIME OFFSET⟩
    ⟨SPONSOR COMPANY NAME⟩MICHELSOFT⟨/SPONSOR COMPANY NAME⟩
    ⟨SECTION⟩OFFICE SOFT BUSINESS SECTION⟨/SECTION⟩
    ⟨CONTENTS NAME⟩MICHELSOFT OFFICE 2000⟨/CONTENTS NAME⟩
    ⟨TIME⟩120⟨/TIME⟩
    ⟨VALID PERIOD⟩JUNE 1, 2000⟨/VALID PERIOD⟩
⟨/CONTENTS ATTRIBUTION⟩
⟨CONTENTS ATTRIBUTION id=2⟩ —— (b)
    ⟨FILE ID⟩0001⟨/FILE ID⟩
    ⟨TIME OFFSET⟩0⟨/TIME OFFSET⟩
    ⟨SPONSOR COMPANY NAME⟩21 CENTURY BUSINESS COMPANY Co., Ltd⟨/SPONSOR COMPANY NAME⟩
    ⟨SECTION⟩CAR IMPORT BUSINESS SECTION⟨/SECTION⟩
    ⟨CONTENTS NAME⟩ATTRACTION OF NEW AUJI PASERT⟨/CONTENTS NAME⟩
    ⟨TIME⟩120⟨/TIME⟩
    ⟨VALID PERIOD⟩JULY 31, 2000⟨/VALID PERIOD⟩
⟨/CONTENTS ATTRIBUTION⟩
⟨CONTENTS ATTRIBUTION id=3⟩ —— (c)
    ⟨FILE ID⟩0001⟨/FILE ID⟩
    ⟨TIME OFFSET⟩120⟨/TIME OFFSET⟩
    ⟨SPONSOR COMPANY NAME⟩WORLD PEACE LEAGUE EXECUTIVE OFFICE⟨/SPONSOR COMPANY NAME⟩
    ⟨CONTENTS NAME⟩MINE ERADICATION CAMPAIGN⟨/CONTENTS NAME⟩
    ⟨TIME⟩240⟨/TIME⟩
    ⟨VALID PERIOD⟩JULY 18, 2000⟨/VALID PERIOD⟩
⟨/CONTENTS ATTRIBUTION⟩
⟨CONTENTS ATTRIBUTION id=4⟩ —— (d)
    ⟨FILE ID⟩0001⟨/FILE ID⟩
    ⟨TIME OFFSET⟩360⟨/TIME OFFSET⟩
    ⟨SPONSOR COMPANY NAME⟩MAINITI BEER⟨/SPONSOR COMPANY NAME⟩
    ⟨CONTENTS NAME⟩SUPER SMOOTH BEER⟨/CONTENTS NAME⟩
    ⟨TIME⟩60⟨/TIME⟩
    ⟨VALID PERIOD⟩SEPTEMBER 30, 2000⟨/VALID PERIOD⟩
⟨/CONTENTS ATTRIBUTION⟩
    :
    :
⟨CONTENTS ATTRIBUTION id=10  TYPE=ADVERTISEMENT OF COMPANY⟩ —— (e)
    ⟨FILE ID⟩0001⟨/FILE ID⟩
    ⟨TIME OFFSET⟩1200⟨/TIME OFFSET⟩
    ⟨SPONSOR COMPANY NAME⟩BIC CAMERA⟨/SPONSOR COMPANY NAME⟩
    ⟨CONTENTS NAME⟩BARGAIN SALE INFORMATION OF NEW PRODUCT OF AUDIO EQUIPMENT⟨/CONTENTS NAME⟩
    ⟨CATEGORY⟩AV EQUIPMENTS⟨/CATEGORY⟩
    ⟨TIME⟩120⟨/TIME⟩
    ⟨VALID PERIOD⟩JUNE 5, 2000⟨/VALID PERIOD⟩
⟨/CONTENTS ATTRIBUTION⟩
⟨CONTENTS ATTRIBUTION id=11⟩ —— (f)
⟨FILE ID⟩0001⟨/FILE ID⟩
    ⟨FILE ID⟩0001⟨/FILE ID⟩
    ⟨TIME OFFSET⟩1320⟨/TIME OFFSET⟩
    ⟨SPONSOR COMPANY NAME⟩BIC CAMERA⟨/SPONSOR COMPANY NAME⟩
    ⟨CONTENTS NAME⟩SPECIAL BARGAIN SALE INFORMATION OF AIR CONDITIONER, NOW ON SALE⟨/CONTENTS NAME⟩
    ⟨CATEGORY⟩HOME LIFE ELECTRICS⟨/CATEGORY⟩
    ⟨TIME⟩120⟨/TIME⟩
    ⟨VALID PERIOD⟩JUNE 5, 2000⟨/VALID PERIOD⟩
⟨/CONTENTS ATTRIBUTION⟩

FIG. 43

```
⎧ 〈APPLICATION ATTRIBUTION id=1〉
⎜     〈APPLICATION NAME〉MICHEL WORD FOR TV〈/APPLICATION NAME〉                                    ──(A)
⎜     〈USE CONDITION CONTENTS〉
⎜          〈CONTENTS id=1 TYPE="ADVERTISEMENT OF COMPANY"〉
⎜               〈COMPANY NAME〉MICHELSOFT〈/COMPANY NAME〉
⎜               〈SECTION〉OFFICE SOFT BUSINESS SECTION〈/SECTION〉
⎜          〈/CONTENTS〉
⎜          〈CONTENTS id=2 TYPE="ADVERTISEMENT OF COMPANY"〉
⎜               〈COMPANY NAME〉MICHELSOFT〈/COMPANY NAME〉
⎜               〈NAME〉MICHELSOFT OFFICE 2000〈/NAME〉
⎜          〈/CONTENTS〉
⎜          〈CONTENTS id=3 TYPE="NON-PROFIT ORGANIZATION ADVERTIZEMENT" VALID PERIOD="DECEMBER 20, 2000〉
⎜               〈COMPANY NAME〉WORLD PEACE LEAGUE EXECUTIVE OFFICE〈/COMPANY NAME〉
⎜               〈NAME〉MINE ERADICATION CAMPAIGN〈/NAME〉
⎜          〈/CONTENTS〉
⎜     〈/USE CONDITION CONTENTS〉
⎜ 〈/APPLICATION ATTRIBUTION〉
⎜ 〈APPLICATION ATTRIBUTION id=2〉
⎜     〈APPLICATION NAME〉SMALL MAIL FOR TV〈/APPLICATION NAME〉                                     ──(B)
⎜     〈USE CONDITION CONTENTS〉
⎜          〈CONTENTS id=1 TYPE="ADVERTISEMENT OF COMPANY"〉
⎜               〈COMPANY NAME〉21 CENTURY BUSINESS COMPANY Co., Ltd〈/COMPANY NAME〉
⎨               〈SECTION〉CAR IMPORT BUSINESS SECTION〈/SECTION〉
⎜          〈/CONTENTS〉
⎜          〈CONTENTS id=2 TYPE="ADVERTISEMENT OF COMPANY"〉
⎜               〈COMPANY NAME〉MAINITI BEER〈/COMPANY NAME〉
⎜               〈NAME〉2000 YEAR-END PRESENT CAMPAIGN〈/NAME〉
⎜          〈/CONTENTS〉
⎜          〈CONTENTS id=3 TYPE="ADVERTISEMENT OF COMPANY"〉
⎜               〈COMPANY NAME〉MAINITI BEER〈/COMPANY NAME〉
⎜               〈NAME〉SUPER SMOOTH BEER〈/NAME〉
⎜          〈/CONTENTS〉
⎜          〈CONTENTS id=4 TYPE="ADVERTISEMENT OF COMPANY"〉
⎜               〈COMPANY NAME〉NIHONBASHI DEPARTMENT STORE〈/COMPANY NAME〉
⎜          〈/CONTENTS〉
⎜          〈CONTENTS id=4 TYPE="ADVERTISEMENT OF COMPANY"〉
⎜               〈COMPANY NAME〉SHIBUYA TELEVISION BROADCAST〈/COMPANY NAME〉
⎜               〈CATEGORY〉PROGRAM〈/CATEGORY〉
⎜          〈/CONTENTS〉
⎜     〈/USE CONDITION CONTENTS〉
⎜ 〈/APPLICATION ATTRIBUTION〉
⎜ 〈APPLICATION ATTRIBUTION id=3〉
⎜     〈APPLICATION NAME〉BIC PHOTOGRAPH MANAGEMENT FOR TV〈/APPLICATION NAME〉    ──(C)
⎜     〈USE CONDITION CONTENTS〉
⎜          〈CONTENTS id=1 TYPE="ADVERTISEMENT OF COMPANY" STATE DESIGNATION="1"〉
⎜               〈COMPANY NAME〉BIC CAMERA〈/COMPANY NAME〉
⎜               〈CATEGORY〉PERSONAL COMPUTER〈/CATEGORY〉
⎜          〈/CONTENTS〉
⎜          〈CONTENTS id=2 TYPE="ADVERTISEMENT OF COMPANY" STATE DESIGNATION="1"〉
⎜               〈COMPANY NAME〉BIC CAMERA〈/COMPANY NAME〉
⎜               〈CATEGORY〉AV EQUIPMENTS〈/CATEGORY〉
⎜          〈/CONTENTS〉
⎜          〈CONTENTS id=3 TYPE="ADVERTISEMENT OF COMPANY" STATE DESIGNATION="1"〉
⎜               〈COMPANY NAME〉BIC CAMERA〈/COMPANY NAME〉
⎜               〈CATEGORY〉HOME LIFE ELECTRICS〈/CATEGORY〉
⎜          〈/CONTENTS〉
⎜          〈CONTENTS id=4 TYPE="ADVERTISEMENT OF COMPANY" STATE DESIGNATION="2"〉
⎜               〈COMPANY NAME〉BIC CAMERA〈/COMPANY NAME〉
⎜               〈CATEGORY〉PC PERIPHERAL EQUIPMENTS〈/CATEGORY〉
⎜          〈/CONTENTS〉
⎜     〈/USE CONDITION CONTENTS〉
⎩ 〈/APPLICATION ATTRIBUTION〉
```

TELEVISION BROADCAST RECEIVING APPARATUS

BACKGROUND OF THE INVENTION

1. Field of the Invention

The present invention relates to an apparatus for receiving a television broadcast and executing an application program.

2. Related Background Art

In recent years, there has been operated a system which digitizes a television broadcast signal, transmits a digitized television broadcast via a broadcast satellite, a communication satellite or the like, and receives it at home.

With introduction of a digital television broadcast, a television broadcast receiving apparatus (a television image receiver) at home or the like is seemingly changing from one subjected to viewing to one subjected to a tool.

For example, with broadcast digitization, a television which conventionally has been only means for viewing a program to be broadcast is capable of receiving radio waves in which motion images, voices, and a variety of data or the like are multiplexed and displaying a variety of data or the like according to a user's remote controller operation.

Further, in BS digital broadcasting, data broadcasting service has already been started. This service enables a broadcast station to transmit display data or data group including a script program to be superimposed on a television broadcast wave. Further, it enables a television receiving apparatus to receive a television broadcast wave, store the received data, and display on a screen the data stored according to the user's remote control operation.

On the other hand, conventionally, an environment for primarily utilizing an application program is achieved by a personal computer. In the case where a user utilizes an application program on a personal computer, the user must pay a predetermined amount of charge to a software sales company that provides such an application program. In this manner, the user can utilize the application program on the personal computer.

Specifically, the user purchases a package of one's desired application program from the software sales company, and installs the purchase application program in the personal computer. By making the personal computer operate, the user provides an access to one's desired application program provider via Internet or the like, inputs user information such as one's credit card number, and then downloads such an application program.

Alternatively, by making the personal computer operate, the user provides an access to one's desired application program provider via Internet or the like, downloads the application program, makes payment of the charge, receives disclosure of a key code from the application program provider, and then utilizes the application program.

However, in the digital broadcast receiving apparatus as described above, only execution of a partial script or program included in data of a broadcast program has been possible. In addition, such execution has been possible only during program broadcasting.

That is, in the conventional television broadcast receiving apparatus, it has been impossible to meet a request for primarily utilizing an application program in order for the user to achieve a predetermined objective.

In order to achieve an environment in which an application program can be primarily utilized, for example, incorporating the use environment of the application program into a TV in the same way as in a personal computer is considered as a comparatively simple means.

However, even with such a configuration, there are some problems as described below.

A first problem is that a user cannot utilize an application program easily.

For example, in order for the user to utilize an application program, it has been necessary for the user to purchase a application program package from a seller in the same way as a personal computer. Alternatively, it has been necessary for the user to follow procedures for downloading the application program via Internet or the like, paying the charge, and inputting a key code for releasing use restriction.

A second problem lies in a television broadcast station. That is, if the user frequently utilizes an application program primarily on the television broadcast receiving apparatus, opportunities for viewing programs are reduced, resulting in decrease in incomes such as an advertisement income.

As means for solving the first problem, for example, in JP-A-09-251714, there has been proposed a technique in which an application can be utilized somewhat easily by enabling trial use of software, as a scheme of controlling utilization of application software.

However, in the technique disclosed in the above publication, in the case where the user frequently utilizes an application program, it has been necessary for the user to pay the charge in the same manner as conventionally. In addition, it has been impossible to solve the second problem.

In the television broadcast receiving apparatus as described above as well, there is a demand for an environment in which the user can primarily utilize an application program any time when the user wants to. With respect to application program utilization, there is a strong demand for easily using an application program, and further, using it free of charge if possible.

In particular, in the use environment of a television broadcast in which it is basically common sense to view a program free of charge, there is a strong demand for setting a similar environment for application programs.

For example, a company's application software development requires a tremendously large amount of capital, whereas service for delivering application software to a user free of charge is sometimes carried out.

However, this service assumes that the user purchases from the company the hardware, operating software or the like which is indispensable to utilize the same company's application software (programs). Thus, there has been a problem that companies (business entities) capable of providing such service are limited.

For example, in a distributed data processing system described in JP-A-2001-43282, the user's online communication cost is reduced by inserting an advertisement into part of a WWW browser display, thereby making it possible to easily utilize an application program.

However, in the above-described system, the application programs available to a user are limited to Internet contents browsing applications. Therefore, it has been impossible to apply the system to an application program which does not carry out an Internet connection.

SUMMARY OF THE INVENTION

It is an object of the present invention to solve the problems described above.

It is another object of the present invention to provide a television receiver in which applications are primarily available for use, and to achieve an environment for easily utilizing applications unique to a television broadcast receiving apparatus.

In order to achieve such objects, according to one aspect of the present invention, there is provided a receiving apparatus comprising:

receiving means for receiving a television broadcast;
broadcast data processing means for generating image data on the basis of television broadcast data received by the receiving means and outputting the image data to a monitor device;
application executing means for executing an application program; and
control means for controlling an execution an application program by the application executing means on the basis of a state of outputting the image, data associated with a predetermined broadcast program to the monitor device.

The other objects and features of the present invention would have been obvious over the detailed description of embodiments of the invention with reference to drawings which follow.

BRIEF DESCRIPTION OF THE DRAWINGS

FIG. 4 is a view showing another example of contents of an application attribution data file;

FIG. 9 is a view showing the contents of an application management table;

FIG. 12 is a flow chart showing a condition acceptance confirming processing operation of the application execution control module;

FIGS. 13A and 13B are views each showing a display screen after application startup;

FIG. 14 is a view showing an operation selection menu screen to be displayed in the case where a condition is not accepted while in application startup processing;

FIG. 23 is a diagram showing a software configuration of a television broadcast receiving apparatus in a second embodiment of the invention;

FIG. 26 is a diagram showing a software configuration of a television broadcast receiving apparatus in a fourth embodiment of the invention;

FIG. 27 is a view showing contents of a viewing history table in the fourth embodiment;

FIG. 28 is a flow chart showing an condition acceptance confirming processing operation in the fourth embodiment;

FIG. 31 is a view showing contents attribution data;

FIG. 42 is a view showing contents attribution data in the sixth embodiment;

FIG. 43 is a view showing application attribution data in the sixth embodiment;

DESCRIPTION OF THE PREFERRED EMBODIMENTS

Hereinafter, preferred embodiments of the present invention will be described with reference to the accompanying drawings.

First Embodiment

In the present embodiment, a description will be given with respect to a case in which the present invention is applied to a television receiving apparatus shown in FIG. 1.

In the present embodiment, in a broadcast station for digital broadcasting, video data, voice data, and broadcast data contained in a television program are encoded, and the respective encoded data are multiplexed to be modulated. Then, the modulated data is transmitted as broadcast waves from the broadcast station's antenna. The broadcast waves transmitted from the broadcast station's antenna are received by the digital television receiving apparatus 100 via a broadcast satellite (BS).

The broadcast data used here denotes data containing:

"service information data" (SI data) which indicates broadcast channels or the contents of broadcast programs;

"data broadcast contents data" containing text data described in a markup language, image data, and voice data; and "application data" containing application program codes and its associated data files.

Hereinafter, the digital television receiving apparatus 100 of the present embodiment which receives and processes broadcast waves including such broadcast data will be specifically described. Configuration of digital television receiving apparatus 100 and a series of operations.

Figure 1:
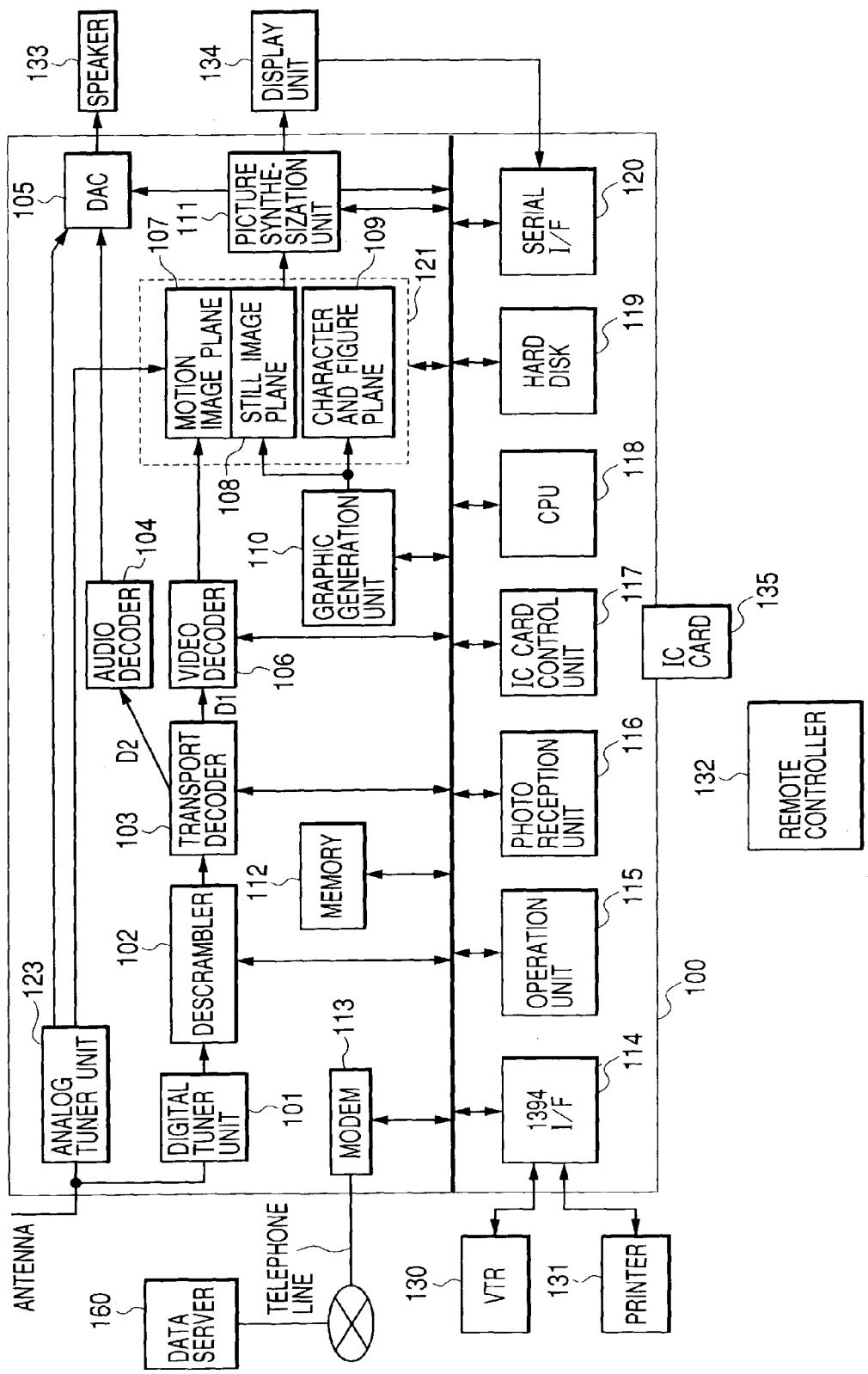
FIG. 1 is a block diagram depicting a configuration of a television broadcast receiving apparatus to which the present invention is applied.

In the digital television receiving apparatus 100 shown in FIG. 1, an antenna 160 receives a broadcast wave from a broadcast station. The thus received wave is inputted to an analog tuner unit 123 or a digital tuner unit 101 depending on whether the wave is intended for digital broadcasting or analog broadcasting.

The analog tuner unit 123 selectively inputs a signal of a frequency band of a channel selected by a user's operation or the like from the received waves (analog broadcast waves) of the antenna 160. This tuner unit then digitizes an analog television signal (such as a television broadcast signal in accordance with an NTSC scheme), outputs voice data to a D/A converter (DAC) 105, and outputs video data to a graphic buffer 121.

The DAC 105 and graphic buffer 121 will be described later.

On the other hand, the digital tuner unit 101 selectively inputs a signal of a frequency band of a channel selected by a user's operation or the like from the received waves (digital broadcast waves) of the antenna 160. Then, this tuner unit carries out processing for demodulation, error correction and the like relevant to an input signal, generates digital data (TS data) whose format is called a transport stream (TS), and outputs the data to a descrambler 102.

In the case where TS data from the digital tuner unit 101 is TS data scrambled for viewing restriction, the descrambler 102 carries out processing for descrambling based on key information for descrambling contained in TS data and key information outputted from an IC card control unit 117 described later, and outputs the descrambled TS data to a transport decoder 103.

In addition, the descrambler 102 outputs TS data to the transport decoder 103 in the case where scramble processing for viewing restriction is not carried out on TS data from the digital tuner unit 101.

An IC card 135 having read information from the IC card control unit 117 records user contract information and key information or the like for decoding key information for descrambling contained in TS data obtained from received waves.

In the case where key information for decoding key information for descrambling in the descrambler 102 is recorded in the IC card 135, the IC card control unit 117 reads out the key information from the IC card 135 in order to decode descrambling key information, and outputs the information to the descrambler 102 via a bus 122.

The IC card 135 stores accounting information of a charged application and charged contents utilized by the user, for example, as well as contract information and key information.

The transport decoder 103 extracts packet data which corresponds to a program selected by a user, from TS data generated from the descrambler 102, distributes video data, voice data, and broadcast data (encoded data) on a packet by packet basis, and outputs them.

The video decoder 106 decodes encoded video data obtained by the transport decoder 103, and outputs the decoded data to a motion image plane 107 in a graphic buffer 121. In the case where video data is outputted from the analog tuner unit 123, the video data is outputted to the motion image plane 107.

The audio decoder 104 decodes encoded voice data obtained by the transport decoder 103, and outputs the decoded data to the digital/analog converter (DAC) 105.

The DAC 105 analogizes (converts to analog) voice data from the audio decoder 104, and outputs the analogized data from a speaker 133.

A CPU 118 reads out and executes a predetermined processing program, and controls an operation of the whole digital television receiving apparatus 100.

For example, the CPU 118 temporarily captures encoded broadcast data obtained by the transport decoder 103 via the bus 122 in a memory 112, and reads out the data from the memory 112 and decodes it. Then, the CPU stores the decoded broadcast data in a hard disk 119 via the bus 122.

Further, the CPU 118 carries out a variety of data processing operations by reading out and executing the application programs stored in an internal memory, and transfers data to a graphic generation unit 110 to carry out graphic display control.

The graphic generation unit 110 generates character or graphic image data on the basis of data supplied from the CPU 118, and transfers the image data to a character and figure plane 119 or a still image plane 108 of the graphic buffer 121.

A picture synthesization unit 111 executes synthesization processing or change processing of data stored in the motion image plane 107, the character and figure plane 109, and the still image plane 108 which are incorporated in the graphic buffer 121, and outputs the stored data to a display unit 134. The display unit 134 displays the data from the picture synthesization unit 111 on a screen.

To the bus 122, an IEEE 1394 interface 114, a modem 113, a serial interface 120 capable of communicating with the display unit 134, a photo reception unit 116 of a remote controller 132, and an operation unit 115 for accepting a variety of operational instructions from a user are connected together with the descrambler 102, memory 112, transport decoder 103, video decoder 106, graphic generation unit 110, graphic buffer 121, picture synthesization unit 111, hard disk 119, IC card control unit 117, and CPU 118.

The constituent elements each connected to the bus 122 can communicate with each other via the bus 122.

The IEEE 1394 interface 114 is intended for making protocol communication with a VTR 130 or a printer 131 externally connected to a main frame of the digital television receiving apparatus 100.

The modem 113 is an interface for connecting to a network such as Internet via a telephone line. For example, this modem is used for making information communication with a broadcasting service provider's data server 150 over the network.

Figure 2:
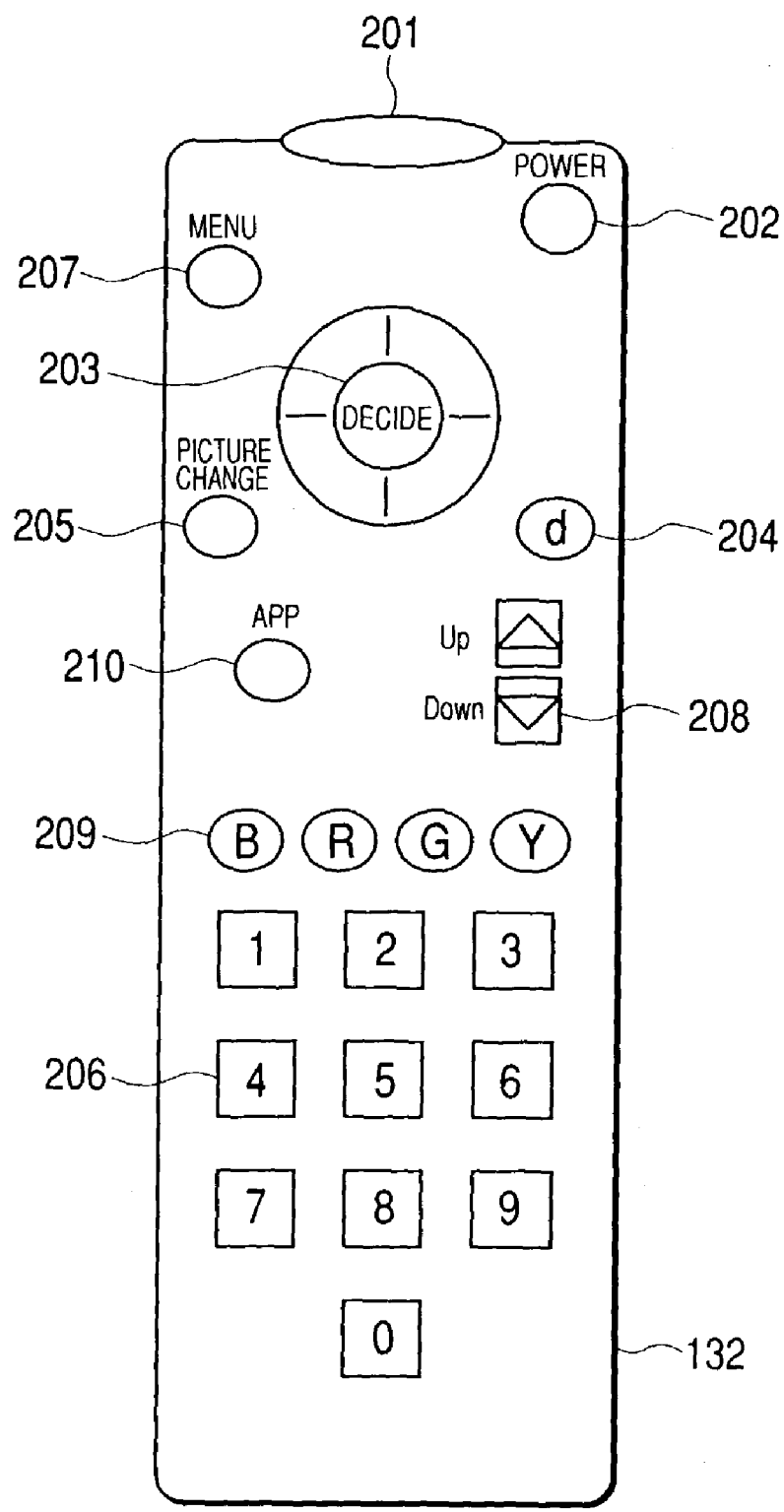
FIG. 2 is a view showing a configuration of a remote controller of the television broadcast receiving apparatus.

FIG. 2 is a view showing an example of configuration of the remote controller 132.

The configuration of the remote controller 132 is not limited to that shown in FIG. 2. FIG. 2 shows only buttons for making operation for implementing functions required for explanation of the present embodiment. Actual television broadcast reception and buttons required for the process are not limited thereto.

In FIG. 2, reference numeral 201 denotes a photo emission unit for infrared ray communication between the remote controller 132 and the photo reception unit 115 of the digital television receiving apparatus 100 shown in FIG. 1. Reference numeral 202 denotes a power supply key for turning ON/OFF a power source of the digital television receiving apparatus 100. Reference numeral 203 denotes a stick-shaped cursor key. Structurally, this cursor key is tilted vertically (longitudinally) or horizontally, thereby achieving cursor movement inputs in four directions, and the stick itself is pushed-in, thereby achieving a "decision" input.

Reference numeral 204 denotes a "d" key (a "d" button) for displaying a data broadcast obtained from digital broadcast waves. Reference numeral 205 denotes a screen display change key for changing a screen display on the display unit 134. Reference numeral 206 denotes a numeric key arranged in a matrix manner, and reference numeral 207 denotes a menu button for displaying a menu screen on the display unit 134.

Reference numeral 208 denotes an UP/DOWN key which consists of two keys, i.e., UP and DOWN keys. Reference numeral 209 denotes a color key, wherein four-color buttons consisting of blue, red, green, and yellow are arranged transversely in line. Reference numeral 210 denotes an application key for displaying an application selection list on the display unit 134.

Variety of Data Handled by Digital Television Receiving Apparatus 100

When a digital broadcast is received, for example, data broadcast contents data and application data contained in the above described broadcast data are repeatedly transmitted as digital data from a broadcast station to the digital television receiving apparatus 100 in accordance with a DSM-CC data Carousel scheme specified under ISO/IEC1381-6.

Data broadcast contents data is composed of: a text file containing character information, display layout information, and script information; an image data file; a video data file; and a voice data file. The text file is prescribed in accordance with an XML eXtensible Markup Language) specified under W3C.

On the other hand, application program data (application data) contains: a byte code file (hereinafter, referred to as a "class file") that is obtained by compiling in advance a source code described in a JAVA® language; an image data file; a voice data file and a parameter file containing parameters required for other processing; and an application attribution data file (condition data) described later. In the present embodiment, the program data is of a format of one file to which archive processing is carried out in advance by JAR (Java® ARchive) processing.

Figure 3:
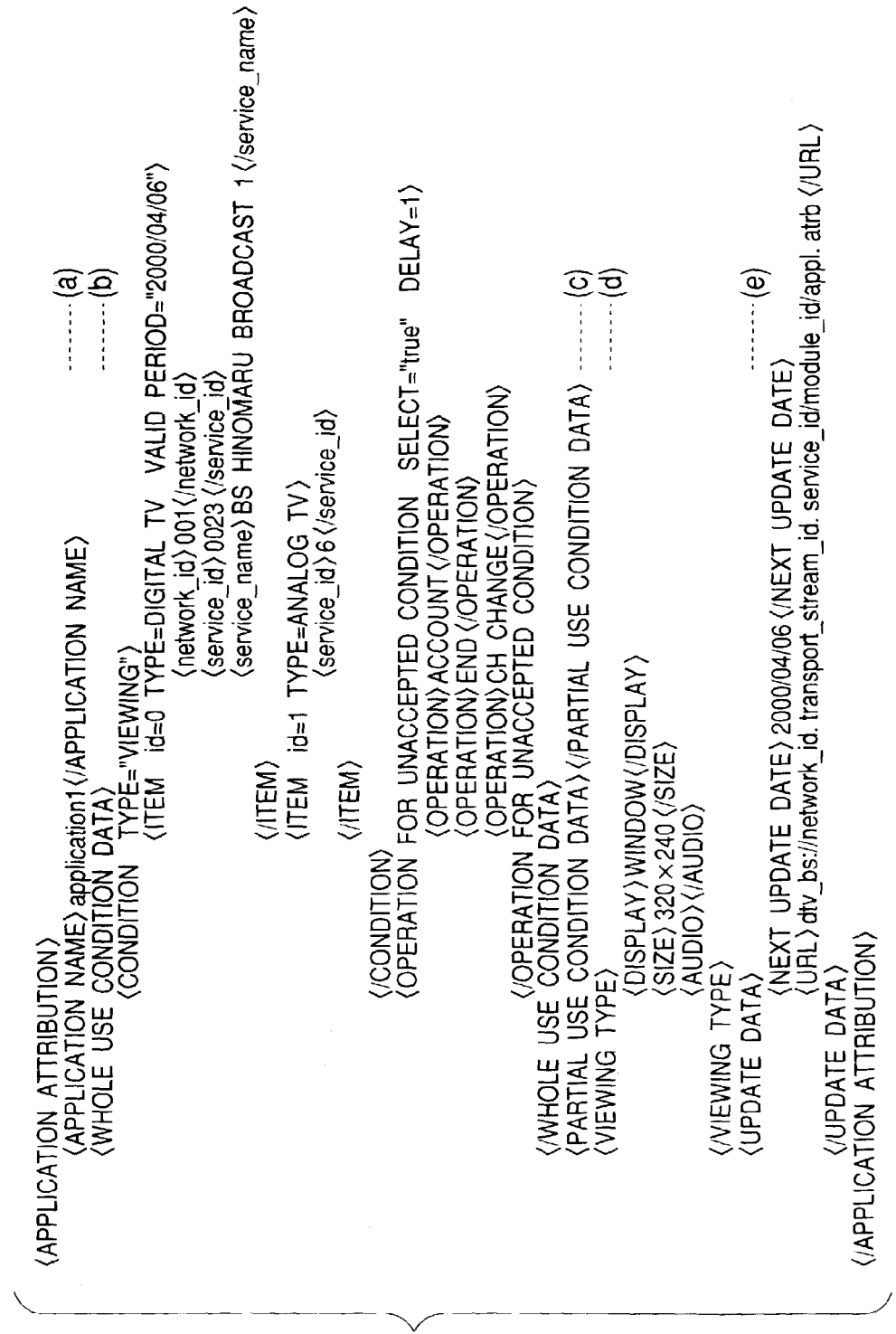
FIG. 3 is a view showing an example of contents of an application attribution data file.

FIGS. 3 and 4 are views each showing an example of contents of an application attribution data file.

The application attribution data is described in an XML format. In the application attribution data, elements being the contents of data are described in a region enclosed within a start tag < > and an end tag < >. The start tag and end tag include element names. Each element has a hierarchical structure such that one element can include another element.

The application attribution data shown in FIG. 3 contains in an element of application attribution: an element indicating an application name in an application attribution element (a); an element indicating a use condition of the whole applications (b); an element indicating a use condition of part of applications (c); an element indicating a viewing format during application execution (d); and an element indicating information for updating application attribution data.

In addition, the application attribution data contains a <condition> element and an <operation for unaccepted condition> element as internal elements of a <whole use condition data> element indicating a use condition of the whole applications. Further, it contains an <item> element as an internal element of those elements.

The <item> element contains: a "type" attribute for identifying an analog TV broadcast and a digital TV broadcast from each other; a network ID element for discriminating a BS digital broadcast in digital TV broadcasting, a ground wave digital broadcast, and a CS digital broadcast or the like from each other; a service ID element for primarily discriminating channels and broadcast stations; and a service name element.

The <operation for unaccepted condition> element contains an element indicating an operation for accounting, terminating, channel (CH) change or the like.

A <viewing type> element contains elements for parameters for displaying a television program screen to be displayed and reproduced while in execution of an application and for voice parameters.

An <update data> element contains: date and time information when next update data is to be released; and a URI (Uniform Resource Indicator) character string for acquiring the data thereon.

On the other hand, the application attribution data shown in FIG. 4 contains a <partial use condition data> element indicating a use condition of part of applications.

The <partial use condition data> element contains a <permitted portion> element indicating a portion permitted for use from among the use portions and a <condition> element indicating a condition for permitting the use.

A <condition> element contains an <item> element. The <item> element contains an event ID element which specifies a program; an event name element; an audio level element for specifying a lowest volume rate during viewing and the like.

Software Configuration of Digital Television Receiving Apparatus 100

Figure 5:
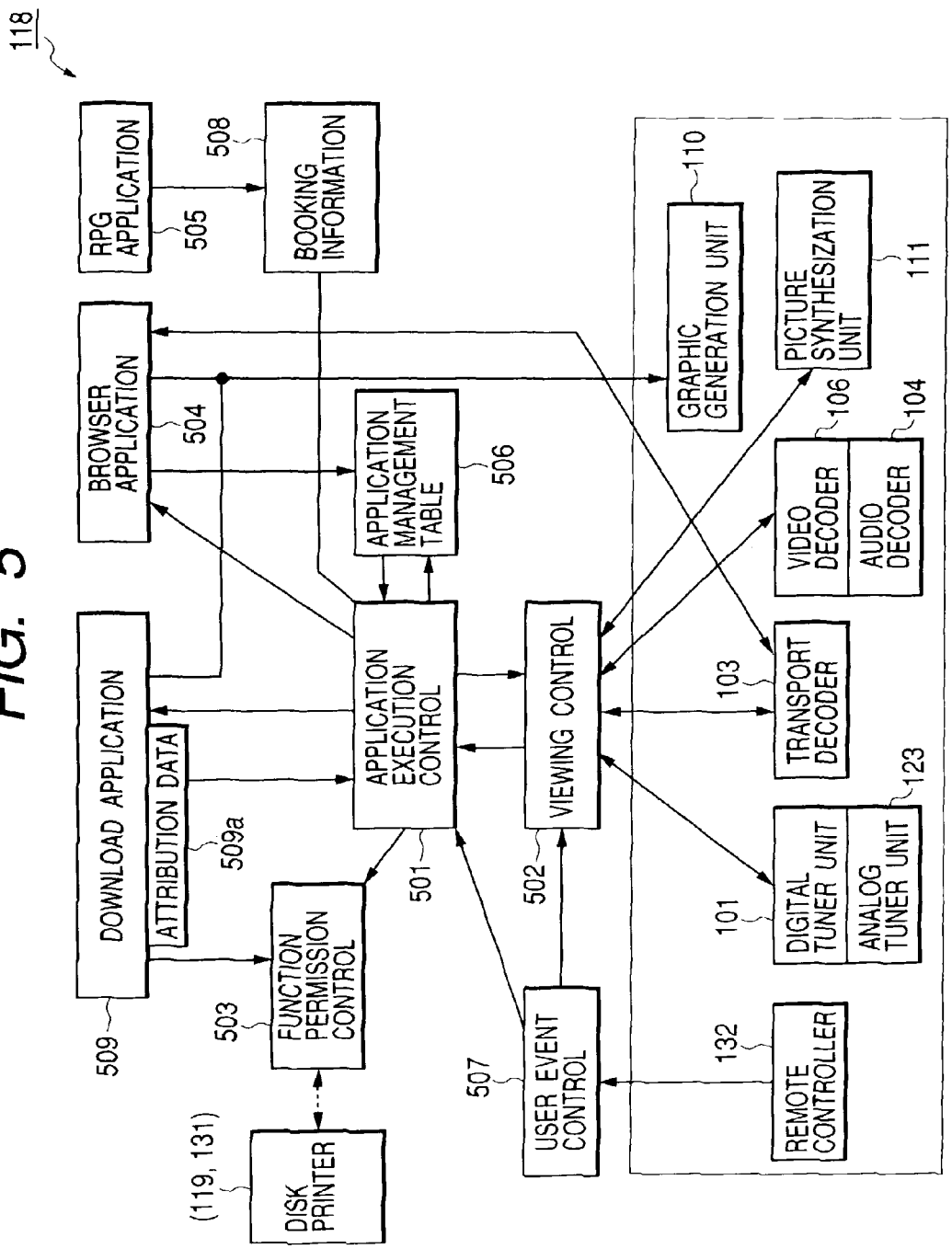
FIG. 5 is a diagram showing a software configuration of the television broadcast receiving apparatus.

FIG. 5 is a diagram showing a functional configuration of software executed by the CPU 118 in the digital television receiving apparatus 100.

Functions implemented by the CPU 118, as shown in FIG. 5, contain: an application execution control unit 501; a viewing control unit 502; a function permission control unit 503; a browser application 504; an EPG application 505; an application management table 506; a user event control unit 507; booking information 508; and a download application 509.

The viewing control unit 502 is a module which implements decode processing of a broadcast wave (broadcast reception stream) and video image display control or the like while controlling hardware which contains the digital tuner unit 101, analog tuner unit 123, transport decoder 103, video decoder 106, audio decoder 104, and picture synthesization unit 111.

The application execution control unit 501 is a module which controls application execution. In the present embodiment, the application execution control module 501 controls any one of the download application 509, browser application 504, and EPG application 505 so as to be in operation.

The application management table 506 and booking information 508 each are a data module which contains: table information for managing application execution; and schedule information for viewing booking or recording booking.

The user event control unit 507 is a module which receives user input from the remote controller 132, and transmits an event to the viewing control module 502 and application execution control module 501 on the basis of the user input.

The function permission control unit 503 is a module which controls whether or not to permit an access request for a system resource owned by the digital broadcast receiving apparatus 100 of the present embodiment, such as a file access from an application, a network access, and a printer access.

The download application 509 is acquired from broadcast waves by download processing described later, and is temporarily stored in the hard disk 119. Here, the download application 509 is assumed to be in an executed state. Attribution data 509a is a data module having the contents of the application attribution data shown in FIGS. 3 and 4.

The browser application 504 and EPG (Electronic Program Guide) application 505 are stored in advance in the hard disk 119. Here, the browser application 504 and EPG application 505 each are assumed to be in an executed state.

Specific Operation of Digital Television Receiving Apparatus 100

Now, an operation of the digital television receiving apparatus implemented by software configuration shown in FIG. 5 will be described.

Figure 6:
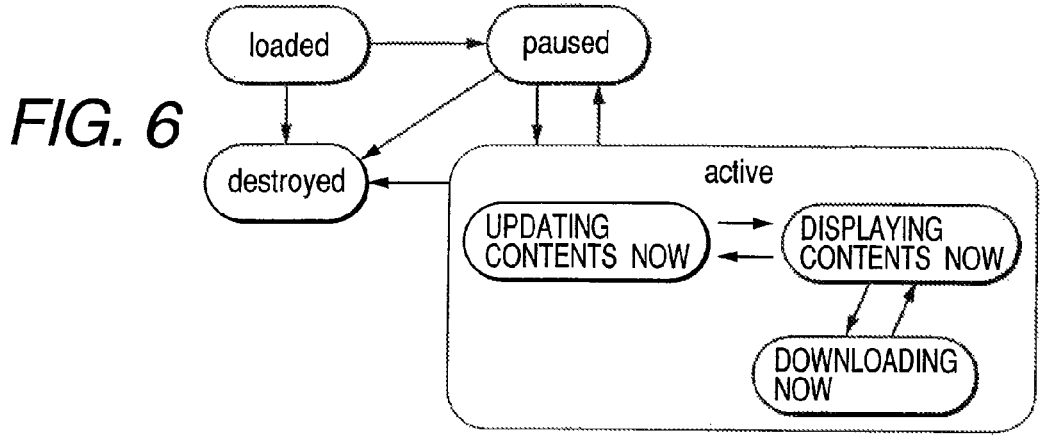
FIG. 6 illustrates transition of an operation state of a browser application.

FIG. 6 is a flow chart showing a state transition of an operation of the browser application 504.

In the present embodiment, another application as well as the browser application 504 has four states, i.e., "Loaded," "Paused," "Active," and "Destroyed" states shown in FIG. 6, and transition between these states is controlled by the application execution control module 501.

The application execution control module 501 first loads the browser application 504 stored in the hard disk 119 and enters the "Loaded" state. Next, this module carries out initialization, enters the "Paused" state, and is changed to the "Active" state, whereby the browser application 504 is executed. The browser application 504 is executed, for example, in the case where the user depresses the "d" button 204 of the remote controller 132, or in the case where the user selects execution of the browser application 504 on the application list display screen described later.

The browser application 504 is changed to the "Active" state by the application execution control module 501. In addition, when the internal state is in a "UPDATING CONTENTS NOW" state, the transport decoder 103 is controlled, thereby, for example, starting reception of data broadcast contents transmitted in accordance with the Data Carousel scheme. Then, the XML data for screen display on the display unit 134 or associated data such as image or motion image specified by the XMP data is acquired from the data broadcast contents, and the acquired data is stored in the memory 112 or hard disk 119.

Then, the browser application 504 controls the graphic generation unit 110 based on the layout information contained in the XML data, thereby displaying the contents on the display screen of the display unit 134. In this manner, the browser application 504 goes to a "DISPLAYING CONTENTS NOW" state.

Figure 7:
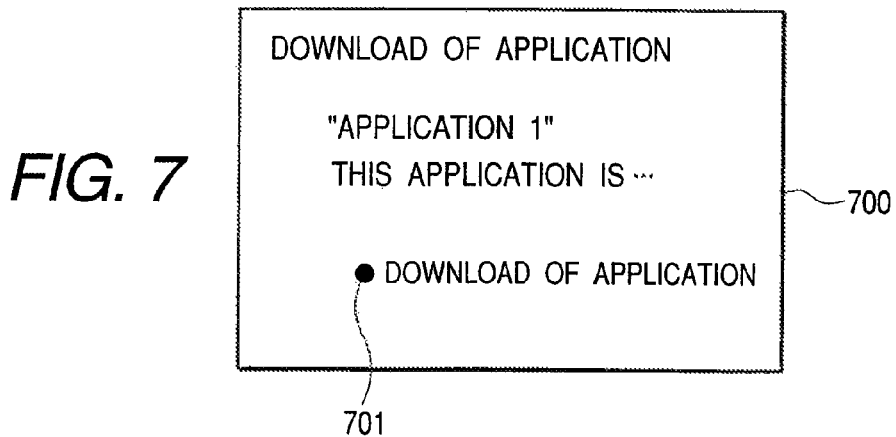
FIG. 7 is a view showing a display screen for data broadcast contents capable of downloading an application.

FIG. 7 is a view showing an example of a display screen 700 using the browser application 504. In the display screen 700, a portion "downloading application" is displayed as red, for example.

The display screen 700 shown in FIG. 7 is a display screen example of contents for downloading applications. The user can download an application by depressing a button 701 of the display screen 700.

When the browser application 504 enters the "DISPLAYING CONTENTS NOW" state, the browser application 504 acquires an event operated by a user using the remote controller 132 from the application execution control module 501, and carries out an operation corresponding to the event.

For example, the user makes a predetermined button operation (pressing operation of the button 701) on the remote controller 132 while the screen 700 shown in FIG. 7 is displayed. In this manner, the browser application 504 goes to the "DOWNLOADING NOW" state, and the operation shown in FIG. 8 is carried out, for example.

Figure 8:
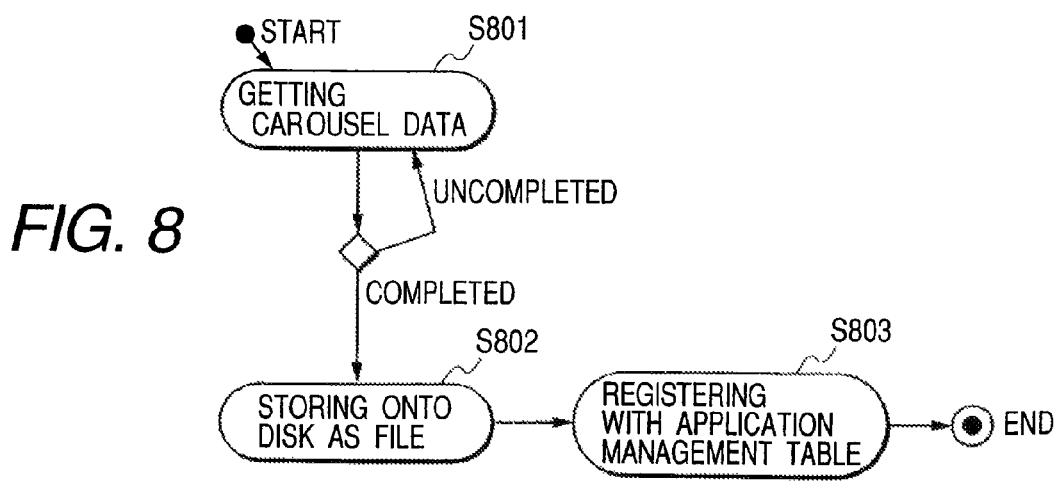
FIG. 8 is a flow chart showing download processing operation of the browser application.

That is, as shown in FIG. 8, the transport decoder 103 is controlled in the same way when the screen display data is acquired, so that the browser application 504 receives and acquires the application data transmitted in the Data Carousel scheme (step S801). When this operation completes, the application data is stored in the hard disk 119 as a file (step S802).

The application data used here contains as an application program main body, a byte code file, required image data or voice data, and an application attribution data file as described above.

The browser application 504 then registers data in the application management table 506 in accordance with the contents of the application attribution data files contained in the application data (step S803), and terminates this process.

FIG. 9 is a view showing an example of the contents of the application management table 506.

As shown in FIG. 9, the application management table 506 registers therein information on the applications currently stored in the hard disk 119.

In the present embodiment, the browser application 504 and EPG application 505 are already registered in the application management table 506 (A and B, respectively).

The browser application 504 registers an application downloaded on the application management table 506 as shown in FIG. 9. In this manner, the information on download applications shown in "Application 1" is added to the application management table 506 (C).

Figure 10:
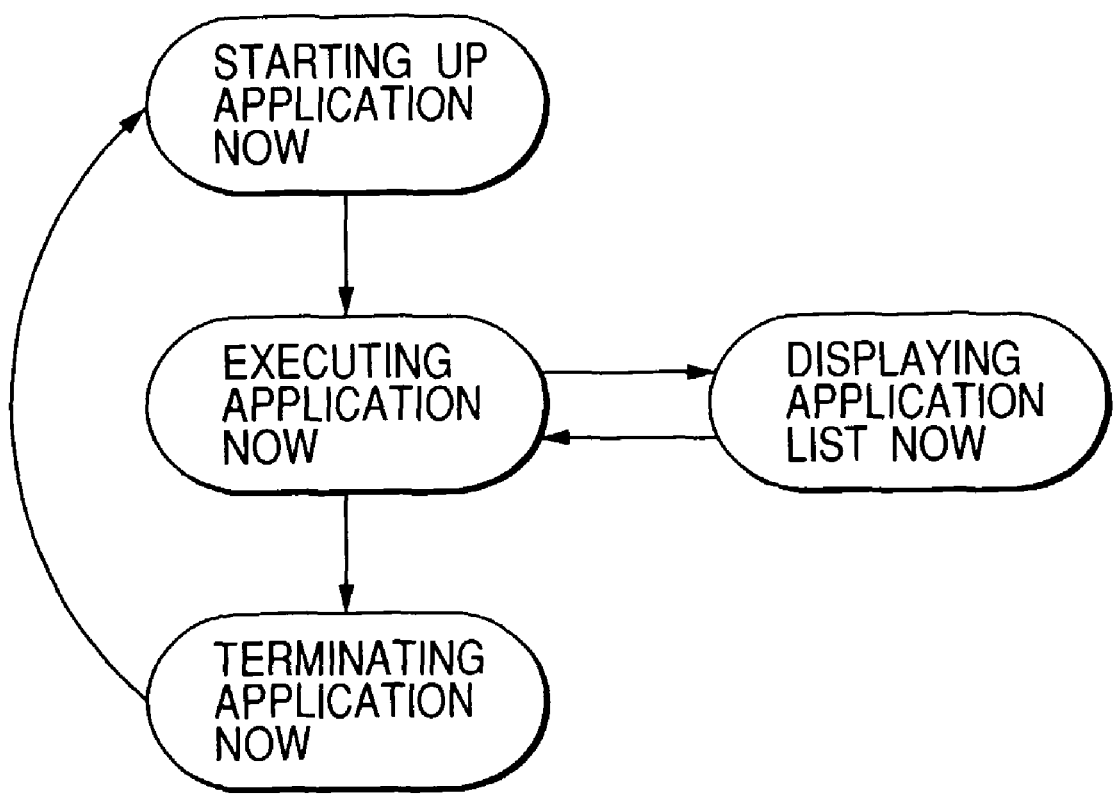
FIG. 10 shows transition of an operation state of an application execution control module.

The application execution control module 501 goes to its operation state, as shown in FIG. 10, for example.

That is, the application execution control module 501, as shown in FIG. 10, carries out startup processing of applications registered in the application management table 506 (a "STARTING UP APPLICATION NOW" state), termination processing (a "TERMINATING APPLICATION NOW" state), state change processing which governs a transition of four states ("Loaded," "Paused," "Active," and "Destroyed") of applications (an "EXECUTING APPLICATION NOW"), application list displaying described later (a "DISPLAYING APPLICATION LIST NOW" state), and the like.

Figure 11:
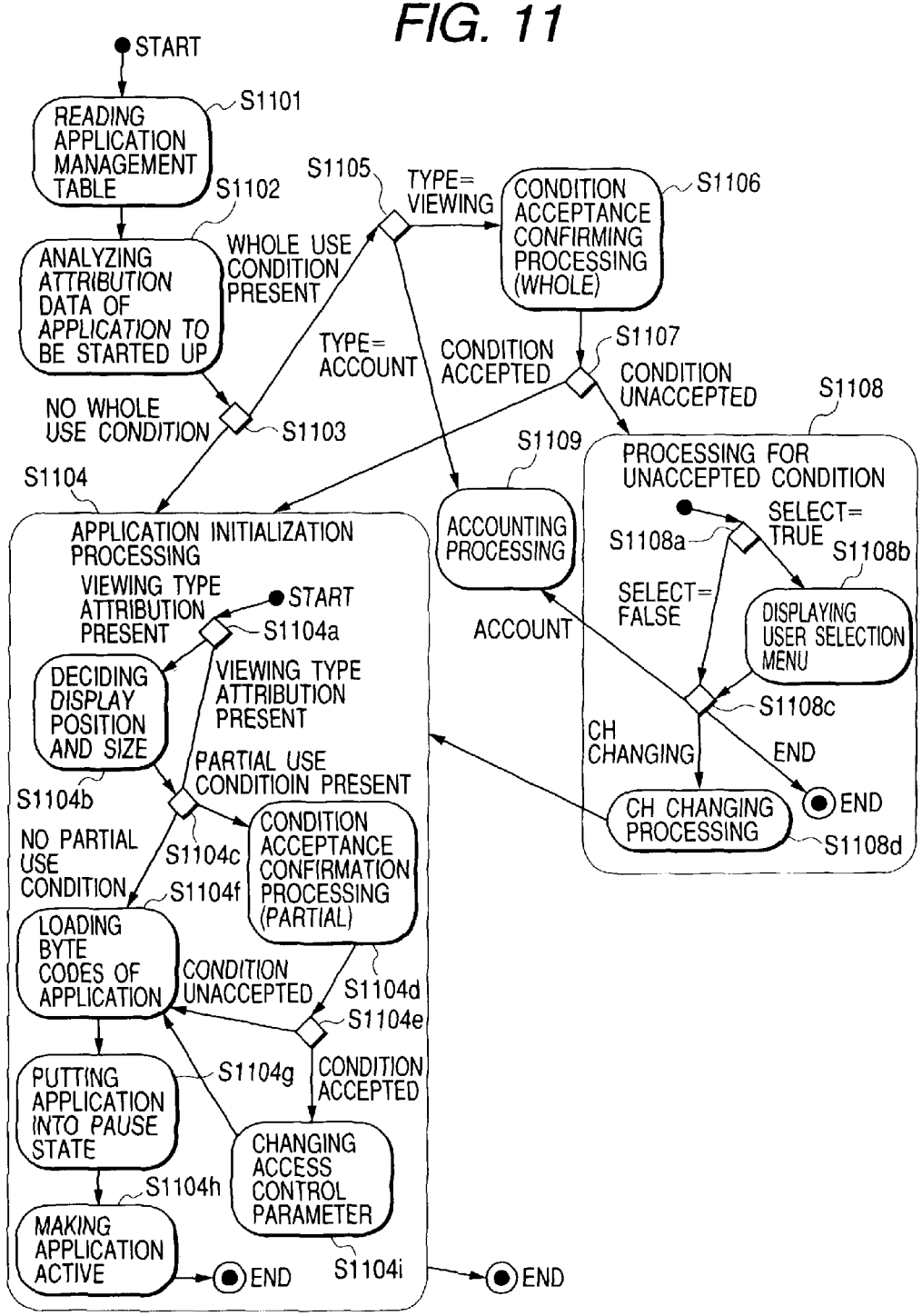
FIG. 11 is a flow chart showing an operation in a state in which an application of the application execution control module is started up.

FIG. 11 is a view showing an operation of the application execution module 501 in the "STARTING UP APPLICATION NOW" shown in FIG. 10. In FIG. 11, the filled circle "●" denotes that processing starts, the double-circle sign denotes that processing terminates, and the rhombus denotes judgment and divergence.

First, the application execution control module 501 reads the contents of the application management table 506 (step S1101), and analyzes attribution data of an application subjected to startup (a subject application) (step S1102).

The application execution control module 501 does not have a whole use condition as a result of analysis in step S1102. That is, in the case where attribution data is not contained in the whole use condition element (step S1103), subject application initialization processing (step S1104a to step S1104i) is executed (step S1104), and this process terminates.

On the other hand, as a result of analysis in step S1102, in the case where data is contained in the whole use condition (step S1103), the application execution control module 501 analysis type attribution of the whole use condition element (step S1105).

In the case where a viewing condition is set as a result of analysis in step S1105, the application execution control module 501 confirms whether or not a currently viewed service (channel) or program falls into such a condition (step S1106).

In the case where such condition is accepted as a result of execution of processing in step S1106, the application execution control module 501 executes subject application initialization processing (step S1104). In the case where such a condition is not accepted, this module executes (step S1108) processing for unaccepted condition (step S1108a to step S1108d). Thereafter, the application execution control module 501 executes subject application initialization processing (step S1104), and terminates this processing.

When a subject application sets an accounting condition as a result of analysis in step S1105, the application execution control module 501 executes accounting processing by the IC card control unit 117 (step S1109). Thereafter, the application execution control module 501 executes subject application initialization processing (step S1104), and terminates the processing.

FIG. 12 is a flow chart specifically showing condition acceptance confirming processing in step S1106 shown in FIG. 11. Here, two types of condition elements, i.e., a whole use condition and a partial use condition, are defined in the application management table 506. Which of these condition elements is subjected to comparison is determined as a parameter (an argument) when this process is called. For example, the whole use condition is subjected in step S1106 of FIG. 11.

First, the application execution control module 501 acquires information on a currently viewed service and program from the viewing control module 502 (step S1201). The information on these currently viewed service and program can be acquired based on SI information outputted from the transport decoder 103.

Then, the application execution control module 501 compares acquisition information of step S1201 with the contents of item elements contained in the whole (partial) use condition element (step S1202 and step S1203). Based on this comparison result, it is decided whether the condition is accepted (step S1204) or the condition is unaccepted (step S1205).

Specifically, the item element used here contains elements such as attribution for identifying a digital TV broadcast and an analog TV broadcast from each other and a broadcast network such as a BS digital TV broadcast or a terrestrial wave broadcast in digital TV broadcasting; service ID representing a channel, and a service name representing a channel name.

The application execution control module 501 judges whether or not information on network, service, and event (program) being viewed coincides with all of the item elements contained in the whole (partial) use condition element in step S1202. In the case where these items of information coincide with them (step S1203), it is decided that the condition is accepted (AND condition in step S1204).

For example, with an application (c) shown in FIG. 9, in the case where a currently viewed service and program coincide with information on network ID=001, service ID=0023, and service name=BS Hinomaru broadcast 1 in a digital TV broadcast that is a first item, or in the case where these service and program coincide with information on channel 6 in an analog TV broadcast that is a second item, it is decided that the condition is accepted (OR condition between items).

When the condition is accepted as a result of such condition acceptance confirming processing (step S1106), subject application processing is executed as shown in FIG. 11 (step S1104).

Specifically, in the case where a viewing type element is contained in attribution of an application (a subject application) in startup (step S1104a), the application execution control module 501 first generates a window for viewing a program displayed while in execution of an application, and decides the size and position on the basis of subject application element information (step S1104b).

Then, in the case where data exists in the partial use condition element (step S1104c), the application execution control module 501 executes condition acceptance confirming processing shown in FIG. 12 by setting the data as a parameter (step S1104d).

When the condition is unaccepted (step S1104e) as a result of execution of processing in step S1104d, the application execution control module 501 loads a subject application byte code in a memory (step S1104f). Then, this module calls a subject application initialization function to enter a "Pause" state (step S1104g), and further, calls an execution permission function to enter an "Active" state (step S1104h). Then, the module terminates this processing.

FIGS. 13A and 13B are views each showing an example of a screen state after subject application initialization processing. The screen shown in FIG. 13A is an example of a screen when an element for displaying a viewing type element is "WINDOW." FIG. 13B shows an example of a screen when the element is "BLEND."

Processing in case that the condition is accepted (step S1104e) as a result of execution of processing in step S1104d will be described later.

On the other hand, as shown in FIG. 11, in case that the condition is unaccepted as a result of condition acceptance confirming processing (step S1106), processing for unaccepted condition of the subject application condition is executed (step S1108).

Specifically, in the case where selection true is set as attribution data on the "operation for unaccepted condition" element in the application element table 506 (step S1108a), the application execution control module 501 displays the processing contents defined in the "operation" element in the element, as a list on the screen as shown in FIG. 14 (step S1108b).

On the other hand, in the case where selection=false, this module executes all the operation processes defined in the operation element (step S1108a and step S1108d).

For example, in the case where subject application data is data shown in FIG. 9, by setting selection=true, the menu screen (refer to FIG. 14) for the user to select next operation is displayed on the display unit 134.

In the case where the user selects "USE AFTER ACCOUNTING PROCESSING" on the menu screen, the application execution control module 501 executes accounting processing (step S1109). In the case where the user selects "NO USE OF APPLICATION (TERMINATE)" on the menu screen, the subject application startup processing is cancelled. In the case where the user selects "CHANGE TO CHANNEL CONFORMING TO USE CONDITION" (CH CHANGE) on the menu screen, this module carries out a request for changing a viewing service for the viewing control module 502 so as to conform to any condition of an item element contained in condition elements (step S1108).

Here, in the application initialization processing (step S1104), processing in case that the condition is accepted (step S1104e) as a result of execution of processing in step S1104d, will be specifically described.

In the following description, assume that application attribution data set as application 2 having the partial use condition element shown in FIG. 4 is registered in the application management table 506 by downloading the browser application 504.

In the case where the condition is accepted, the application execution control module 501 carries out parameter change for the function permission control module 503 (step S1104i).

The parameter in step S1104i denotes that the operation shown in the "operation" element is permitted for data or resource shown in the "subject" element by using a JAVA® class shown in a "class" element contained in the "permitted portion element."

Therefore, in the application attribution data file shown in FIG. 4, a "read, write" operation for a file "/applications/appl/data" using the "com.nettv.fileaccesscont" class and a "print" operation using the "com.newtv.printeraccess" class are permitted.

In addition, the application attribution data file shown in FIG. 4 contains specific program information on digital radio broadcast service and digital television broadcasting and information for specifying a viewing volume level relevant to an item element contained in the partial use condition element.

In this case, a program called network ID=001, service ID=0093, service name=BS Hinomaru radio 1 is viewed in the condition acceptance confirming processing in step S1104d. In the cases where the volume level is 10% or more, where a program indicated by network ID=001, service ID=0023, service name=BS Hinomaru broadcast, and event (program) ID=8443 is viewed, and where a program indicated by network ID=001, service ID=0023, service name=BS Hinomaru broadcast 2, and event name=Afternoon Wide Show is viewed, the partial use condition is accepted.

Figure 15:
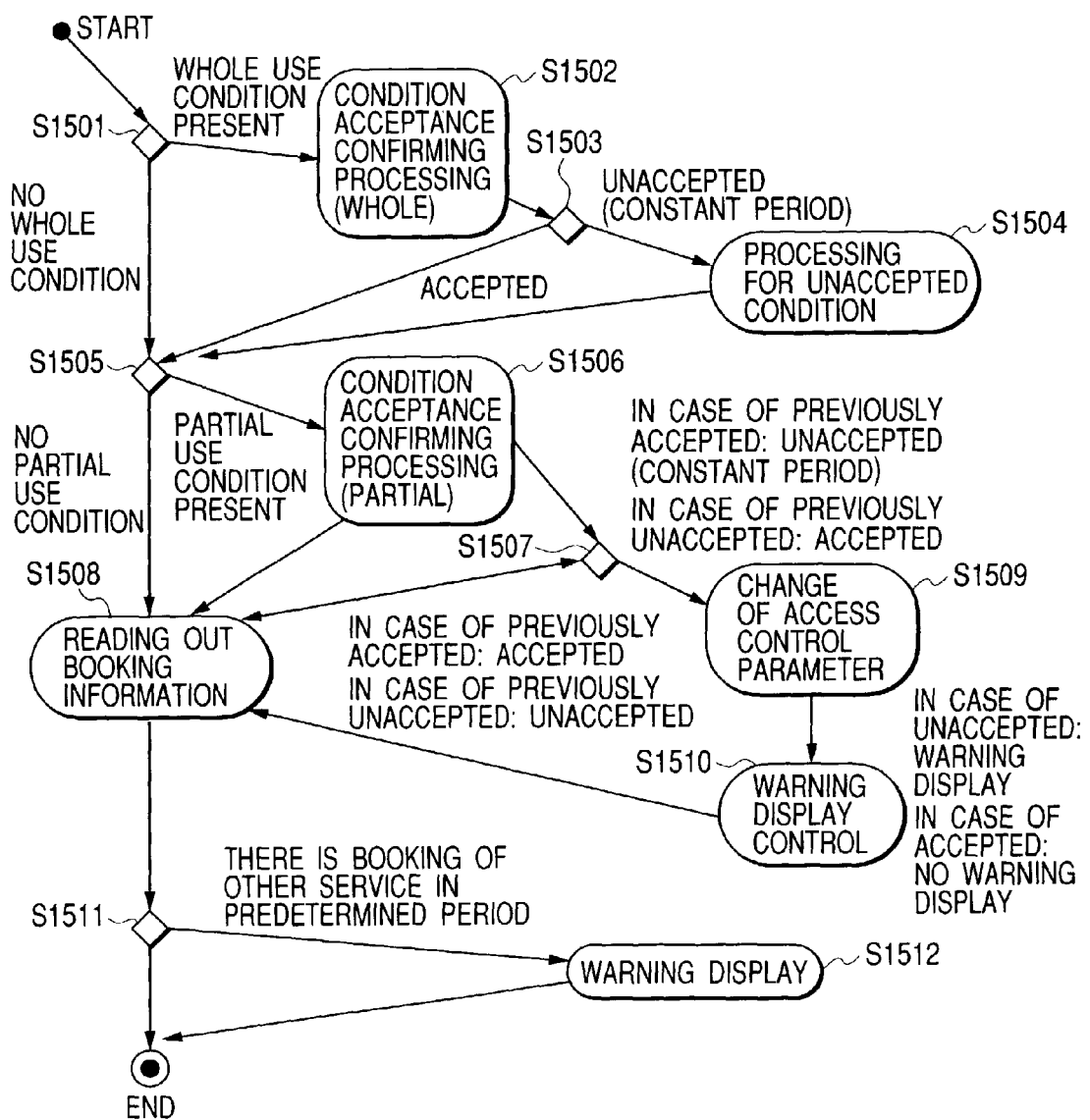
FIG. 15 is a flow chart showing an operation of the application execution control module while in execution of an application.

FIG. 15 is a flow chart showing an operation of the application execution control module 501 in the "EXECUTING APPLICATION NOW" state shown in FIG. 10.

Here, the application execution control module 501 carries out two periodic processings and an operation in a user input event while in execution of a subject application. One of these two periodic processings is called a timer 1 event processing. FIG. 15 shows a timer 1 event processing (operation in case that a timer 1 event occurs).

First, after the timer 1 event occurs, the application execution control module 501 analyzes information contained in the application management table 506. Then, this module judges whether or not data is contained in the whole use condition element relevant to the attribution of the application being execute (subject application) (step S1501).

In the case where data is contained in the whole use condition element as a result of judgment in step S1501, the application execution control module 501 executes the condition acceptance confirming processing shown in FIG. 12 using the condition element contained in the whole use condition element as a parameter (step S1502).

The application execution control module 501 continuously executes condition acceptance confirming processing during a predetermined period of time. In the case where the condition is unaccepted for a predetermined period of time (step S1503), this module executes processing for unaccepted condition as in step S1108 shown in FIG. 11 (step S1504).

On the other hand, when data is contained in the whole use condition element as a result of judgment in step S1501, the application execution control module 501 judges whether or not the partial use condition element is contained relevant to attribution of an application being executed (subject application) (step S1505).

In the case where data is contained in the partial use condition element as a result of judgment in step S1505, the application execution control module 501 executes condition acceptance confirming processing shown in FIG. 12 in accordance with a parameter for the "condition" element contained in the partial use condition element (step S1506).

In the case where the condition is unaccepted as a result of execution of processing in step S1506 and the condition has already been accepted in processing during startup or in previous processing of timer 1, the application execution control module 501 carries out change of an access control parameter relevant to the function permission control module 503 (step S1509).

For example, in the case of the application attribution data file shown in FIG. 4, a "read, write" operation for a file "/applications/appl/data" using the "com.newtv.fileaccesscont" class defined as a permitted portion element and a "print" operation using the "com.newtv.printeraccess" are set to "unaccepted."

Figure 16:
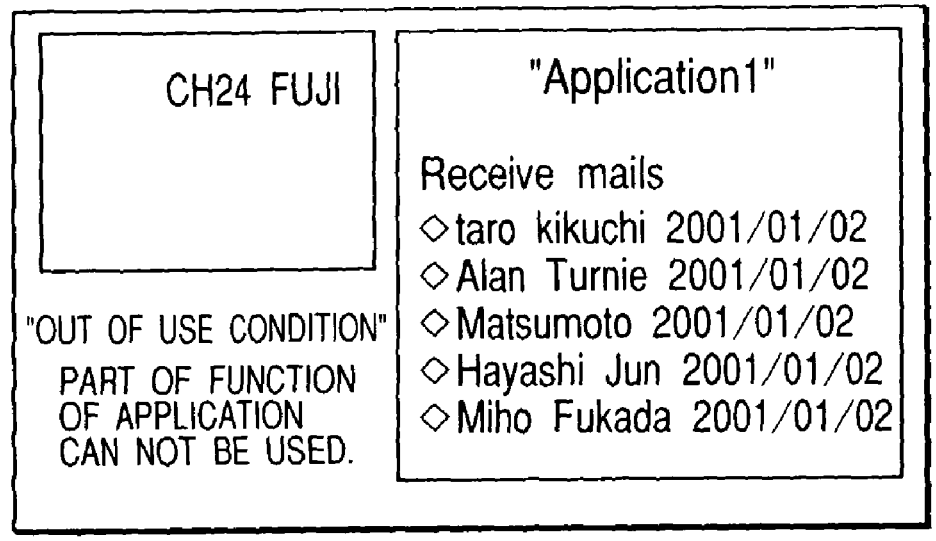
FIG. 16 is a view showing a warning display screen when it is sensed that a condition has not been accepted while in execution of an application.

The application execution control module 501 carries out warning display indicating the user that the use condition is unaccepted, as shown in FIG. 16 (step S1510).

On the other hand, in the case where the condition is accepted as a result of execution of processing in step S1506 and the condition has already been unaccepted in processing during startup or in previous processing of timer 1, the application execution control module 501 carries out change of an access control parameter relevant to the function permission control module 503 (step S1509). In this case, a "read, write" operation for a file "/applications/appl/data" using the "com.newtv.fileaccesscont" class and a "print" operation using the "com.newtv.printeraccess" class are set as "permitted," and warning display is released (step S1510).

When the condition is accepted or unaccepted in any of processing during startup and processing of timer 1, processing goes to step S1508 as is.

The application execution control module 501 reads out booking information in processing corresponding to an event of timer 1 (step S1508) and compares the booking information and current viewed channel (service) with each other (step S1511).

Figure 17:
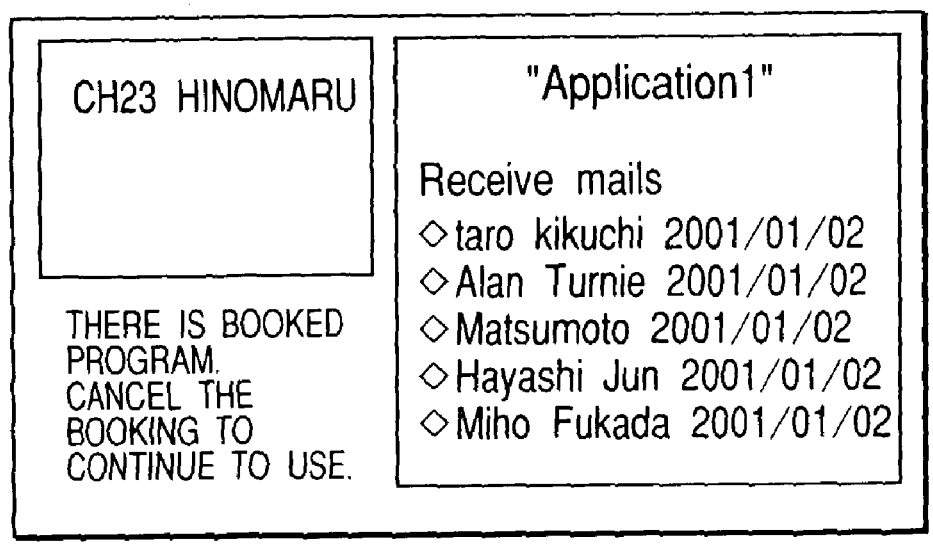
FIG. 17 is a view showing a warning display screen in the case where a set broadcast booking time has almost elapsed while in execution of an application.

Then, in the case where it is judged that there exists processing for recording or viewing booking using another channel within a preset time, as a result of comparison in step S1511, the application execution control module 501 carries out warning display for a user by the graphic generation unit 110, as shown in FIG. 17.

In such condition accepted state, in the case where a user utilizing an application changes a channel, the digital television receiving apparatus 100 operates as follows.

Figure 18:
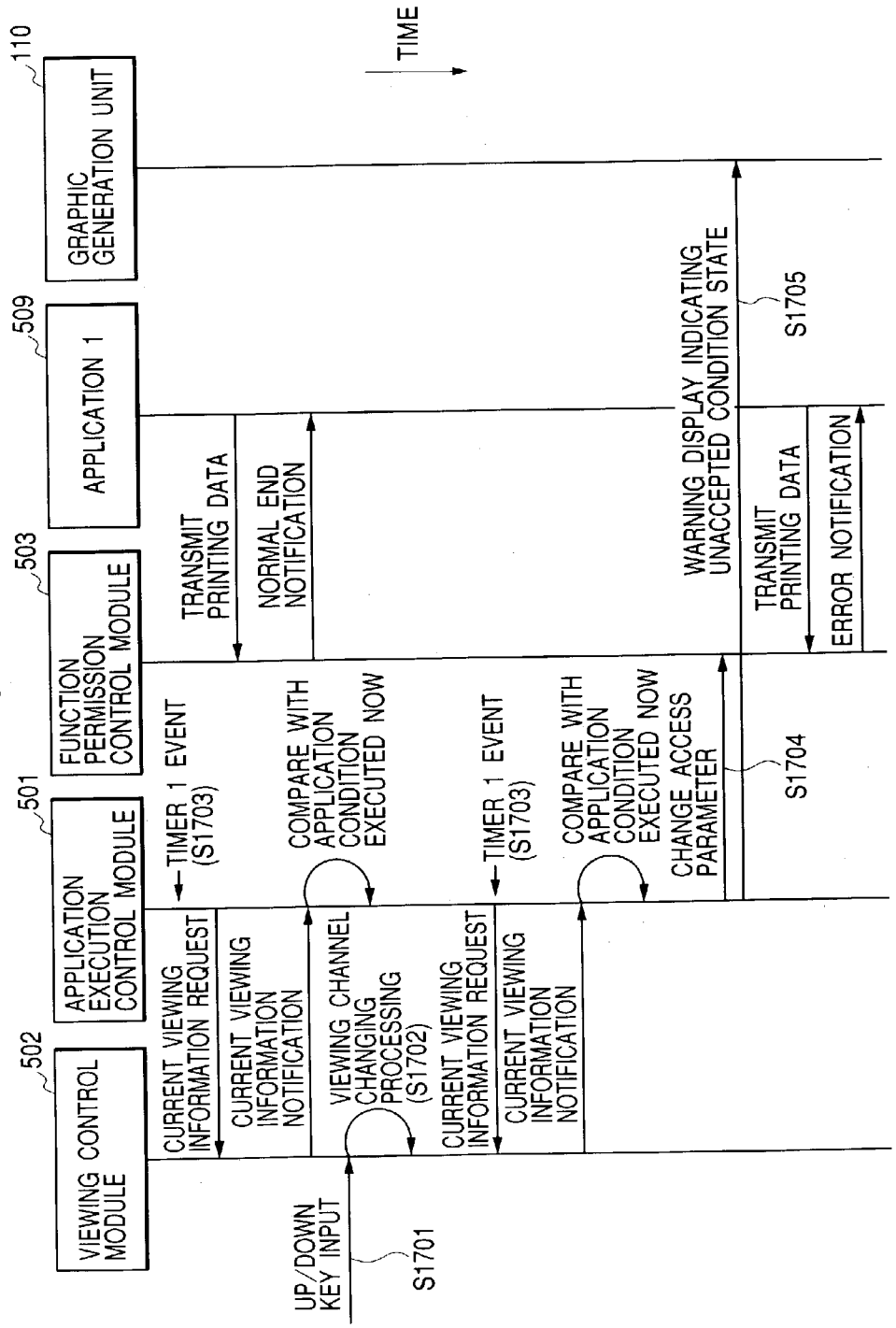
FIG. 18 is a diagram showing exchange between modules in the case where a user has changed a viewing channel while in execution of an application.

FIG. 18 is a diagram showing a processing sequence between modules as shown in FIG. 5. In the figure, from the top to the bottom represents an elapse of time "t."

First, in the case where the user operates the Up/Down key 208 on the remote controller 132, an event is notified from the user event control module 507 to the viewing control module 502 (step S1701). In accordance therewith, the viewing control module 502 executes channel change processing according to a notification event (step S1702).

On the other hand, a timer 1 event periodically occurs with the application execution control module 501 (step S1703). The application execution control module 501 executes processing shown in FIG. 15 every time a timer 1 event occurs.

In the case where a viewing channel is changed, whereby it is sensed that the condition is unaccepted, the application execution control module 501 carries out parameter change relevant to the function permission control module 503 (step S1704). Then, this module releases partial function use permission, and further, controls the graphic generation unit 110, thereby carrying out warning display (step S1705).

Subsequently, for example, even if application 1 (509) carries out a print execution request for the function permission control module 503, an error occurs. Thus, no printing can be executed from application 1 (509).

Figure 19:
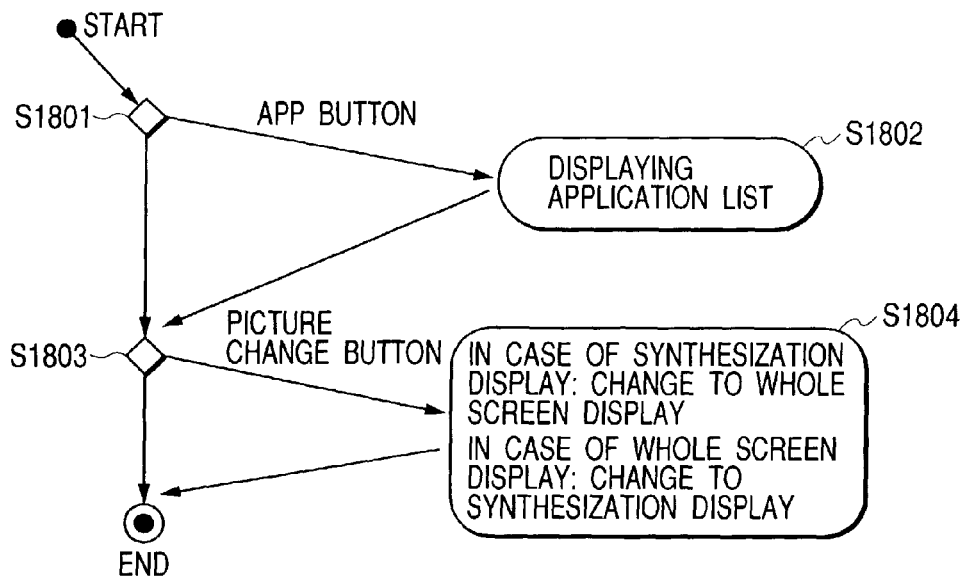
FIG. 19 is a flow chart showing an operation of the application execution control module in the case where a remote control input is made while in execution of an application.

FIG. 19 is a flow chart showing an operation of the application execution control module 501 when the user operates the remote controller 132.

For example, in the case where the user depresses the "PICTURE CHANGE SCREEN" button 205 on the remote controller 132 (step S1801), the application execution control module 501 receives an event caused by the operation of the remote controller 132 via the user event control module 507 (step S1803).

In the case where the event in step S1803 is an operation event of the "PICTURE CHANGE SCREEN" button 205, and the current display screen of the display unit 134 is a screen for execution of an application shown in FIG. 13A or 13B, the application execution control module 501 provides settings to the viewing control module 502 and screen synthesization unit 111 such that the whole display screen is displayed as a viewing program screen (a viewing screen) (step S1804).

In addition, in the case where the current display screen is a viewing screen, the application execution control module 501 provides settings to the viewing control module 502 and screen synthesization unit 111 so as to be a screen (a window display screen or a blend display screen) shown in FIG. 13A or 13B (step S1804).

With respect to picture change in step S1804, which screen is changed to depends on the contents of the "viewing type" element contained in the application management table 506. In addition, processing in case that the event in step S1803 is an event caused by pressing the "APP" button 210 of the remote controller 132 (step S1802) will be described later.

Figure 20:
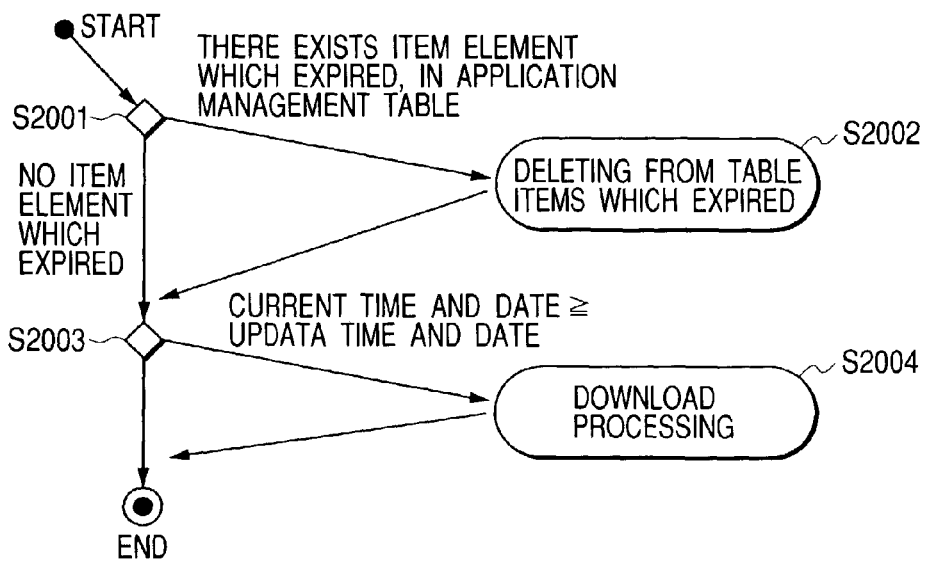
FIG. 20 is a flow chart showing operations for updating and maintaining an application management table which is executed by the application execution control module while in execution of an application.

FIG. 20 is a flow chart showing timer 2 event processing (operation in case that a timer 2 event occurs) relevant to the timer 1 event processing (operation if a timer 1 event occurs) as an operation of the application execution control module 501 in the "EXECUTING APPLICATION NOW" state shown in FIG. 10.

That is, FIG. 20 is a flow chart showing operations for managing and updating the application management table 506 in the application execution control module 501. These operations are periodically carried out by timer 2 in the same manner as the operation shown in FIG. 15.

First, the application execution control module 501 analyzes a validity attribution of the "item" element contained in the whole use condition or partial use condition element of applications each registered in the application management table 506 (step S2001).

In the case where there exists an item having older validity attribution than the current date and time as a result of analysis in step S2001, the application execution control module 501 deletes all items (step S2002).

In this manner, for example, when the application management table 506 is a table containing the contents shown in FIG. 9, an item element (id=1) reaches the validity of Apr. 6, 2000. Thus, the item element is deleted on Apr. 7, 2000.

On the other hand, when there does not exist an item having an older validity attribution than the current date and time, specifically when the "update data" element is contained in the attribution information on each application and the information on a "next update date" element described in this element is the same as the current date and time or the current date and time precedes the above information more, the application execution control module 501 executes download processing shown in FIG. 8 (step S2004).

Here, in step S2004, where data is acquired from is decided depending on information on a "URI" element. This URI contains broadcast type, network ID, transport stream ID, service ID, directory name "ID" based on a data Carousel scheme, and file name.

For example, in the case where the application management table 506 is a table containing the contents shown in FIG. 9, when May 5, 2000 has come, data "/module_id/appl.atrb" is distributed as data conforming to the Carousel scheme by a channel indicated by "dtv_bs://network_id.transport_stream_id.service_id" in the BS digital TV broadcast.

In FIG. 9, although no specific numeral is described as network ID, transport ID, and service ID, such numerals are actually described.

The application execution control module 501 carries out updating of the contents of the application management table 506 by making the operation described above.

Figure 21:
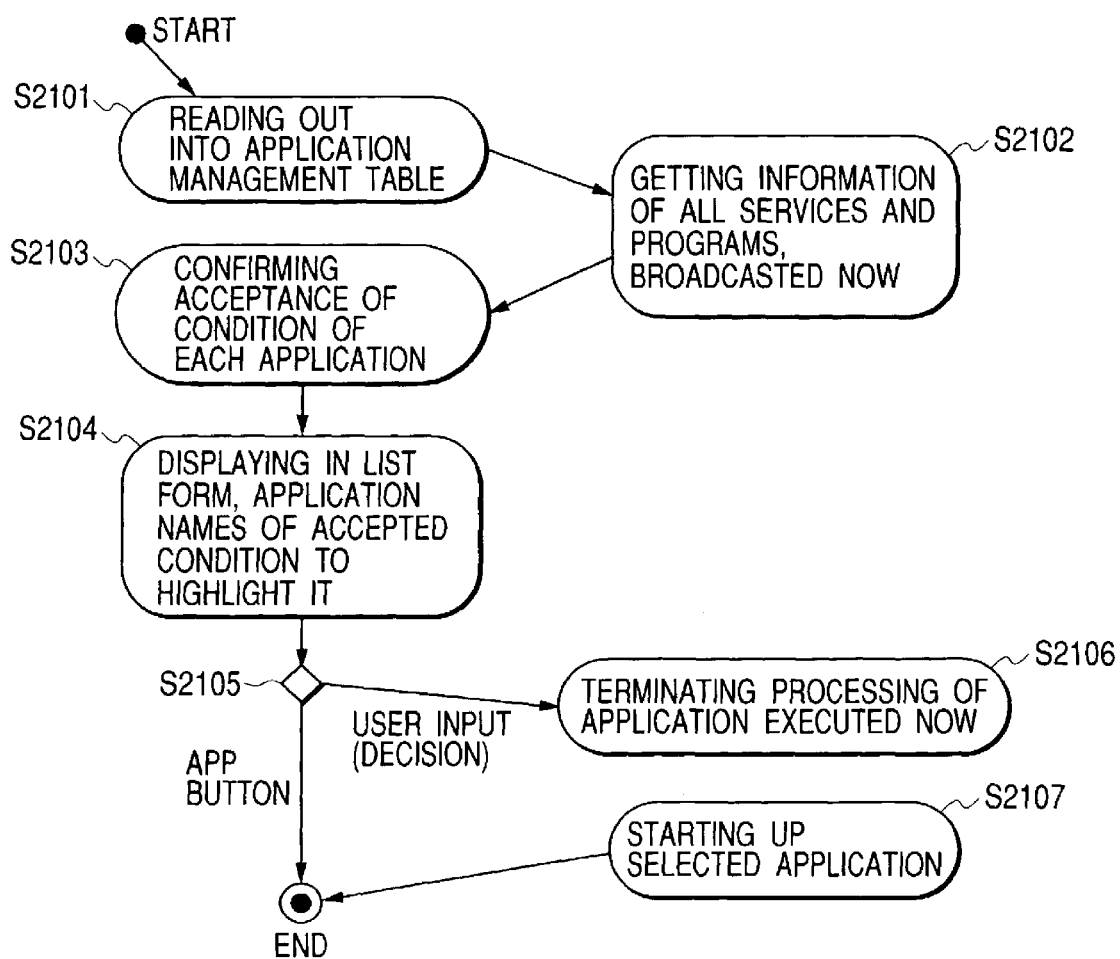
FIG. 21 is a flow chart showing an operation when the application execution control module displays an application list according to a remote control operation.

FIG. 21 is a flow chart showing an operation when this operation event is carried out by pressing the "APP" button 210 of the remote controller 132 in the operation of the application execution control module 501 when the user operates the remote controller 132.

First, the application execution control module 501 reads out the application management table 506 (step S1201), and requests the viewing control module 502 to issue information concerning all services and programs which are currently broadcast.

The information on the currently broadcast services and programs is distributed as SI data in the case of a digital TV broadcast. The viewing control module 502 acquires SI information by issuing a request for acquiring SI information to the transport decoder 103 on the basis of the request from the application execution control module 501, and returns the information to the application execution control module 501 (step S2102).

The application execution control module 501 compares information on the "whole use condition" element of each of the applications contained in the application management table 506 with the information on the currently broadcast services and programs (step S2103).

Then, the application execution control module 501 displays names of applications whose conditions have been accepted (luminance or character color highlight display which is more outstanding than applications whose conditions have been unaccepted) based on the comparison result in step S2103 (step S2104).

Figure 22A:
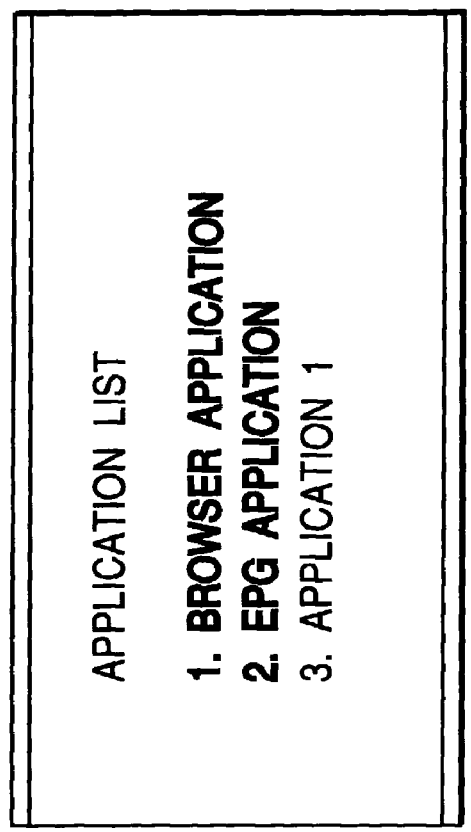
FIGS. 22A and 22B are views each showing a screen for displaying the application list.
Figure 22B:
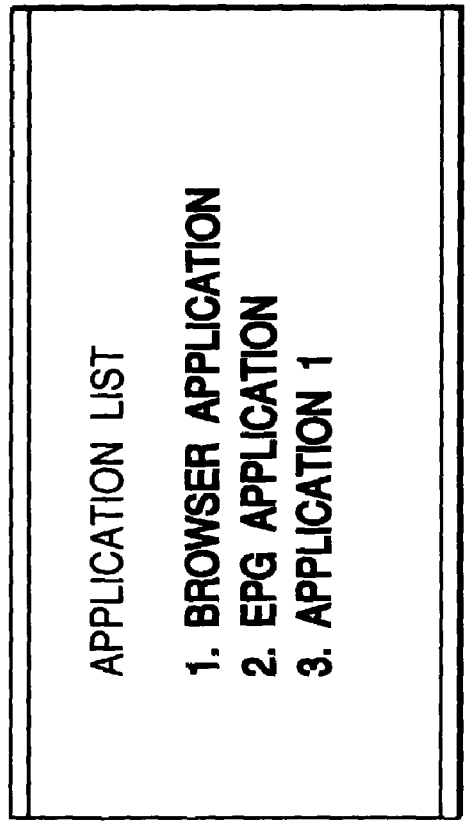

FIGS. 22A and 22B are views each showing an example of a display screen in step S2104.

In the case where the application management table 505 contains the contents shown in FIG. 9, "1. browser application" and "2. EPG application" are not regarded as being available for use because data on the use condition element is not essentially contained. As shown in FIG. 22B, these items are displayed as a list in a highlighted manner (indicated by bolds in the figure).

Further, with respect to "3. application 1," in the case where a channel whose network ID=001 and service ID=0023, or six channels of an analog TV broadcast is contained in the currently broadcast digital TV broadcast, this item is displayed as a list in a highlighted manner, as shown in FIG. 22A. At this time, if any channel is not on air, no item is displayed in a highlighted manner, as shown in FIG. 22B.

In such application list displaying, when the user selects a desired application by operating the remote controller 132 (step S2105), the application execution control module 501 executes termination processing of a currently executed application (step S2106), and executes startup processing of the application selected by the user (step S2107).

In FIG. 21, although an application whose use condition has been confirmed to be accepted by the processing in step S2103 is configured to be displayed in a highlighted manner, this application may be indicated by characters "AVAILABLE" in the listings, or may be indicated by an icon, marking and the like without being limited thereto.

In addition, in the present embodiment, the application attribution data 509a and application management table 506 are described in XML. However, other various text formats, a binary data block format and the like can be applied without being limited thereto in accordance with the aspect of the present invention.

As described above, according to the present embodiment, the following advantageous effects (1) to (5) are obtained.

(1) Applications istributed in the Data Carousel scheme are temporarily stored in the television broadcast receiving apparatus 100 so that use of the whole application or part of the functions thereof can be controlled under the user's television program viewing condition in accordance with the environment to be used.

(2) In the case where the use condition is unaccepted during use of an application, the television broadcast receiving apparatus 100 of the present embodiment can carry out: displaying a menu screen for the user to easily select a next process, warning display and the like.

(3) In use of an application, the user can easily change an application use screen and a current television viewing screen by merely operating the "PICTURE CHANGE" button 205 on the remote controller 132.

(4) When stored applications are displayed as a list, it is possible to display an application available for use in a currently broadcast channel or program in a highlighted manner.

(5) Expired data is automatically deleted from data containing the stored application use condition so that updating can be carried out so as to always obtain updated data.

Second Embodiment

In the first embodiment, application data multiplexed to broadcast waves in the television broadcast receiving apparatus 100 shown in FIGS. 1 and 5, the application data being distributed in the data Carousel scheme similar to a data broadcast, is downloaded by using the browser application 504.

According to the aspect of the present invention, it is possible to acquire application data via a network such as Internet, or to acquire the data via a recording medium such as a card medium.

Now, in the present embodiment, a case of acquiring application data via a network or a recording medium will be described here.

Software Configuration of Television Receiving Apparatus 100

FIG. 23 is a diagram showing a relationship between a functional configuration of software executed by the CPU 118 and hardware associated with the software in the television receiving apparatus 100 shown in FIG. 1.

The functions carried out by the CPU 118 of the present embodiment, as shown in FIG. 23, contain an application execution control unit 2301, a viewing control unit 2302, a function permission control unit 2303, an application management table 2304, a user event control unit 2305, a download application 2307, and attribution data 2306.

The application execution control unit 2301, the viewing control unit 2302, the function permission control unit 2303, the application management table 2304, the user event control unit 2305, the download application 2307, and the attribution data 2306 have functions similar to the application execution control unit 501, the viewing control unit 502, the function permission control unit 503, the application management table 506, the user event control unit 507, the download application 509, and the attribution data 509a shown in FIG. 5.

In particular, in the present embodiment, a card reader 2308 is provided in addition to these components.

The application execution control module 501 reads out application data from the card reader 2308, and registers the data in the application management table 506.

Operation of Television Receiving Apparatus 100

Figure 24:
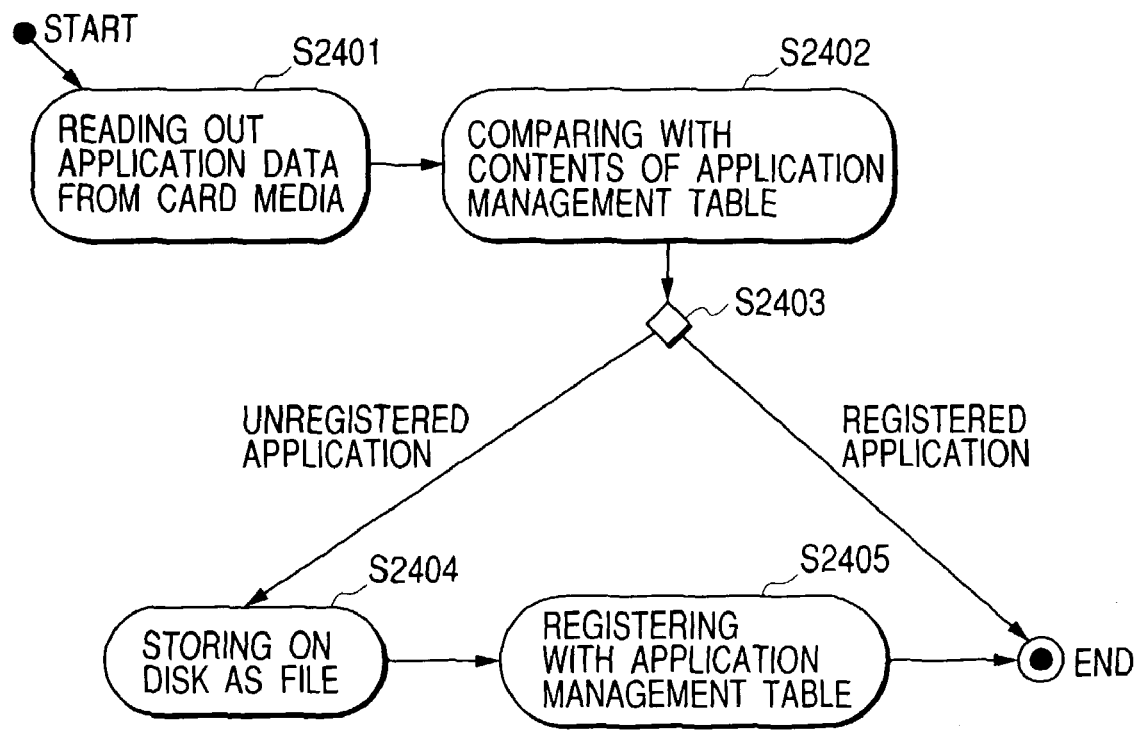
FIG. 24 is a flow chart showing an operation for registering an application from a card medium in the second embodiment.

FIG. 24 is a flow chart showing an operation of the television receiving apparatus 100 in the present embodiment.

In the present embodiment, when a card medium is inserted into the card reader 2308, an event is notified to the application execution control module 501. The application execution control module 501 operates as follows according to the occurrence of such an event.

First, the application execution control module 501 reads out application data (subject application data) from the card medium inserted into the card reader 2308 (step S2401), analyzes information on an application attribution data file of this application data, and compares the analysis result with the contents which have already been registered in the application management table 506 (step S2402).

Then, when the application execution control module 501 recognizes that subject application data is an application that is not registered yet, as a result of comparison in step S2402 (step S2403), this module stores subject application data as a file onto the disk 119 (step S2404), and stores the application attribution data file of the subject application data in the application management table 506 (step S2405).

According to the present embodiment, by merely inserting into the card reader 2308 the card medium having application data stored therein, the user can capture application data in the digital television receiving apparatus 100 (can store the data in the disk 119), and further, register the application attribution data file of the application data in the application management table 506.

Here, only the configuration and operation different from those of the first embodiment will be described. A detailed description is not given here with respect to application startup processing, processing during application execution, and application list display processing, executed in the same way as in the first embodiment.

Third Embodiment

In the first embodiment, a configuration has been provided so as to distribute broadcast contents containing motion images or voices and distribute application data under a digital broadcast service, and further, so as to carry out download processing by using a data broadcast browser (browser application 504).

In view of the aspect of the present invention, a configuration may be provided so as to carry out stream distribution or application distribution by using a network such as Internet without being limited thereto.

In the present embodiment, stream data or applications are distributed via a network.

Configuration of Software of Television Receiving Apparatus 100

Figure 25:
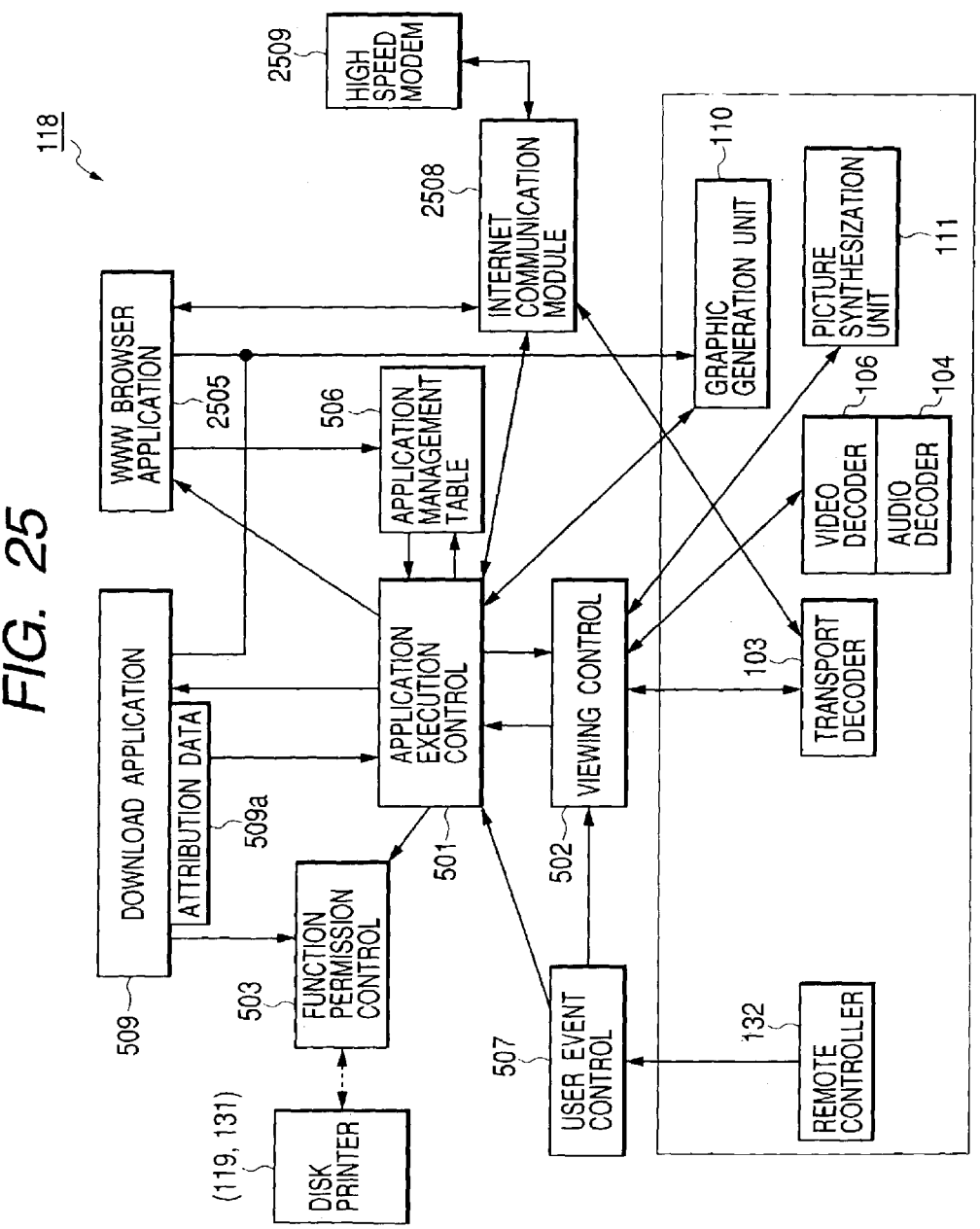
FIG. 25 is a diagram showing a software configuration of a television broadcast receiving apparatus in a third embodiment of the invention.

FIG. 25 is a diagram showing a relationship between a functional configuration of software executed by the CPU 118 and hardware associated with the software in the receiving apparatus 100 shown in FIG. 1.

In the software configuration shown in FIG. 25, elements functioning in the same way as the software configuration shown in FIG. 5 are designated by same reference numerals. A detailed description is omitted here.

The television receiving apparatus 100 in the present embodiment, in particular, as shown in FIG. 25, is configured to comprise a WWW browser application 2505, an Internet communication module 2508, and a high speed modem 2509.

Operation for Television Receiving Apparatus 100

In the present embodiment, the television receiving apparatus 100 is connected to an Internet communication network via the high speed modem 2509. This receiving apparatus receives from the Internet communication network, distribution of a television program composed of motion images and voices and HTML contents and application data which can be browsed by a WWW browser. The Internet communication module 2508 distributes distribution data to a corresponding module or constituent element in the digital television receiving apparatus 100.

For example, the Internet communication module 2508 temporarily transmits television program stream data to the transport decoder 103, transmits motion image data to the video decoder 106, transmits voice data to the audio decoder 104, and transmits HTML contents to the WWW browser application 2505.

When the user carries out application downloading while executing the WWW browser, the WWW browser application 2505 acquires application data by using a HTTP protocol, and stores the data in the disk 119. In addition, this browser application registers in the application management table 506 the application attribution data contained in application data.

The contents of application attribution data used here are basically similar to the contents shown in FIGS. 3 and 4, as described in the first embodiment, but are slightly different therefrom in description of the "item" element.

For example,

<Item id=0 type=Internet TV Validity="2000/04/06">

<URI> inet_stream://company.com/tv/service1</URI>
</item> is described.

This denotes that, in television broadcast distribution using Internet, the use condition is accepted when the contents "inet_stream://company.com/tv/service1" are received and viewed.

According to the present embodiment, even in the case where a television program is distributed via Internet, or in the case where application data is distributed via Internet, application execution can be controlled according to whether or not the user views the television contents.

Now, only the configuration and operation different from those of the first embodiment will be described. A detailed description is not given with respect to application startup processing, processing in application execution, and application list display processing, executed in the same way as in the first embodiment.

Fourth Embodiment

In the first to third embodiments, when an application is used, a condition for viewing a television program specified at the same time as such use has been set.

In the present embodiment, even when the use of the application and television viewing are not carried out at the same time as well, use of the application is controlled under the television viewing condition.

Software Configuration of Digital Television Receiving Apparatus 100

FIG. 26 shows a relationship between a functional configuration of software executed by the CPU 118 and hardware associated with the software in the digital television receiving apparatus 100 shown in FIG. 1.

In the software configuration shown in FIG. 26, elements functioning in the same way as the software configuration shown in FIG. 5 are designated by same reference numerals. A detailed description is omitted here.

The digital television receiving apparatus 100 of the present embodiment, in particular, as shown in FIG. 26, is configured to comprise a viewing history table 2608.

In the present embodiment, as in the first embodiment, the browser application 504 carries out application downloading and registration into the application management table 506. The viewing control module 503 registers viewing history data in the viewing history table 2608 every time the user supplies an instruction for channel change or for canceling television viewing.

FIG. 27 is a view showing an example of contents of the viewing history table 2608.

The viewing history table 2608 is described in XML, and the elements of the "service" name are registered in number of available services (channels).

Each service element has an attribution which represents a broadcast service ID, and further, contains three "time" elements. These "time" elements each contain information indicating how long each service has been viewed on each of the past three days. A "day" attribution represents date.

The viewing control module 502 deletes a "time" element of the oldest date when a date is changed for the viewing control table 2608, and newly registers the "time" element having a date attribute of a new date.

FIG. 27 shows that the user views a service whose service ID=0023 seven minutes on the day (seventh day), 54 minutes the day before (sixth day), and 124 minutes two days before (fifth day).

Operation of Television Receiving Apparatus 100

In the present embodiment, the application execution control module 501 operates in the same way as in the first embodiment. For example, the application execution control module 501 executes processing shown in FIG. 11 with respect to an operation during application startup, and executes processing shown in FIG. 15 with respect to an operation while in execution of an application.

However, with respect to condition acceptance confirming processing, unlike the first embodiment, the processing shown in FIG. 28 is executed together with the processing shown in FIG. 11 and the processing shown in FIG. 15.

That is, the application execution control module 50 reads out the condition for viewing an application being started up or executed, from the application management table 506, and acquires information on a service (channel) to be viewed (step S2801).

Next, information contained in the viewing history table 2608 shown in FIG. 27 is read, and the integrated viewing time (minutes) for three days of the service that is a viewing condition is computed (step S2802).

Then, in the case where the computation result in step S2802 is equal to or longer than 1 minute (step S2802), the result of "condition accepted" is outputted (step S2804). When the result is 0 minutes, the result of "condition unaccepted" is outputted (step S2805).

According to the present embodiment, use of the application can be controlled on the condition that a specified service (channel) was viewed for the past three days instead of the condition that television is viewed whenever an application is used.

In the first to fourth embodiments, although the application management table, application attribution data, and viewing history table are described in XML, for example, HTML or the like may be used without being limited thereto in view of the aspect of the present invention. In addition, a data information format other than a markup language may be used.

Fifth Embodiment

Now, a fifth embodiment of the present invention will be described here. In the present embodiment as well, a description will be given with respect to a case in which the present invention is applied to a television receiving apparatus of FIG. 1.

In the first to fourth embodiments described above, although use of an application is permitted by viewing a specified program, use of an application is permitted on the condition that the contents which have been distributed in advance and stored are reproduced, in the present embodiment.

Figure 29:
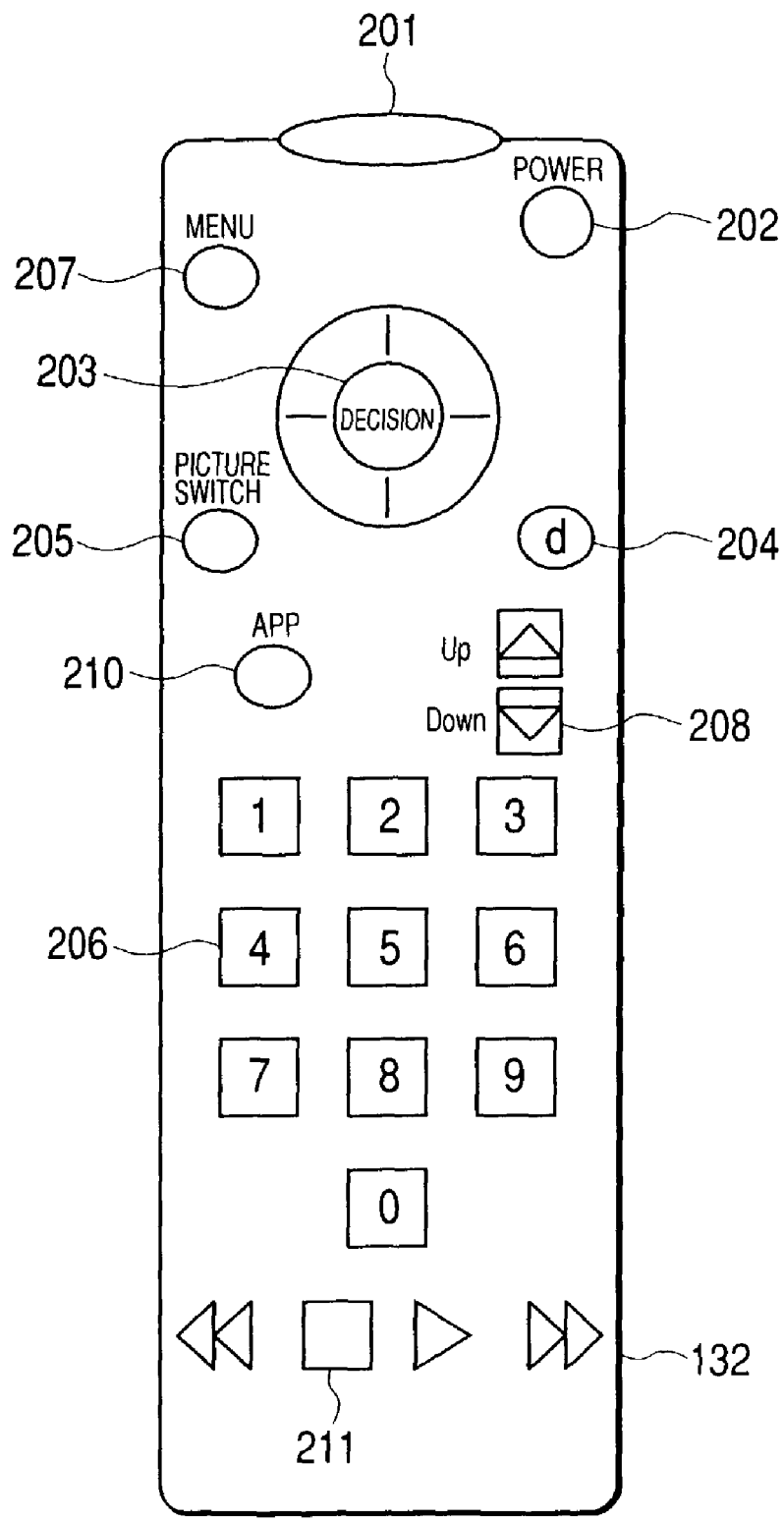
FIG. 29 is a view showing a configuration of a remote controller of the television broadcast receiving apparatus.

FIG. 29 is a view showing a configuration of the remote controller 132 in the present embodiment. Constituent elements identical to those of FIG. 2 are designated by same reference numerals. Compared with the remote controller of FIG. 2, the remote controller 132 of FIG. 29 eliminates the color button 209 and adds buttons 211 for reproducing the contents stored in the hard disk 119 and carrying out rewinding, stop, reproduction, and fast feeding (fast forwarding) during reproduction.

Software Configuration of Television Receiving Apparatus 100

Figure 30:
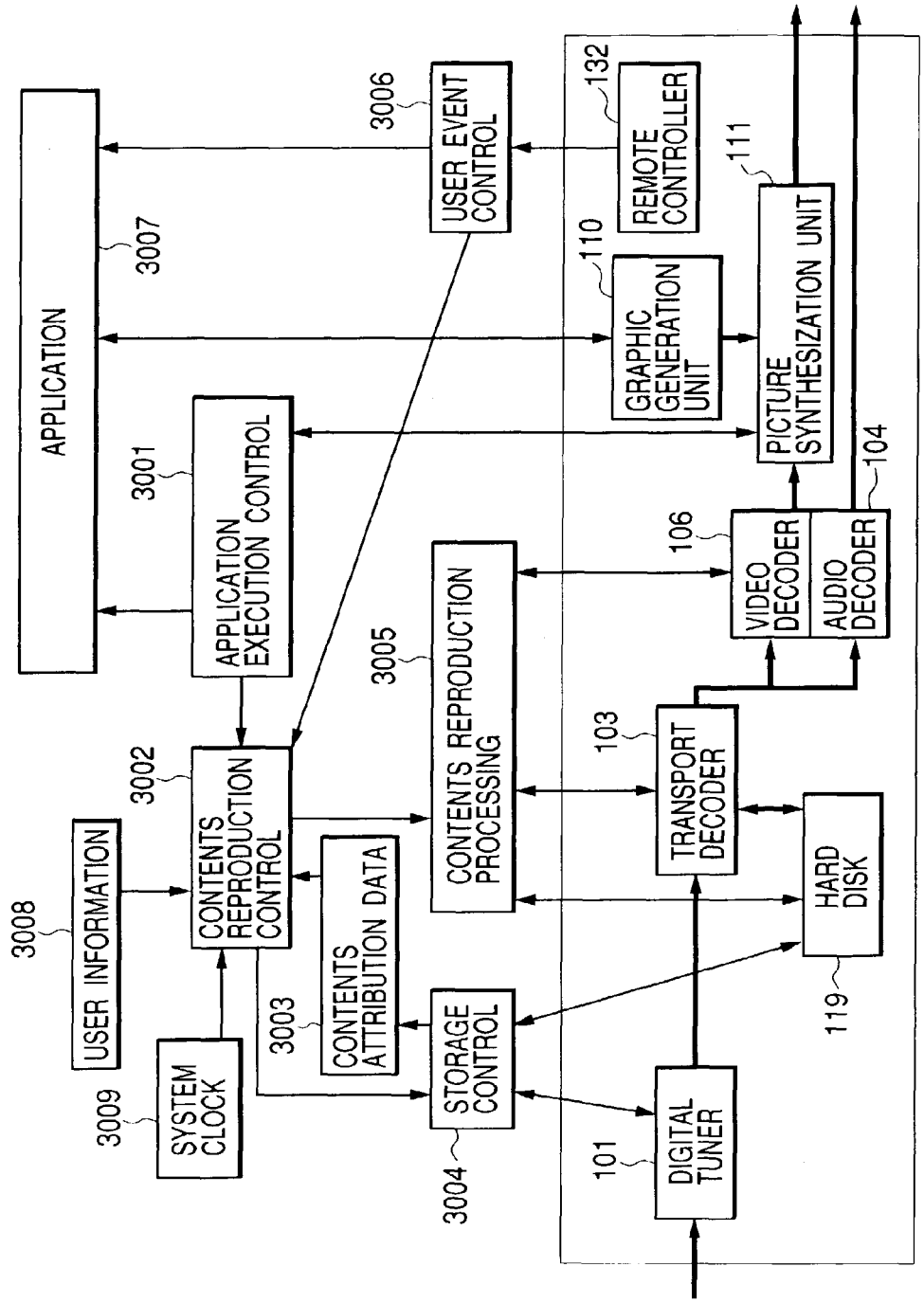
FIG. 30 is a diagram showing a software configuration of a television broadcast receiving apparatus in a fifth embodiment of the invention.

FIG. 30 is a diagram showing a functional configuration of a software executed by the CPU 118 in the television receiving apparatus 100.

The functions carried out by the CPU 118 contain: an application execution control unit 3001; a contents reproduction control unit 3002; contents attribution data 2803; a storage control unit 3004; a contents reproduction processing unit 3005; a user event control unit 3006; an application 3007; user information 3008; and a system clock 3009.

The elements 3001 to 3009 each are carried out by a software module having integrated functions. The content reproduction processing unit 3005 carries out decode processing of partial TS data stored in the hard disk 119 or video image display and voice reproduction processing while controlling constituent elements each composed of hardware components such as the hard disk 119, transport decoder 103, video decoder 106, audio decoder 104, and picture synthesization unit 111.

The application execution control unit 3001 reads out the application programs stored in the hard disk 119 to load them on the memory 112, and carries out execution control such as program initialization.

The contents attribution data 3002 is a data module having collected therein the contents attribution data on video contents contained in each item of partial TS data stored in the hard disk 119. The user information 3008 is an information module concerning the user himself, which the user has set in advance.

The user event control unit 3006 receives a user input from the remote controller 132, and transmits an event to the contents reproduction control module 3002 and application execution control module 3001 on the basis of the received user command.

The application 3007 used here is assumed to be stored in the hard disk 119, and to be in an executable state.

The contents reproduction control unit 3002 carries out processing for selecting data to be reproduced from among data configuring video contents (partial TS data) stored in the hard disk 119 or control processing for starting and stopping reproduction relevant to the contents reproduction control unit 3005.

The storage control unit (storage control module) 3004 controls an operation when data (television broadcast contents) from the digital tuner 101 are stored in the hard disk 119 via the transport decoder 103.

Specific Operation of Television Receiving Apparatus 100

Now, a main operation of the television receiving apparatus 100 carried out by the software configuration shown in FIG. 30 will be described here.

Operation of Storage Control Module 3004

In the present embodiment, distribution of the video contents is carried out on date and time predetermined from a broadcast station. Therefore, the storage control module 304 controls the digital tuner 101 when a predetermined date and time has come, selects a channel in which the predetermined distribution of contents is carried out, and starts its reception.

Then, the storage control module 3004 controls the transport decoder 103, carries out conversion from TS data of the received contents to partial TS data, and stores the converted data in the hard disk 119.

Here, the digital broadcast distributed from the broadcast station contains contents attribution data of the video contents together with video contents described above (hereinafter, simply referred to as "contents"). The contents attribution data contains the name of contents (a program name), reproduction time, and any other attribution, information concerning the contents, as service information (SI) data.

Therefore, the storage control module 3004 stores contents attribute data in the contents attribution data module 3003 when the contents is stored in the hard disk 119.

FIG. 31 is a view showing a state of contents attribution data stored in the contents attribution data module 3003 by using the storage control module 3004. In FIG. 31, the contents attribution data on four contents is stored in the contents attribution data module 3003.

As shown in FIG. 31, identification numbers (ID) are added to these four contents respectively. In addition, the contents attribution data used here uses a text format described based on XML. The elements which are the contents of the data each are described in a region enclosed in a start tag < > and an end tag < >, and further, another element can be contained in each element.

FIG. 31A shows a contents attribute element (id=1) representing first contents attribution data, the element contain files, time offsets, content names, time, validity, priority reproduction conditions and the like. Further, the priority reproduction condition element contains elements such as reproduction day of the week, reproduction time range, user's age, user's gender and the like.

The subsequent second to fourth contents attribution elements contain internal elements in the same configuration as the first contents attribution element.

The contents of the contents attribution element shown in FIG. 31 are the contents which the storage control module 3004 has converted and described based on XML, the information sent as SI data together with the broadcast wave from the broadcast station.

However, only one file element is information newly added when the storage control module 3004 carries out contents storage processing. This file element is a file name added when the storage control module 3004 carries out contents storage processing for the hard disk 119. Then, this file element is used when the contents reproduction processing module 3005 reproduces the contents from the hard disk 119.

A time offset element is used to specify individual contents in the case where a plurality of contents is contained in one item of partial TS data. Specifically, this data indicates when target contents is set in minutes after the start of certain partial TS data.

The time element is data indicating a time required for reproducing individual contents in the case where one item of partial TS data contains a plurality of contents.

The priority reproduction condition element contains a reproduction time range element and a user's age element. The reproduction time range element is data numerically representing the start and end of the reproduction time in units of 24 hours, the data being expressed by ending (–). As with the user element, the start and end of the user's age range are obtained as a description ended by (–).

In FIG. 31, although all of the four contents each are described as a file whose ID is "0001," these four contents may be configured to be described as having their different IDs.

Operation of Application Execution Control Module 3001

The application execution control module 3001 controls startup processing and termination processing of application programs stored in advance in the hard disk 119 and transition of four states (Loaded, Paused, Active, Destroyed) owned by each of the application programs.

The application programs in the present embodiment each are configured to contain image data, voice data, and other data used when the application program executes processing, together with a so called Java (R) byte code (hereinafter, referred to as "a Java (R) class file") which is provided by compiling the source code described in the Java (R) language.

Figure 32:
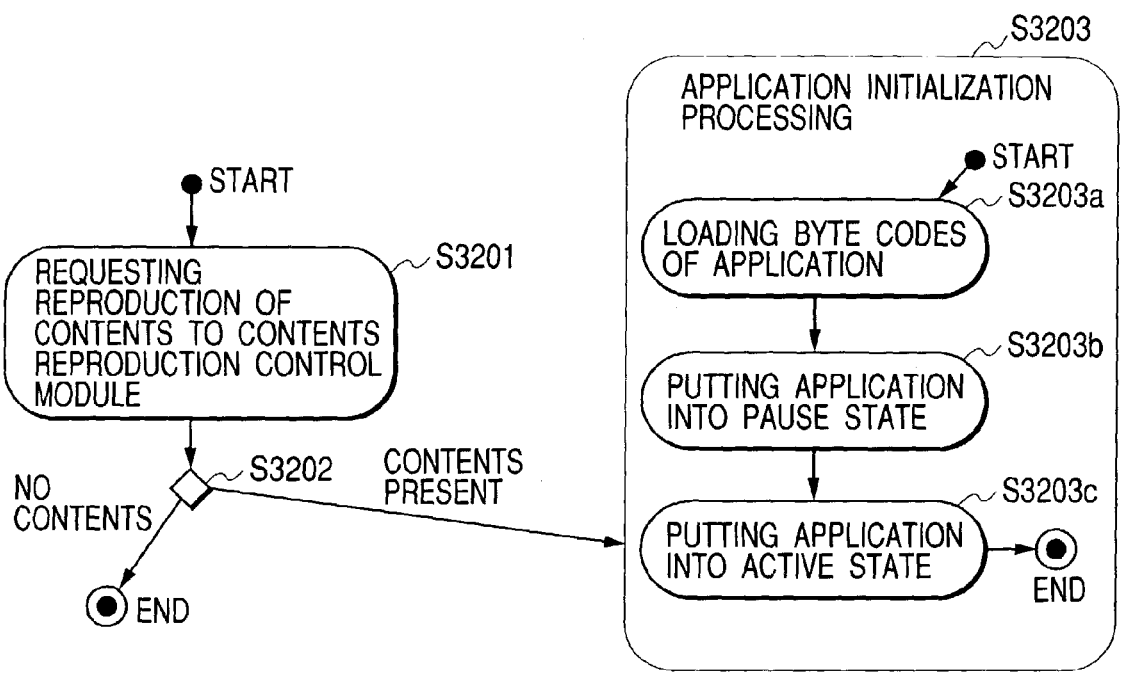
FIG. 32 is a flow chart showing an operation when an application of an application execution control module is started up.

FIG. 32 is a flow chart showing an operation of the application execution control module 3001.

In FIG. 32, the sign "●" (filled circle) denotes that processing starts, the double-circle sign denotes that processing terminates, and the rhombus denotes judgment and divergence.

When the user requests application startup by depressing the application key 210 of the remote controller 132, the application execution control module 3001 first issues a contents reproduction request to the contents reproduction control module 3002 (step S3201).

The contents reproduction control module 3002 acquires the contents attribution data 3103 shown in FIG. 31, and confirms whether or not the reproduction contents exist, on the basis of the contents attribution data 3103.

In the case where the contents to be reproduced do not exist as a result of confirmation, the contents reproduction control module 3002 notifies the application execution control module 3101 of the fact.

The application execution control module 3001 which has received the notification from the contents reproduction control module 3002 cancels and terminates application startup processing immediately in the case there exist contents to be reproduced (step S3202).

On the other hand, in the case where there exist contents to be reproduced, the application execution control module 3001 starts application initialization processing (step S3203).

That is, the application execution control module 3001 executes byte code readout and load processing for the memory 112 which is a processing to be performed during application startup (step S3203a), function call processing for setting an application in a Paused state (step S3203b) and function call processing for setting the application in an executable (active) state (step S3203c).

Figure 33:
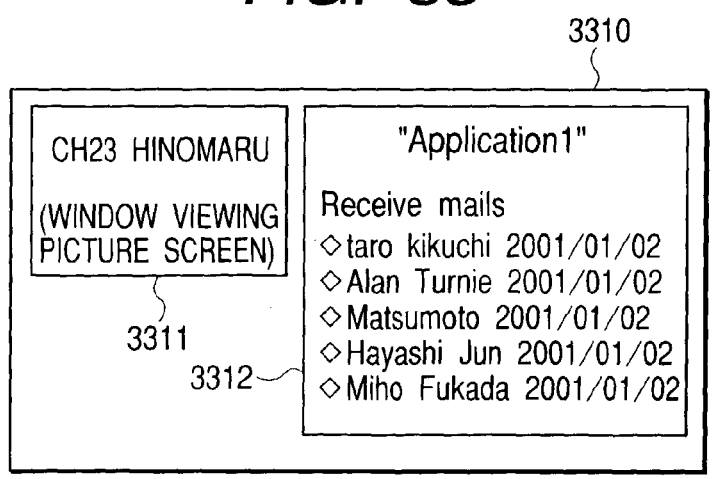
FIG. 33 is a view showing a display screen while in execution of an application.

FIG. 33 is a view showing an example of a display screen 3310 at the display unit 134 after application startup processing by the application execution control module 3001.

As shown in FIG. 33, the application execution control module 3001 controls the synthesization control unit 111, whereby the display screen 3310 is divided into two regions 3311 and 3312, an application is displayed in the display region 3312, and the reproduction contents is displayed in the display region 3311.

Figure 34:
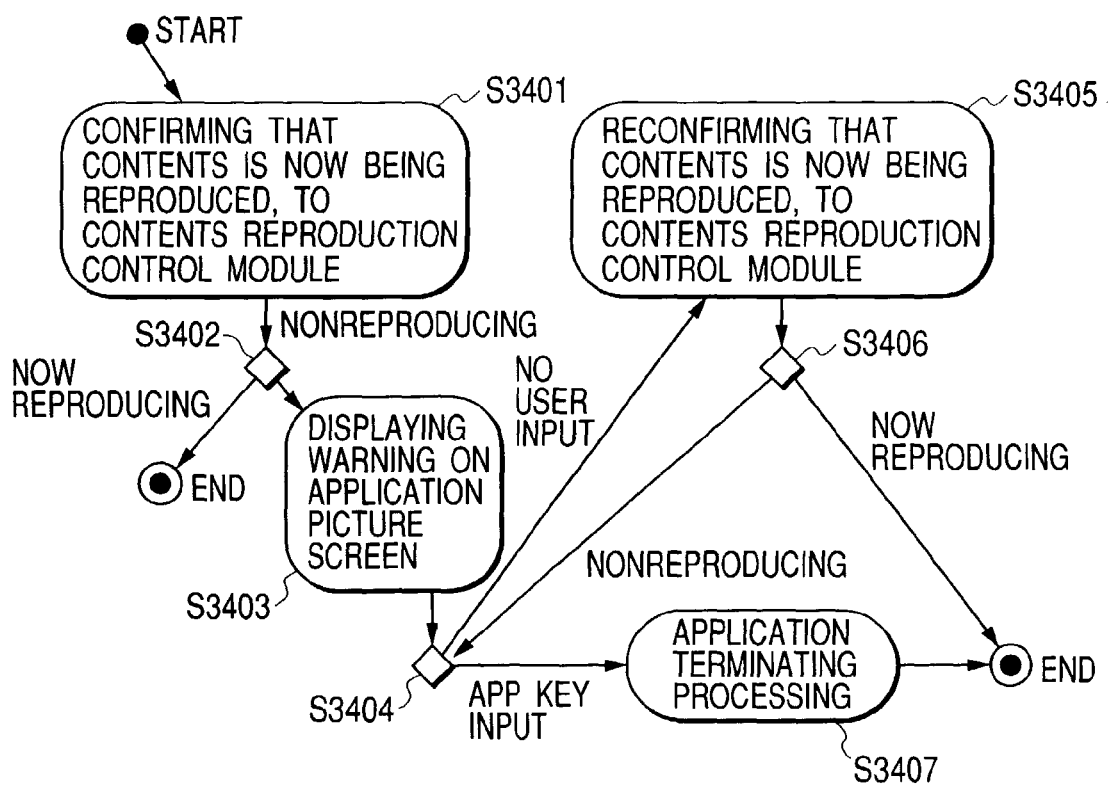
FIG. 34 is a flow chart showing an operation while in execution of an application of the application execution control module.

FIG. 34 is a flow showing an operation while an application is executed in the application execution control module 3001.

After the application is executed, the application execution control module 3001 executes processing of an event which occurs periodically due to a timer function which the CPU 118 has, or event driven processing whose operation is started by a user event which occurs due to operation of the user's remote controller 132.

First, the application execution control module 3001 carries out calling for confirming whether or not contents reproduction is in progress, to the contents reproduction control module 3002 (step S3401). As a result, the contents reproduction control module 3002 terminates processing in the case where contents reproduction is in progress (step S3402).

Figure 35:
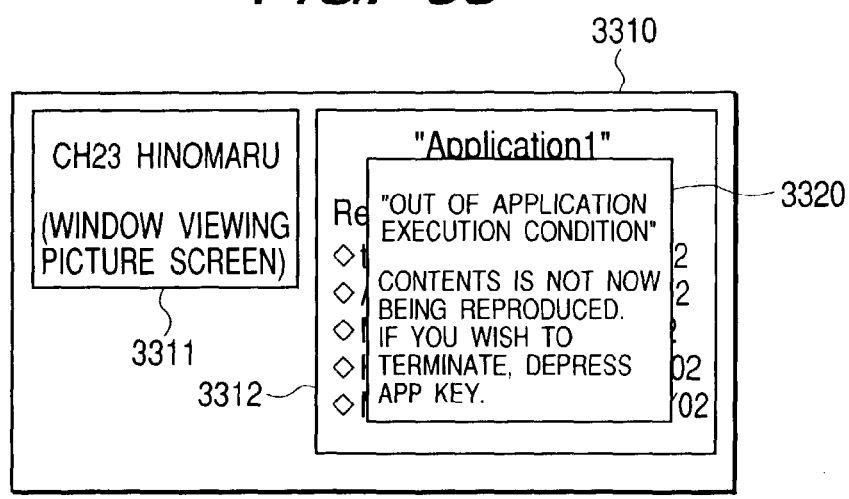
FIG. 35 is a view showing a warning display on a display screen while in execution of an application.

On the other hand, in the case where contents reproduction is not in progress as a result of confirmation in the contents reproduction control module 3002, or in the case where contents reproduction is stopped by the user who instructs the remote controller 132 to stop reproduction (step S3402), the application execution control module 3001 carries out warning display relevant to a screen "EXECUTING APPLICATION NOW" (display region 3312 of FIG. 33) (step S3403). FIG. 35 is a view showing a display example of warning display 3320 displayed by executing processing of step S3403.

In the case where the application execution control module 3001 recognizes that the user depresses the application (APP) button 210 of the remote controller 132 during warning display (step S3404), this module executes termination processing for canceling application execution (step S3407).

In addition, in the case where the result of inquiry to the contents reproduction control module 3002 is that the contents reproduction is in progress (step S3405 and step S3406) due to the user reproduction instruction provided with operation of the remote controller 132 during warning display, the application execution control module 3001 terminates processing without executing any processing in order to continue application execution.

Figure 36:
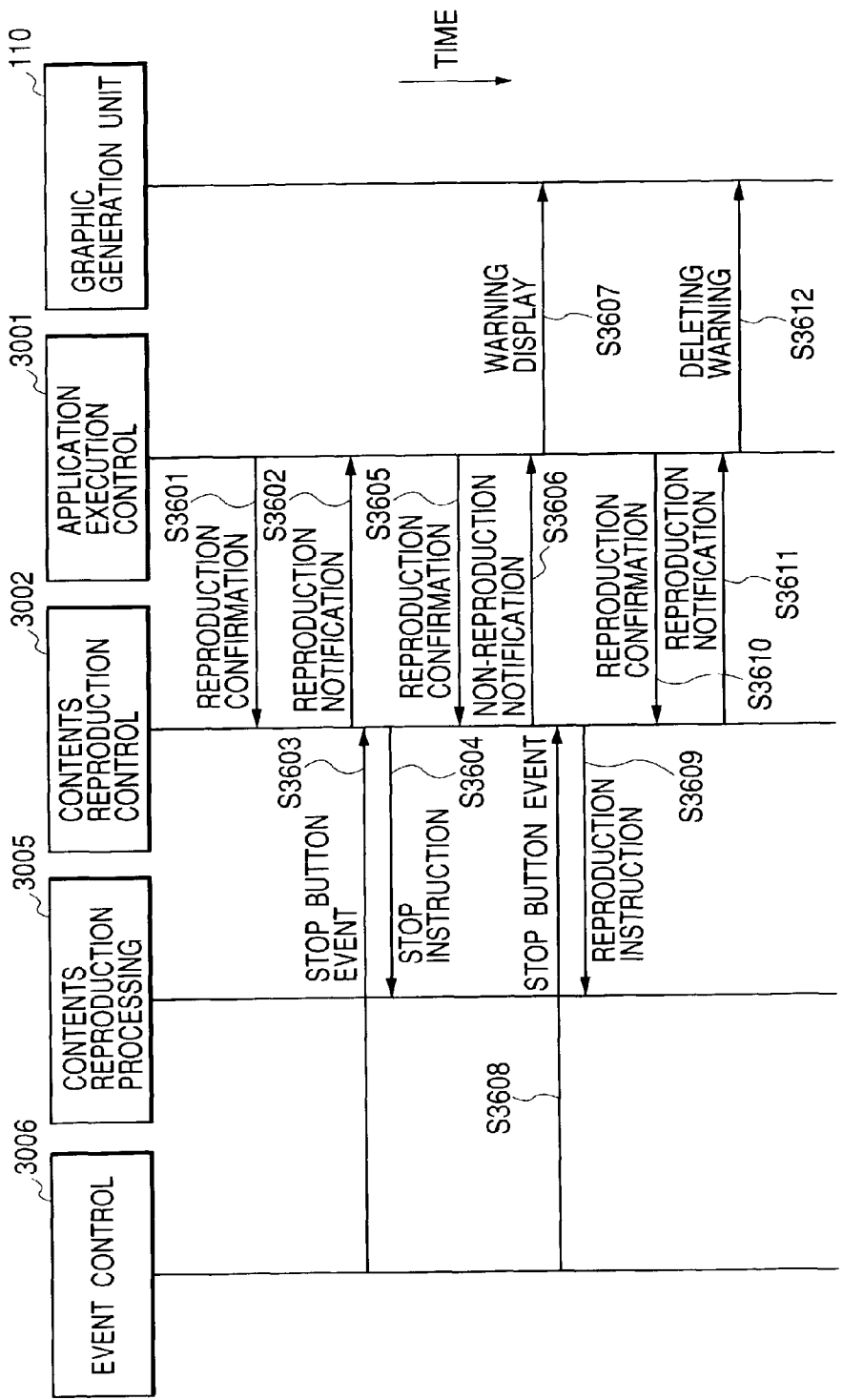
FIG. 36 is a diagram showing an operation in the case where reproduction of contents is stopped by a user's operation while in execution of an application.

FIG. 36 is a diagram showing an operational relationship between the application execution control module 3001 and another software module or hardware components.

In FIG. 36, the line oriented in a downward direction indicates an elapse of time (time), which indicates that processing is executed later as the line goes down.

For example, in response to inquiry from the application execution control module 3001 (step S3601), the contents reproduction control module 3002 makes a response "REPRODUCTION NOW" (step S3602).

In addition, when contents reproduction is stopped by operation of the remote controller 132 of the user (step S3603 and step S3604), the contents reproduction control module 3002 makes a response "NO REPRODUCTION NOW" (step S3606) in inquiry from the application execution control module 3001 (step S3605).

The application execution control module 3001 receives a response from the contents reproduction control module 3002, and carries out warning display (step S3607).

Further, when contents reproduction is started by the user's instruction (step S3608 and step S3609), the contents reproduction control module 3002 makes a response "REPRODUCTION NOW" (step S3611) to inquiry from the application execution control module 3001 (step S3610).

The application execution control module 3001 receives a response from the contents reproduction control module 3002, and deletes warning display (step S3612).

Operation of Contents Reproduction Control Module 3002

Figure 37:
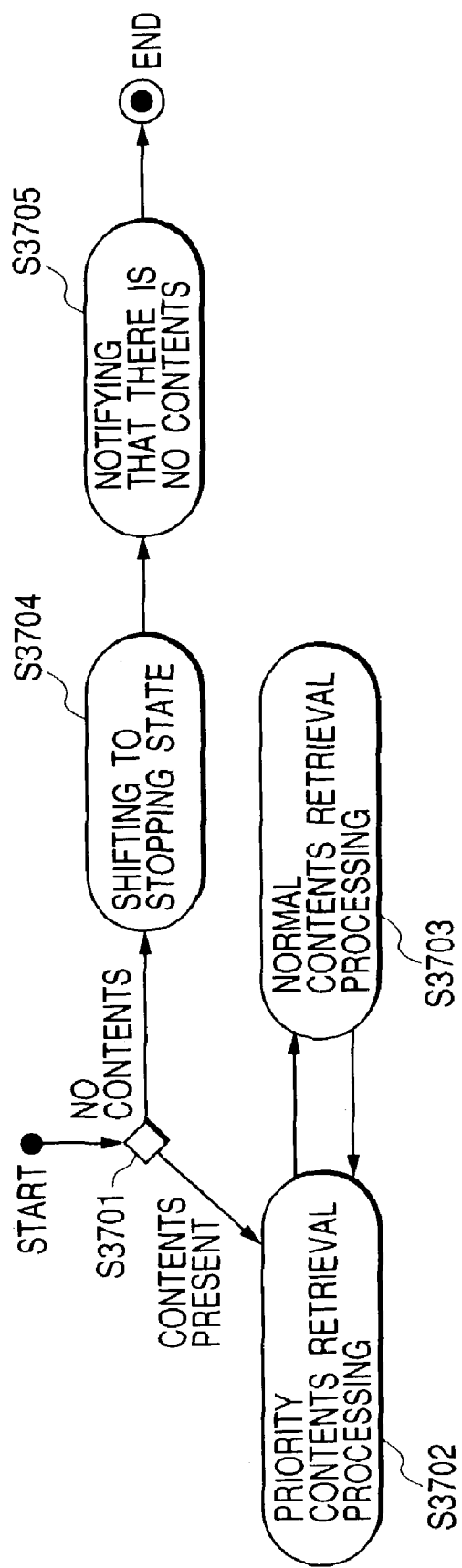
FIG. 37 is a flow chart showing an operation of a contents reproduction control module.
Figure 38:
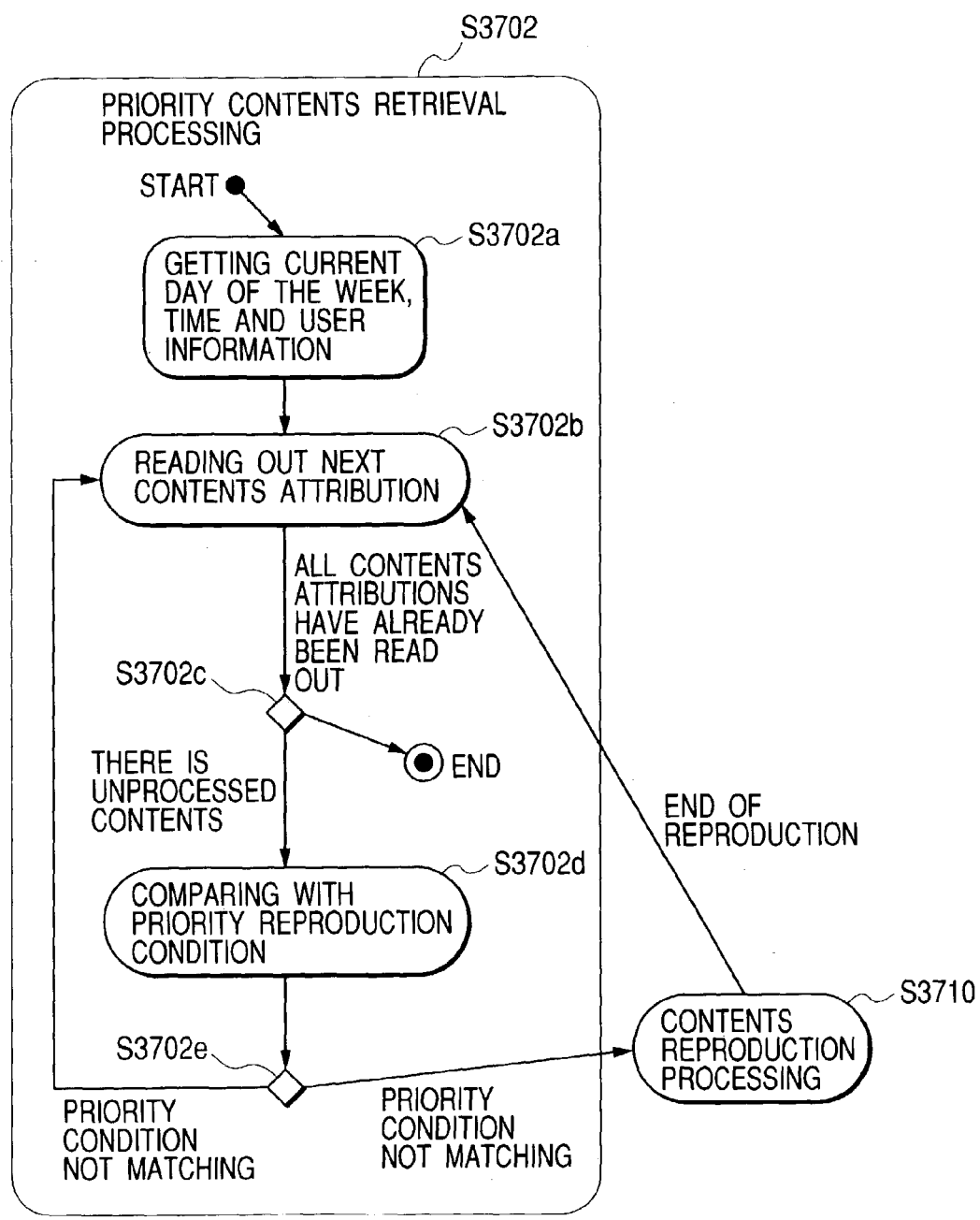
FIG. 38 is a flow chart showing priority contents retrieval processing in operation of the contents reproduction control module.
Figure 39:
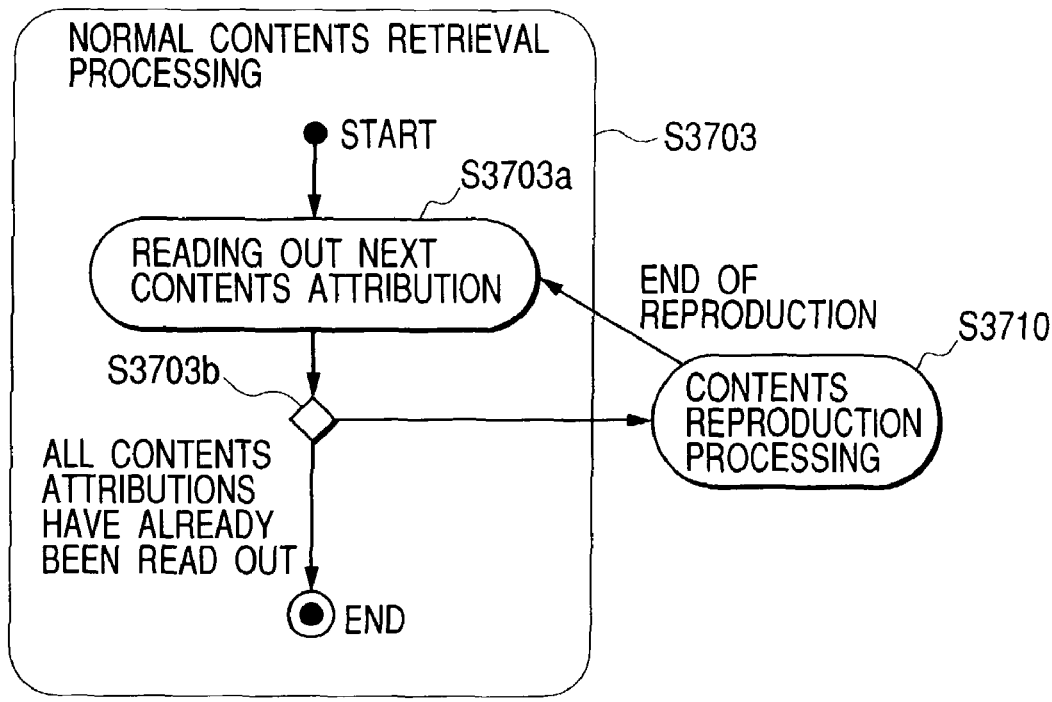
FIG. 39 is a flow chart showing normal contents retrieval processing in operation of the contents reproduction control module.

FIGS. 37 to 39 are flow-charts each showing an operation of the contents reproduction control module 3002. The contents reproduction control module 3002 receives a contents reproduction request from the application execution control module 3001 as described above, and starts the corresponding processing.

As shown in FIG. 37, the contents reproduction control module 3002 acquires the contents attribution data 3003 shown in FIG. 31, and confirms whether or not the reproduction contents exist with the contents attribution data 3003 (step S3701).

In the case where the reproduction contents do not exist as a result of confirmation in step S3701, the contents reproduction control module 3002 sets contents reproduction in the REPRODUCTION NOW state (step S3704), and at the same time, notifies the application execution control module 3001 that the reproduction contents do not exist (step S3705).

In the case where the reproduction contents exist as a result of confirmation in step S3701, the contents reproduction control module 3002 executes priority contents retrieval processing (step S3702).

Specifically, as shown in FIG. 38, when executing the prior contents retrieval processing, the contents reproduction control module 3002 first acquires a current day of the week, time information, and user information described later (step S3702a). Further, this module reads out the contents of contents attribution data 3003, and executes processing from step S370 relevant to all of the existing contents attribution data.

That is, the contents reproduction control module 3002 reads out the contents of contents attribution data subjected to processing (step S3702a), and compares the contents of the priority reproduction condition contained in the contents of the contents attribution data with the current day of the week, time information and user information (step S3702d). As a result of comparison, in the case where all items are coincident (matched) (step S3702e), this module executes contents reproduction processing (step S3710).

A specific description of step S3702d will be described here. In the case where the contents attribution data is data indicated in FIG. 3, the priority reproduction condition is described as the reproduction day of the week "Monday, Tuesday, Wednesday, Thursday, Friday, Saturday, and Sunday" in the contents attribution data of the contents attribution id=1 described at the head thereof. In this case, it is required that the current day of the week falls into the condition. In addition, "10-15" is described as a reproduction time range, and thus, the current time interval ranges from 10:00 to 15:00. Further, "20-70" is described as a user age, and thus, the age information on the registered user is required to be between 20 years old and 70 years old.

In the case where all the elements contained in such a priority reproduction condition are coincident with the current day of the week, time, and information set by the television broadcast receiving apparatus 100, the contents reproduction processing is executed.

In addition, in the case of the contents attribution data when content attribute id=1 in FIG. 31, the contents is reproduced for 120 seconds from a portion of 60 seconds later after the beginning of data stored as file ID=0001 in the hard disk 119.

In this way, in the priority contents retrieval processing of step S3702, the reproduction contents is decided in accordance with the contents of the contents attribution data 3003, and immediately thereafter, the decided contents is reproduced.

Then, after terminating processing for all the contents attribution data (step S3702*c*), processing goes to execution of normal contents retrieval processing (step S3703).

In normal contents retrieval processing (step S3703), as shown in FIG. 39, the contents reproduction control module 3002 acquires the contents attribution data 3003 shown in FIG. 31, and executes reproduction contents decision processing. Here, this module does not carry out comparison with the priority reproduction condition in particular, simply selects the contents registered in the contents attribution data 3003 from the start to the end, and executes reproduction processing (step S3703*a*, step S3703*b*, and step S3703*c*).

Then, the contents reproduction control module 3002 reads out the contents attribution data on all the contents. When reproduction of the contents is executed, this module executes priority contents retrieval processing again (step S3702).

In this way, in the present embodiment, a configuration is provided so as to execute the priority contents retrieval processing (step S3702) and normal contents retrieval processing (step S3703) alternately. Thus, the contents subjected to prior reproduction are reproduced with the priority which is two times as high as other normal contents. In addition, the contents subjected to priority reproduction change with day of the week or time for the user to use an application.

Figure 40:
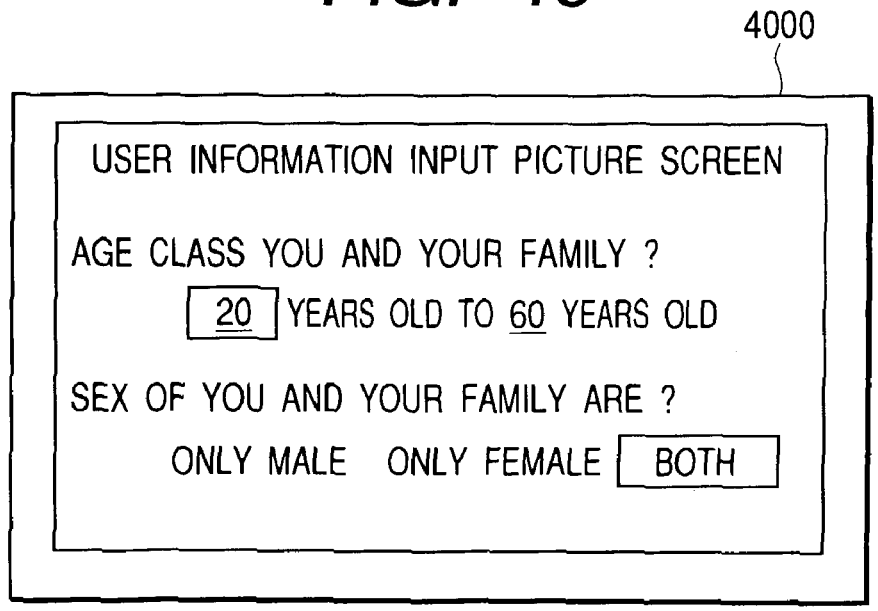
FIG. 40 is a view showing an example of a user information input screen.

Here, the "user information" in the present embodiment is set after the user purchases the television broadcast receiving apparatus 100. FIG. 40 is a view showing an example of a user information setting screen 1300.

For example, when a setting screen 4000 displayed on the display unit 134 is displayed, the user operates the remote controller 132, thereby moving a cursor key (not shown) on the setting screen 400, and then, selecting a display region to be changed. Then, the user operates the numeric key 206 of the remote controller 132, thereby setting or changing the value of age. Also, the user operates the remote controller 132, thereby setting male or female.

The setting information using the setting screen 4000 is maintained by the user information module 3008, and is used as a processing parameter in the priority contents retrieval processing shown in FIGS. 37 and 38.

In this way, according to the present embodiment, application program execution control can be carried out according to whether or not the group of contents stored in advance in the hard disk 119 is in reproduction. That is, it is possible for the user to permit use of an application in accordance with the condition in which the contents stored in advance are reproduced.

In addition, by carrying out the contents reproduction control shown in FIGS. 37 to 39, it is possible to change the priority of the contents of contents reproduction in accordance with day of the week or time and the like or change the priority of the contents of contents reproduction in accordance with the information concerning the user registered in advance by the user.

In the present embodiment, in the contents reproduction control shown in FIGS. 37 to 39, the priority contents retrieval processing (step S3702) and normal contents retrieval processing (step S3703) are configured so as to be carried out at a ratio of 1:1 alternately. In view of the aspect of the present invention, for example, priority contents retrieval processing and normal contents retrieval processing may be carried out at a ratio of 2:1 without being limited thereto, or may be carried out at a ratio of 3:1.

Further, in the present embodiment, although permissible user information is defined as the user age and male or female, of course, the other items of information may be contained. For example, information such as user favorite music type, user desired product type or the like may be contained in the user information.

Furthermore, in the present embodiment, although the contents attribution data is described based on XML, the attribution data may described as a text based on another format, or may be described as a binary data block, of course, without being limited thereto in view of the aspect of the present invention.

Moreover, in the present embodiment, although the contents is distributed from a broadcast station at a predetermined time, for example, the user may manually make contents input operation for the television broadcast receiving apparatus 100 without being limited thereto.

In addition, in the present embodiment, as shown in FIG. 31, although all the file IDs of the stored contents is defined as ID=0001, these IDs may be used in individual files by changing the file ID without being limited thereto.

Sixth Embodiment

In the present embodiment, the configuration and operation of the television broadcast receiving apparatus 100 shown in FIG. 1 will be described below. Here, the configuration and operation different from those of the fifth embodiment will be specifically described.

Software Configuration of Television Receiving Apparatus 100

Figure 41:
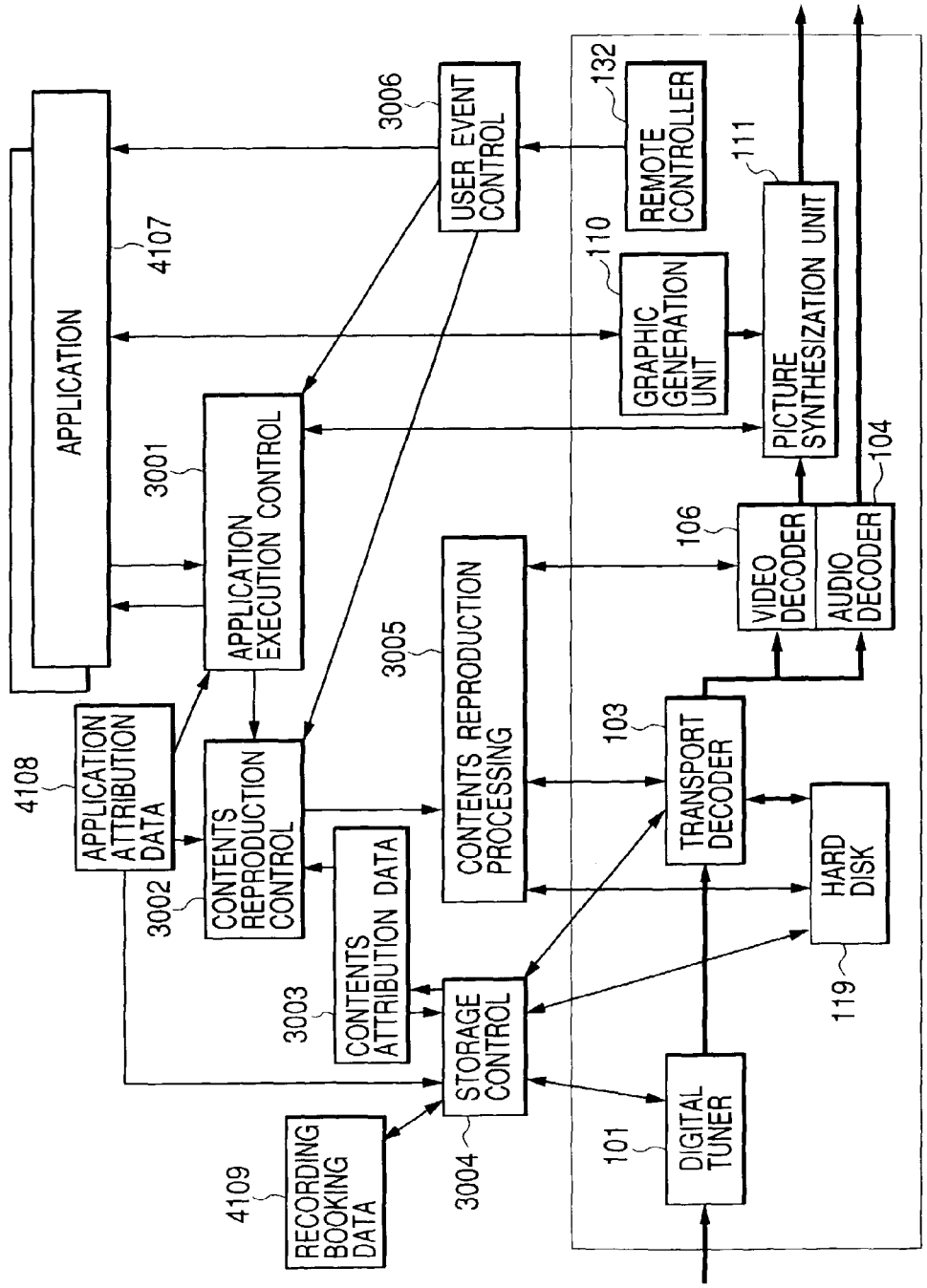
FIG. 41 is a diagram showing a software configuration of a television broadcast receiving apparatus in a sixth embodiment of the invention.

FIG. 41 is a view showing a functional configuration of software executed by the CPU 118 in the television receiving apparatus 100 of the present embodiment. In the software configuration shown in FIG. 41, elements functioning in the same way as the software configuration shown in FIG. 30 are designated by same reference numerals. A detailed description is omitted here.

The software configuration in the present embodiment contains recording booking data 4109, application attribution data 4108, and an application 4107.

The application 4107 is an application distributed from a broadcast station by broadcast waves. This application is subjected to decode processing by the transport decoder 103 after being received by the digital tuner 101, and then, is stored in the hard disk 119.

The application 4107 used here is assumed to be loaded and executed in the memory 112 after being stored in the hard disk 119.

Application attribution data 4108 is a data module which stores application attribution data. The recording booking data 4109 is a data module for storing time, channel and the like of a program to be recorded when the storage control module 3004 carries out automatic storage operation.

Specific Operation of Television Receiving Apparatus 100

Now, a primary operation of the television receiving apparatus 100 carried out by the software configuration shown in FIG. 41 will be described here.

Operation of Storage Control Module 3004

In the present embodiment, as in the fifth embodiment, the contents is distributed from a broadcast station at a predetermined date and time.

Therefore, when the predetermined date and time has come, the storage control module 3004 selects a channel in which predetermined contents distribution is carried out for the digital tuner 101, and starts its reception. Then, the storage control module 3004 controls the transport decoder 103, thereby converting TS data into partial TS data and storing the data in the hard disk 119.

Here, in a digital broadcast distributed from a broadcast station, as in the fifth embodiment, the contents attribution data is contained together with contents. The contents attribution data contains, as SI data, the name of contents, reproduction time, and any other item of information concerning the contents.

Therefore, when the storage control module 3004 stores the contents in the hard disk 119, this module stores the contents attribution data in the contents attribution data module 3003.

FIG. 42 is a view showing a state of the contents attribution data stored in the contents attribution data module 3003 by using the storage control module 3004. In FIG. 42, the contents attribution data relevant to six contents is stored in the contents attribution data module 3003.

As shown in FIG. 42, these six contents have their respective identification numbers added thereto. Further, the contents attribution data used here is obtained as data of a text format described based on XML, as in the fifth embodiment. In addition, in the present invention, the target contents is product advertisement contents.

In (a) of FIG. 42, there is shown a contents attribution element (id=1) representing first contents attribution data. This element contains elements such as file, time offset, contents name, provider company name, section, category, time, and validity. The subsequent second to sixth elements each contain internal elements in the same configuration as the first contents attribution element.

In FIG. 42, a file element, a time offset element, and a time element are the same as those in FIG. 31.

The provider company name element and section element denotes the name of the contents producing and providing entity (company) and section charged in company.

For example, in the contents attribution element indicated by id=1 of FIG. 42, the contents is produced and provided by the company name "Michelsoft," section "Office Software Business Section." In the contents attribution element shown in FIG. 42, the selection element and category element can be provided as options, and these elements may not always be provided.

Operation of Application Execution Control Module 3001

FIG. 43 is a view showing an example of the contents of the application attribution data 4108 handled by the application execution control module 3001. The application attribution data 4108 is the data obtained by describing in an XML format attribution information concerning some applications already stored in the hard disk 119.

With respect to the application attribution information, the contents element is contained in two elements of application names and use condition contents and elements of use condition contents. Further, a configuration having company name, name, section, and category elements is provided in such elements.

In application attribution information, all of the company name, name, section, and category elements may not be used as elements contained in the contents elements. For example, one of these elements may be used.

Figure 44:
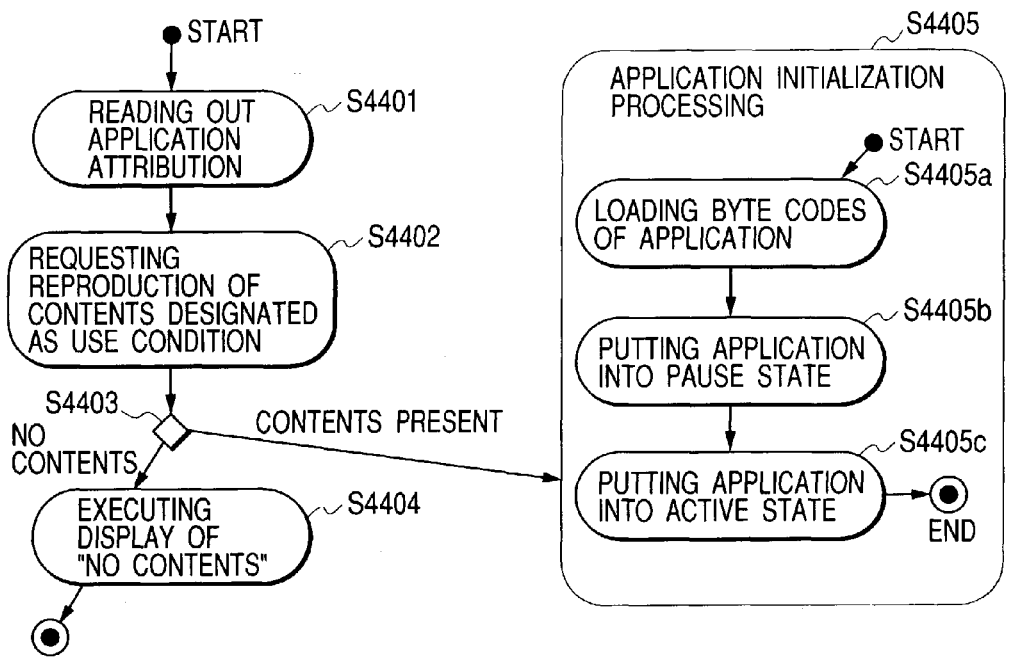
FIG. 44 is a flow chart showing an operation when an application of the application execution control module is started up in the sixth embodiment.

FIG. 44 is a flow chart showing an operation of the application execution control module 3001. In FIG. 44, the "●" sign (filled circle) denotes that processing starts, and the double-circle sign denotes that processing terminates. The rhombus denotes judgment and divergence.

As in the fifth embodiment, the application program in the present embodiment is configured to contain, for example, image data, voice data, and other data used when the application program executes, together with a so called Java® byte code (a Java® class file) which is provided by compiling a source code described in the Java® language.

When the user requests application startup by pressing the application key 210 of the remote controller 132, the application execution control module 3001 acquires the application attribution data 4108 (step S4401).

Next, the application execution control module 3001 reads the application attribution data 4108 acquired in step S4401, i.e., the use-condition element contained in the attribution of an application to be currently started up, and issues a request for contents reproduction to the contents reproduction control module 3002 using this use condition element as a parameter (step S4402).

Specifically, in the case where the application attribution data 4108 is the data shown in FIG. 43 and an application subjected to startup is a "Michelsoft Word for TV" shown in FIG. 43A, the use condition element includes three elements (1) type=company advertisement, company name=Michelsoft, Section=Michelsoft Office 2000, (2) type=company advertisement, company name=Michelsoft, name=Michelsoft Office 2000, and (3) type=non-profit organization advertisement, organization name=World Peace Federation Office, name=mine elimination campaign. These elements are defined as condition parameters, and a request for contents reproduction is issued to the contents reproduction control module 3002.

The contents reproduction control module 3002 reads out contents attribution data 2803 as described above. Then, this module executes retrieval processing for checking whether or not there exist reproduction contents coincident with the condition parameters specified from the application execution control module 3001.

For example, in an example of Michelsoft described above, two contents indicated by contents element id=1 and id=3 shown in (a) and (c) of FIG. 42 are coincident with the condition parameters.

Figure 45:
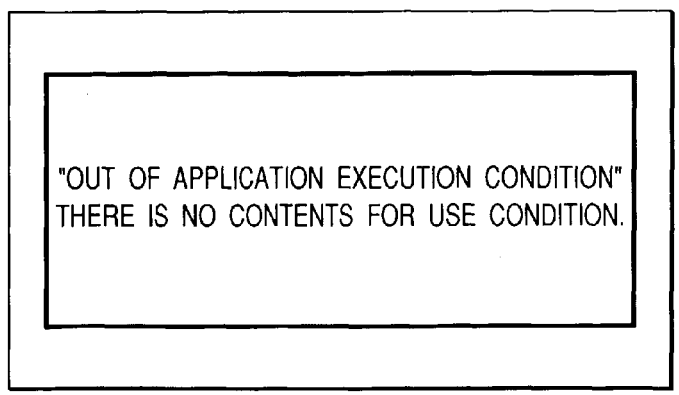
FIG. 45 is a view showing an example of warning display to be displayed when the contents being use conditions is reproduced during application startup.

In the case where there do not exist contents coincident with the condition parameters as a result of retrieval processing by the contents reproduction control module 3002, the application execution control module 3001 controls the graphic generation unit 110. In this manner, this module carries out display for notifying the user that the television broadcast receiving apparatus 100 does not hold the use condition contents as shown in FIG. 45 (step S4404), and cancels and terminates processing (application startup processing).

On the other hand, in the case where there exist contents coincident with the condition parameters, the application execution control module 3001 sequentially executes byte code readout processing and load-into-memory processing (step S4405a), function call processing for setting the inside of an application in a Pause state (step S4405b), and function call processing for setting the application in an executable (active) state (step S4405c), as processing to be executed during application startup (step S4405).

In the present embodiment as well, as in the fifth embodiment, the application execution control module 3001 controls the picture synthesization unit 111, whereby the screen shown in FIG. 33 is divided into two regions 3311 and 3312, the region 3312 is defined as an application display screen, and the region 3311 is defined as a contents reproduction screen.

In addition, with respect to an operation of the application execution control module 3001 in execution of an application, the operation shown in FIG. 34 is carried out as in the fifth embodiment. Further, the application execution control module 3001 periodically confirms whether or not contents is now subjected to reproduction. When this module confirms that contents reproduction is stopped by operation of the remote controller 132 by the user or the like, it carries out the warning display shown in FIG. 35.

Operation of Contents Reproduction Module 3002

Figure 46:
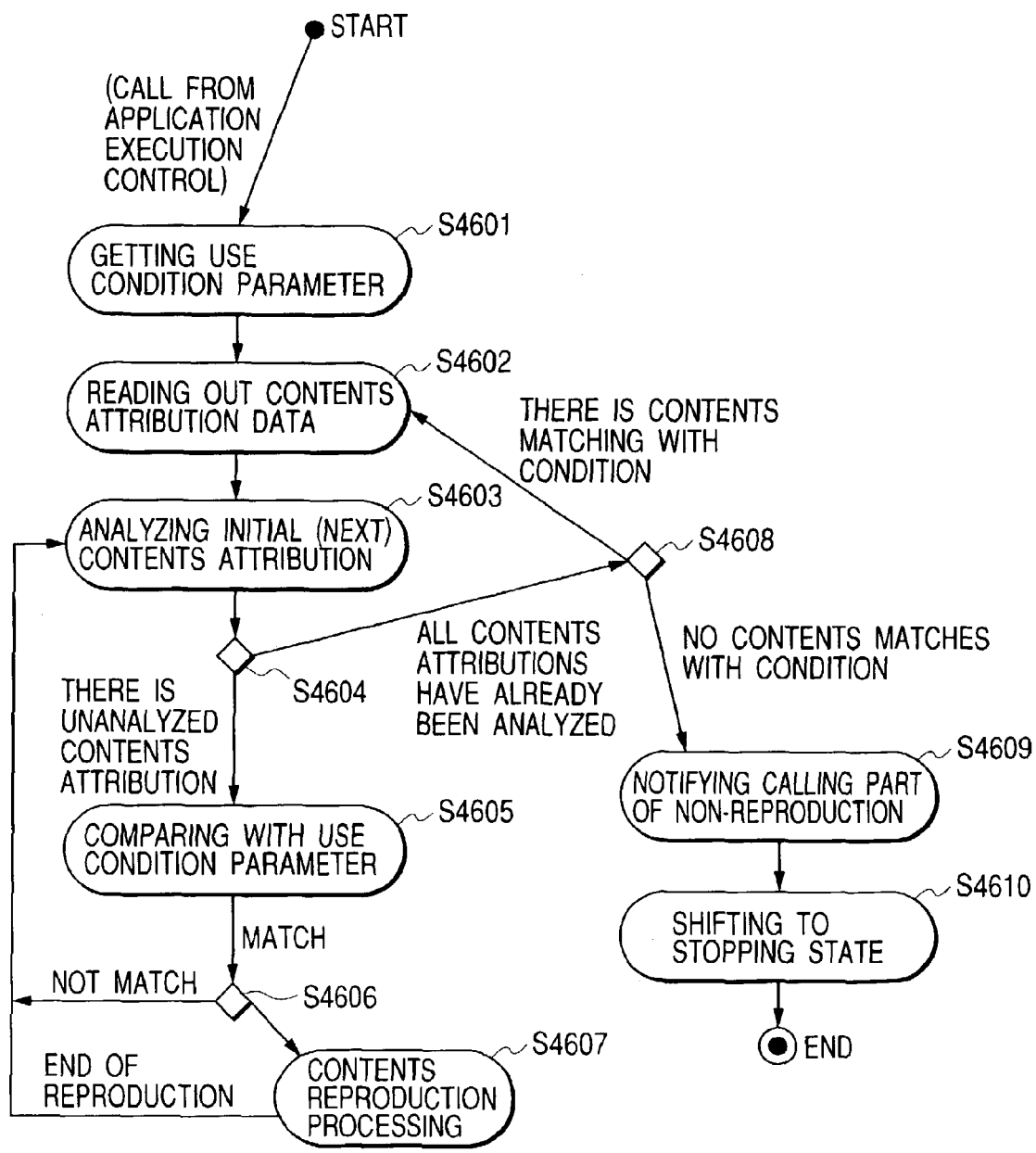
FIG. 46 is a flow chart showing an operation of the contents reproduction control module in the sixth embodiment.

FIG. 46 is a flow chart showing an operation of the contents reproduction control module 3002.

First, when the contents reproduction control module 3002 acquires the use condition parameters assigned as parameters upon the receipt of a contents reproduction request from the application execution control module 3001 (step S4601).

Next, the contents reproduction control module 3002 sequentially reads out the contents attribution data 4108 (step S4602), and sequentially analyses the contents attribution elements contained in the contents attribution data 4108 (step S4103).

That is, in case that the contents attribution elements are not yet analyzed (step S4604), the contents reproduction control module 4102 carries out comparison with the use condition parameters (step S4605). When the coincidence is accepted (step S4606), this module executes contents reproduction (step S4607).

On the other hand, when no coincidence is obtained, or when contents reproduction terminates, the contents reproduction control module 3002 executes processing for comparison with the use condition parameters relevant to the next contents attribute.

In the comparison processing of the present embodiment, all the conditions contained in contents elements each indicated by the application attribution data 4108 are required to be met. For example, in the case of an application "Small Mail for TV" indicated by id=2 of FIG. 43, for example, the application has the following five conditions.

(1) type=company advertisement, company name=21 Century Trading Company, section=Imported Car Business Section;

(2) type=company advertisement, company name=Mainichi Beer, Name=Year Ending Gift Champaign in 2000;

(3) type=advertisement company, company name=Mainichi Beer, name=Super-Smooth Beer;

(4) type=company advertisement, company name=Nihonbashi Department Store; and (5) type=company advertisement, company name=Shibuya Television Broadcasting Service, category program.

Then, contents coincident with each of these conditions are retrieved.

In addition, if the contents attribution data shown in FIG. 42 exists, the contents shown in (b) of FIG. 42 are conditionally coincident with the above condition (1), and the contents shown in (d) of FIG. 42 are conditionally coincident with the above condition (3).

Therefore, the contents reproduced in this case are two contents shown in (b) and (d) of FIG. 42.

In comparison processing, only the condition specified for the contents element of the application attribution data 4108 may be met. Even if the contents attribution data 4108 includes another parameter, such another parameter is ignored in comparison processing.

When all of the contents attributions contained in the contents attribution data 3003 are analyzed (step S4608), the contents reproduction control module 3002 notifies the application execution control module 3001 of a non-reproduction state in the case where there is no contents coincident with the condition parameters (step S4609).

In addition, when conditionally coincident contents exist, the contents reproduction control module 3002 restarts processing from the beginning of the contents attribution data 3003, and carries out reproduction of contents coincident with the condition parameters. In this manner, in the case of "Small Mail for TV" described above, the contents shown in (b) and (d) of FIG. 42 are alternately reproduced.

With the application execution control operation and contents reproduction control operation as described above, the television broadcast receiving apparatus 100 of the present embodiment can change reproduction contents according to attribution information specified for an application started up by the user.

Also, the application execution control module 3001 of the present embodiment further receives notification of state change from the application during application operation, and carries out contents reproduction condition change based on this notification.

Figure 47:
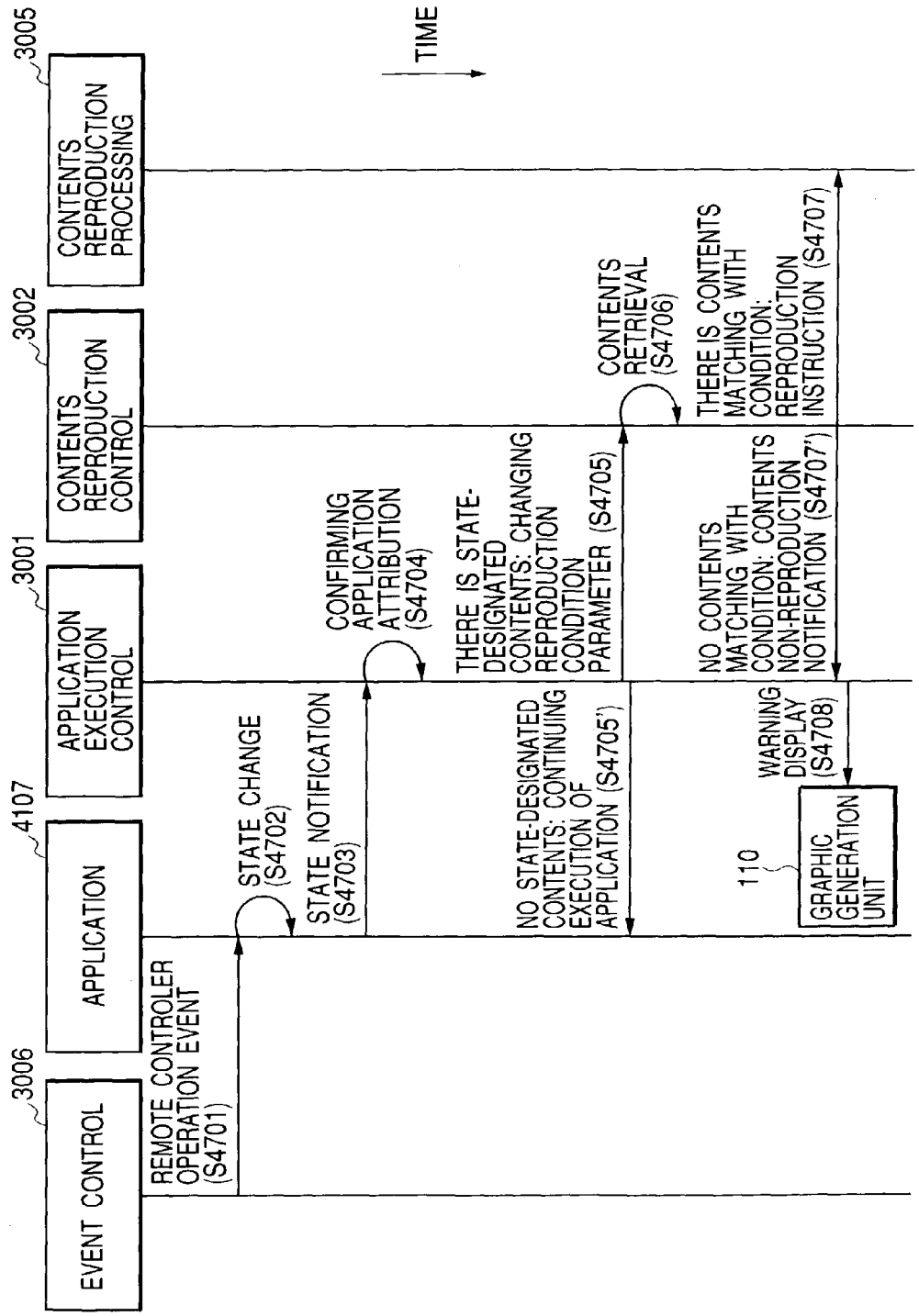
FIG. 47 is a diagram showing a linkage operation of an application in the case where there has occurred an application state change triggered by remote control input while in execution of an application; an application execution module; and a contents reproduction control module.

FIG. 47 is a diagram showing a relationship between the contents reproduction control module 3002 and another software module or hardware component relevant to the above operation.

In FIG. 47, the line oriented in a downward direction indicates an elapse of time (time), and indicates that processing is executed later as the above line goes down.

First, when the user operates the remote controller 132, thereby changing an application state (step S4701 and step S4702), the data indicating a new state is notified to the application execution control module 3001 (step S4703).

Next, upon receipt the notification of state change, the application execution control module 3001 confirms the application attribution data 4108 of an application being executed (step S4704). In the case where type "SPECIFYING STATE" is specified for a contents element, a contents element coincident with a state transmitted by the notification of state change from the application is retrieved. Then, the contents contained in this contents element are set as new parameters relevant to the contents reproduction control module 3002 (step S4705).

Upon receipt of such the new parameter from the application execution control module 3001, the contents reproduction control module 3002 confirms the contents of the contents attribution data 3003, and retrieves the contents conditionally coincident with such the new parameter (step S4706).

In the case where the corresponding contents is successfully retrieved as a result of retrieval, the contents reproduction control module 3002 instructs the contents reproduction processing module 3005 to reproduce the contents (step S4707).

Specifically, in the case of the application attribution data 4108 shown in FIG. 43, an attribution "SPECIFYING STATE" is set as a contents element which appears as a use condition, relevant to an application "Big Photography Management for TV" shown in (C) of FIG. 43. In this case, upon receiving the notification of state change from the same application while in execution of an application, the application execution control module 3001 changes a condition parameter relevant to the contents reproduction control module 3002 in accordance with this notification (state value "1" or "2"), and makes a contents reproduction request.

That is, when the state value "1" is notified from an application, the application execution control module 3001 issues a contents reproduction request by setting the following three conditions as parameters:

"type="company advertisement," company name=BIC camera, category=personal computer;

"type="company advertisement," company name=BIC camera, category=AV equipment; and "type"="company advertisement," company name=BIC camera, category=home electronics.

On the other hand, when the state value "2" is notified from an application, the application execution control module 3001 issues a contents reproduction request by using as a parameter a condition "–type="company advertisement," company name=IC camera, category=personal computer peripherals".

In processing for confirming the application attribution data 4108 of step S4704, in the case where a contents element having the type "SPECIFYING STATE" does not exist in the application attribution data 4108 of an application being now executed, the application execution control module 3001 maintains application execution.

In addition, in retrieval processing in the contents reproduction module 3002 (step S4706), when contents coincident with the condition parameters is not successfully retrieved, the application execution control module 3001 receives this fact from the contents reproduction control module 3002 (notification of non-reproduction, step S4707'). Then, this module executes processing in the same way as processing in step S3203 or subsequent shown in FIG. 32, and carries out warning display shown in FIG. 3 (step S4708).

By making such an operation like this, the television broadcast receiving apparatus 100 of the present embodiment can change the contents of contents reproduced according to the "state" of an application being utilized by the user.

Operation of Storage Control Module 3004

In the foregoing description, it is assumed that the storage control module 3002 carries out storage of content at a predetermined period of time. In contrast, in the present embodiment, the storage control module 3002 itself analyzes SI data, retrieves the contents to be stored, and executes recording booking processing and recording processing.

Figure 48:
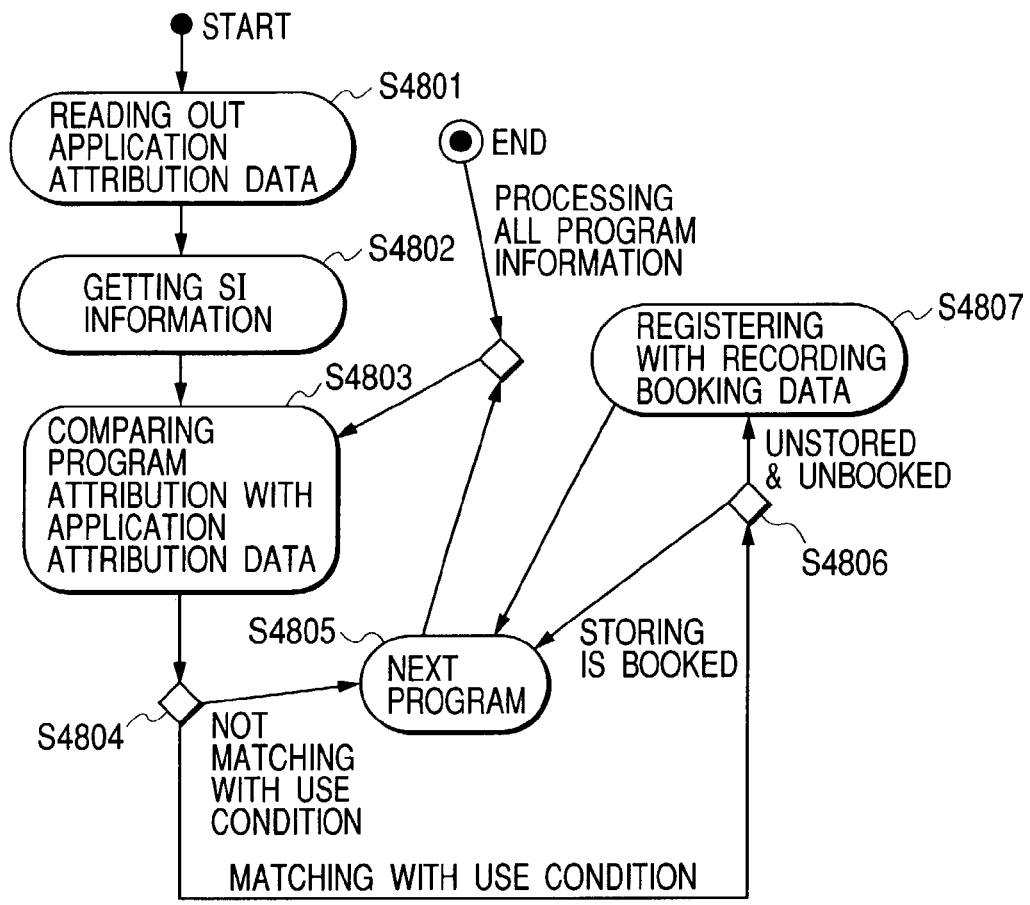
FIG. 48 is a flow chart showing an operation of a storage control module in the sixth embodiment.
Figure 49:
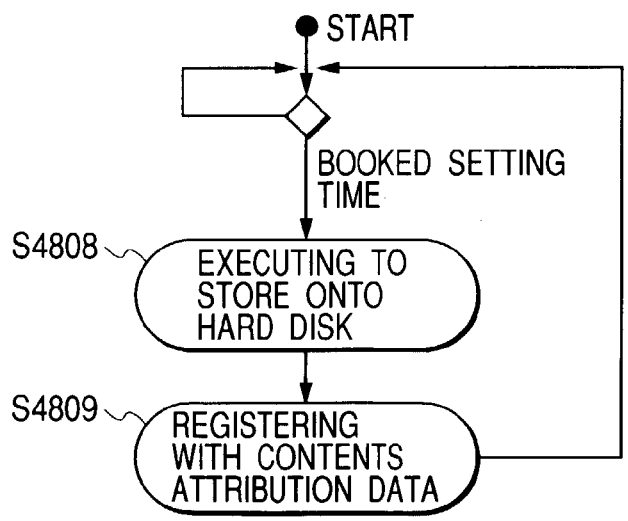
FIG. 49 is a flow chart showing an operation of a storage control module in the sixth embodiment.

FIGS. 48 and 49 are flow chart each showing an operation of the storage control module 3004 in the present embodiment.

As shown in FIG. 48, first, the storage control module 3004 acquires the application attribution data 4108 (step S401). Further, this module requests the transport decoder 103 to acquire SI data multiplexed to TS data, and acquires the SI data (step S4802).

Figure 50:
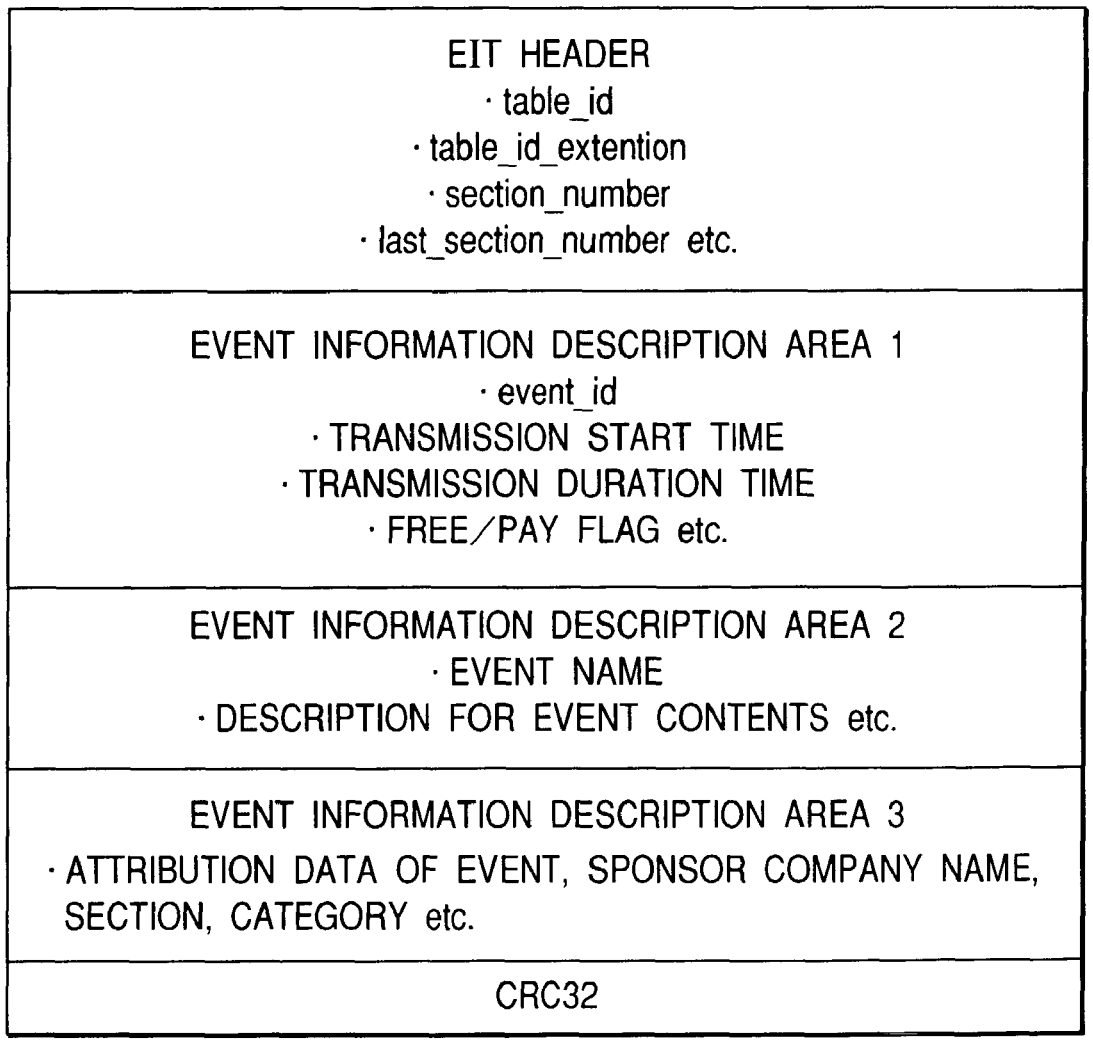
FIG. 50 is a view showing an EIT (Event Information Table) distributed from a broadcast station in the sixth embodiment.

FIG. 50 is a view showing an example of an EIT (Event Information Table), which is one of table information contained in the SI data in the present embodiment. The EIT is a table in which information concerning the respective program contents (event) to be broadcast is described. In the EIT of the present embodiment, an event information description region 2 contains a program contents name (event name), and an event description region 3 contains information such as program (event) attribution data, provider company name, section, and category.

The storage control module 3004 reads out a forthcoming EIT contained in SI data, and carries out comparison between the readout information and the application attribution data 4108 acquired in the processing in step S4801 (step S4803).

When a coincident program exists and that program is contents which are not stored and booked, that is, when the program is not registered in the contents attribution data 3003 and is not registered in the recording booking data 4109 (step S4806), the broadcast time, end time, channel, and event ID of the contents are registered in the recording booking data 4109 (step S4807).

Then, as shown in FIG. 49, when the broadcast time registered in the recording booking data 4109 has come, the storage control module 3004 carries out an operation for executing storage of contents by controlling the digital tuner 101, transport decoder 103, and hard disk 119 (step S4808).

Further, the storage control module 3004 registers information such as the name, provider company name, section, and category of the stored program contents in the contents attribution data 3003 (step S4809).

As is described above, according to the present embodiment, an operation for executing an application and an operation for permitting continuous use can be carried out in accordance on the condition that reproduction of contents specified in advance is carried out. Also, an operation for changing contents reproduced on an application by application basis and an operation for changing contents reproduced according to an application state can be carried out.

In addition to storing the contents in a time specified in advance, the contents coincident with a condition specified by the application attribution registered in the application attribution data 4108 are retrieved from service information, and a storage operation can be automatically carried out.

In the fifth and sixth embodiments, the remote controller 132 is used as means for the user to instruct the television receiving apparatus 100 to operate or input data. Further, a function using a required minimum button shown in FIG. 29 is exemplified as a function of the remote controller 132. However, keyboard or mouse as well as the remote controller 132 may be provided without being limited thereto in view of the aspect of the present invention. In addition, buttons for inputting letters, numerals and the like to the remote controller 132 may be provided.

Also, in the fifth and sixth embodiments, a configuration is provided so that an application is started up by pressing the application button 210 of the remote controller 132. However, in the case where a plurality of applications are already stored in the hard disk 119, a list of applications available is displayed on the display unit 134 at a timing of depressing the application button 210, causing the user to select a desired application from the listings, whereby application startup may be carried out.

Further, in the fifth and sixth embodiments, although applications are assumed to be already stored in the hard disk 119, even an application downloaded by using television broadcast waves in a data broadcast can be applied, for example, without being limited thereto, in view of the aspect of the present invention. Alternatively, an application captured into the television broadcast receiving apparatus 100 via a recording medium such as a card medium or disk medium may be also applicable.

Moreover, in the fifth and sixth embodiments, although text data described based on XML is employed as the contents attribution data 2803, data described in another language or the like can be applied without being limited thereto.

In addition, in the fifth and sixth embodiments, items of information such as contents name, provider company name, section, and category name owned by contents are described respectively as elements based on XML. However, a URI (Uniform Resource indicator) for identifying the contents, for example, "contact_id://<provider company's DNS (domain Naming System) name> or the like may be used.

The objective of the present invention is achieved by supplying to a system or apparatus a storage medium storing therein a program code of software realizing host and terminal functions of the embodiments, and then, the system or apparatus computer (CPU or MPU) reads out and executing the program code stored in a storage medium.

In this case, the program code itself read out from the storage medium achieves the functions of the first and second embodiments, and the storage medium storing a program code therein and the program code configure the present invention.

As a storage medium for supplying a program code, there can be used a ROM, a flexible disk, a hard disk, an optical disk, a magneto-optical disk, a CD-ROM, a CD-R, a magnetic tape, or a non-volatile memory card.

In addition, the functions according to the first and second embodiments are realized by executing the program code read out by the computer. Based on an instruction of that program code, an OS or the like running on the computer carries out part or whole of actual processing, thereby realizing the functions of each embodiment. This is also included in the aspect of the present invention.

Further, the program code read out from the storage medium is written into a memory provided with an extended function board inserted into the computer or a function extension unit connected to the computer. Then, based on an instruction for the program code, a CPU or the like provided with the function extension board or function extension unit carries out part or whole of actual processing, thereby realizing the functions of each embodiment. This also constitutes the present invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A receiving apparatus comprising:
a receiving unit adapted to receive television broadcast data containing (a) an application program and (b) condition data indicating a predetermined condition for executing the application program, the application program including a byte code file based on a source code described in JAVA language;
a viewing control unit adapted to control a viewing state of a television broadcast program;
an application executing unit adapted to execute the application program obtained from the television broadcast data; and
a control unit adapted to control said application executing unit on the basis of the condition data obtained from the television broadcast data so as to allow the execution of the application program in the case that the predetermined condition is satisfied, and inhibit the execution of the application program in the case that the predetermined condition is not satisfied,
wherein the condition data indicates (a) the broadcast service ID associated with the application program and (b) an audio level condition for executing the application program, and
wherein the control unit allows executing the application program corresponding to the broadcast service ID indicated by the condition data in response to the broadcast program corresponding to the broadcast service ID indicated by the condition data having been viewed with a higher audio level than an audio level indicated by the condition data, and
wherein the viewing control unit synthesizes image data associated with the application program and image data associated with the television broadcast data, and outputs the synthesized image data to a monitor device.

2. A control method for controlling a receiving apparatus, said method comprising:
a receiving step for receiving television broadcast data containing (a) an application program and (b) condition data indicating a predetermined condition for executing the application program, the application program including a byte code file based on a source code described in JAVA language;
a viewing control step for controlling a viewing state of a television broadcast program;
an application executing step for executing the application program obtained from the television broadcast data; and
a control step for controlling said application executing step on the basis of the condition data obtained from the television broadcast data so as to allow the execution of the application program in the case that the predetermined condition is satisfied, and inhibit the execution of the application program in the case that the predetermined condition is not satisfied,
wherein the condition data indicates (a) a broadcast service ID associated with the application program and (b) an audio level condition for executing the application program,
wherein the control step allows executing the application program corresponding to the broadcast service ID indicated by the condition data in response to the broadcast program service corresponding to the broadcast service ID indicated by the condition data having been viewed with a higher audio level than an audio level indicated by the condition data, and
wherein the viewing control step includes steps of (a) synthesizing image data associated with the application program and image data associated with the television broadcast data, and (b) outputting the synthesized image data to a monitor device.

* * * * *